United States Patent
Hagihara et al.

(10) Patent No.: US 7,030,921 B2
(45) Date of Patent: Apr. 18, 2006

(54) SOLID-STATE IMAGE-SENSING DEVICE

(75) Inventors: Yoshio Hagihara, Amagasaki (JP); Tomokazu Kakumoto, Nagaokakyo (JP)

(73) Assignee: Minolta Co., Ltd., Osaka (JP)

( * ) Notice: Subject to any disclaimer, the term of this patent is extended or adjusted under 35 U.S.C. 154(b) by 782 days.

(21) Appl. No.: 09/769,065

(22) Filed: Jan. 25, 2001

(65) Prior Publication Data

US 2001/0052940 A1 Dec. 20, 2001

(30) Foreign Application Priority Data

| Feb. 1, 2000 | (JP) | ............................ 2000-028879 |
| Feb. 1, 2000 | (JP) | ............................ 2000-028946 |
| Feb. 28, 2000 | (JP) | ............................ 2000-056029 |

(51) Int. Cl.
  *H04N 3/14* (2006.01)
  *H04N 5/335* (2006.01)

(52) U.S. Cl. .................................... 348/308

(58) Field of Classification Search ................ 348/294, 348/297, 298, 302–308
See application file for complete search history.

(56) References Cited

U.S. PATENT DOCUMENTS

| 4,973,833 A | 11/1990 | Takada et al. ............ 250/208 |
| 5,241,575 A | 8/1993 | Miyatake et al. ............. 377/60 |
| 5,289,286 A | 2/1994 | Nakamura et al. ........... 348/223 |
| 5,861,621 A | 1/1999 | Takebe et al. ........... 250/214 R |
| 5,933,190 A * | 8/1999 | Dierickx et al. ............ 348/302 |
| 6,323,479 B1 * | 11/2001 | Hynecek et al. ......... 250/214 L |
| 6,683,645 B1 * | 1/2004 | Collins et al. ............... 348/294 |
| 6,697,112 B1 * | 2/2004 | Morris et al. ................ 348/302 |
| 6,909,462 B1 * | 6/2005 | Shinotsuka et al. ......... 348/308 |
| 2001/0045508 A1 * | 11/2001 | Dierickx ................... 250/208.1 |
| 2005/0167602 A1 * | 8/2005 | Dierickx ................ 250/370.01 |

FOREIGN PATENT DOCUMENTS

JP  3-192764 A  8/1991

OTHER PUBLICATIONS

U.S. Appl. No. 09/537,425, filed Mar. 27,2000, Hagihara.

* cited by examiner

*Primary Examiner*—David L. Ometz
*Assistant Examiner*—Yogesh Aggarwal
(74) *Attorney, Agent, or Firm*—Sidley Austin LLP

(57) ABSTRACT

In a solid-state image-sensing device, when an image sensing operation is performed in each pixel, a MOS transistor T1 is turned on and a MOS transistor T4 is turned off to make a MOS transistor T2 operate in a subthreshold region. When a reset operation is performed in each pixel, the MOS transistor T1 is turned off and the MOS transistor T4 is turned on to feed a constant voltage to the gate and drain of the MOS transistor T2. Then, the MOS transistor T4 is turned off, then the voltage at the node "a" is reset, and then a pulse signal φV is fed to a MOS transistor T5 to obtain an output. By using the thus obtained output as compensation data, variations in sensitivity among individual pixels are reduced.

6 Claims, 53 Drawing Sheets

SOLID-STATE IMAGE-SENSING DEVICE

This application is based on Japanese Patent Applications Nos. 2000-28879, 2000-28946, and 2000-56029 filed respectively on Feb. 1, 2000, Feb. 1, 2000, and Feb. 28, 2000, the contents of which are hereby incorporated by reference.

BACKGROUND OF THE INVENTION

1. Field of the Invention

The present invention relates to a solid-state image-sensing device, and particularly to a solid-state image-sensing device having a plurality of pixels arranged therein.

2. Description of the Prior Art

Solid-state image-sensing devices are not only small-sized, light-weight, and power-saving, but also free from image distortion, free from image burn-in, and resistant to unfavorable environmental conditions such as vibration and magnetic fields. Moreover, solid-state image-sensing devices can be manufactured by a process common or analogous to one used to manufacture LSIs (large-scale integrated circuits), and therefore they are reliable and fit for mass production. For these reasons, solid-state image-sensing devices having pixels arranged in a line are widely used in facsimile machines, flat-bed scanners, and the like, and solid-state image-sensing devices having pixels arranged in a matrix are widely used in video cameras, digital cameras, and the like. Solid-state image-sensing devices are roughly grouped into two types according to the means they use to read out (extract) the photoelectric charges generated in their photoelectric conversion devices, namely a CCD type and a MOS type. A CCD-type image-sensing device accumulates photoelectric charges in potential wells while transferring them, and has the disadvantage of a comparatively narrow dynamic range. On the other hand, a MOS-type image-sensing device reads out electric charges accumulated in the pn-junction capacitances of photodiodes through MOS transistors.

Now, how each pixel is configured in a conventional MOS-type solid-state image-sensing device will be described with reference to FIG. 77. As shown in this figure, a photodiode PD has its cathode connected to the gate of a MOS transistor T101 and to the source of a MOS transistor T102. The MOS transistor T101 has its source connected to the drain of a MOS transistor T103, and this MOS transistor T103 has its source connected to an output signal line VOUT. A direct-current voltage VPD is applied to the drain of the MOS transistor T101 and to the drain of the MOS transistor T102, and a direct-current voltage VPS is applied to the anode of the photodiode.

When light is incident on the photodiode PD, photoelectric charge is generated therein, and this electric charge is accumulated at the gate of the MOS transistor T101. Here, when a pulse signal φV is fed to the gate of the MOS transistor T103 to turn this MOS transistor T103 on, a current proportional to the electric charge accumulated at the gate of the MOS transistor T101 flows through the MOS transistors T101 and T103 to the signal output line VOUT. In this way, it is possible to read an output current that is proportional to the amount of incident light. After this signal has been read, the MOS transistor T103 is turned off, and a signal φRS is fed to the gate of the MOS transistor T102 to turn this MOS transistor T102 on so that the gate voltage of the MOS transistor T101 will be initialized.

As described above, in a conventional MOS-type solid-state image-sensing device, at each pixel, the photoelectric charge generated in a photodiode and then accumulated at the gate of a MOS transistor is directly read out. This, however, leads to a narrow dynamic range and thus demands accurate control of the amount of exposure. Moreover, even if the amount of exposure is controlled accurately, the obtained image tends to suffer from flat blackness in dim portions thereof and saturation in bright portions thereof. On the other hand, the assignee of the present invention has once proposed a solid-state image-sensing device including a light-sensing means that generates a photocurrent in accordance with the amount of incident light, a MOS transistor to which the generated photocurrent is fed, and a bias-supplying means that supplies a bias to the MOS transistor to bring it into a state in which a subthreshold current flows therethrough so that the photocurrent is subjected to logarithmic conversion (refer to U.S. Pat. No. 4,973,833). This solid-state image-sensing device offers a wide dynamic range, but tends to suffer from different threshold-value characteristics among the MOS transistors provided in the individual pixels and thus varying sensitivity from one pixel to another. To overcome this, the outputs from the individual pixels in actual shooting of a subject need to be corrected by using compensation data that is stored beforehand by reading the outputs from the pixels with the pixels illuminated with uniformly bright light (uniform light).

However, it is troublesome for a user to illuminate the pixels with an external light source, and moreover it is difficult to illuminate them sufficiently uniformly. On the other hand, providing an image-sensing apparatus with a mechanism for illuminating uniform light complicates the structure of the imagesensing apparatus.

SUMMARY OF THE INVENTION

An object of the present invention is to provide a solid-state image-sensing device that, without requiring irradiation of uniform light beforehand, permits accurate acquisition of compensation data to be used to correct the outputs from individual pixels during shooting of a subject.

Another object of the present invention is to provide a solid-state image-sensing device in which variations in sensitivity among pixels are minimized by making the initial states of the individual pixels substantially identical.

Still another object of the present invention is to provide a solid-state image-sensing device that permits shooting of a subject having a wide brightness range, i.e. a subject of which the brightness ranges from low to high, with high resolution.

A further object of the present invention is to provide a solid-state image-sensing device that permits switching between a wide-dynamic-range state and a narrow-dynamic-range state despite using a single set of photoelectric conversion means.

To achieve the above objects, according to one aspect of the present invention, a solid-state image-sensing device is provided with: a photoelectric conversion element outputting an electric signal proportional to the amount of incident light; a first transistor connected in series with the photoelectric conversion element and operating in a subthreshold region to convert the electric signal from the photoelectric conversion element into a signal logarithmically proportional to the amount of incident light; a first switch provided between the photoelectric conversion element and the first transistor to permit the photoelectric conversion element and the first transistor to be connected to and disconnected from each other; and a second switch for permitting a predetermined direct-current voltage to be fed to the first electrode of the first transistor. Here, during image sensing, the first transistor is turned on to electrically connect the photoelectric conversion element and the first transistor to each other and in addition the second switch is turned off to disable feeding of the direct-current voltage to the first transistor On the other hand, while no image sensing is being performed, with predetermined timing, the first switch is turned off to electrically disconnect the photoelectric conversion element and the first transistor from each other and in addition the second switch is turned on to enable feeding of the direct-current voltage to the first transistor so that a current higher than during image sensing flows through the first transistor to reset the first transistor.

According to another aspect of the present invention, a solid-state image-sensing device is provided with: a plurality of pixels capable of outputting electric signals either in a first mode in which the electric signals are natural-logarithmically proportional to the amount of incident light or in a second mode in which the electric signals are linearly proportional to the amount of incident light; and a detection circuit for detecting variations in sensitivity among the pixels in each of the first and second modes.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

First Example of Pixel Configuration

Figure 1:
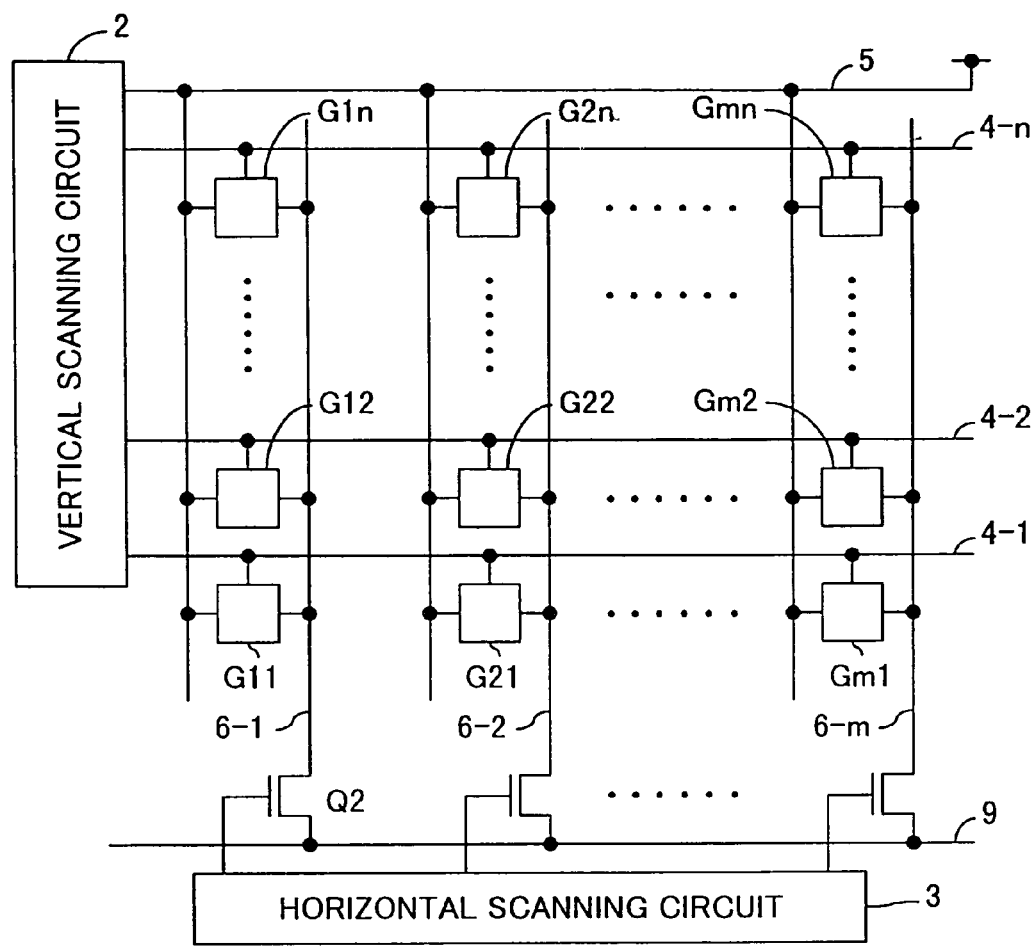
FIG. 1 is a block diagram illustrating the overall configuration of a two-dimensional solid-state image-sensing device embodying the invention.

Hereinafter, solid-state image-sensing devices embodying the present invention will be described with reference to the drawings. FIG. 1 schematically shows the configuration of a portion of a two-dimensional MOS-type solid-state image-sensing device embodying the invention. In this figure, reference symbols G11 to Gmn represent pixels that are arranged in a two-dimensional array (in a matrix). Reference numeral 2 represents a vertical scanning circuit, which scans lines (rows) 4-1, 4-2, . . . , 4-n sequentially. Reference numeral 3 represents a horizontal scanning circuit, which reads out, sequentially pixel by pixel in a horizontal direction, the signals fed from the individual pixels to output signal lines 6-1, 6-2, . . . , 6-m as a result of photoelectric conversion performed in those pixels. Reference numeral 5 represents a power line. The individual pixels are connected not only to the lines 4-1, 4-2, . . . , 4-n, to the output signal lines 6-1, 6-2, . . . , 6-m, and to the power line 5 mentioned above, but also to other lines (for example, clock lines and bias supply lines). These other lines, however, are omitted in FIG. 1.

As shown in FIG. 1, for each of the output signal lines 6-1, 6-2, . . . , 6-m, one N-channel MOS transistor Q2 is provided. Here, a description will be given only with respect to the output signal line 6-1 as their representative. The MOS transistor Q2 has its drain connected to the output signal line 6-1, has its source connected to a signal line 9 serving as a final destination line, and has its gate connected to the horizontal scanning circuit 3. As will be described later, within each pixel, another N-channel MOS transistor T5 functioning as a switch is provided. Whereas this MOS transistor T5 serves to select a row, the MOS transistor Q2 serves to select a column.

First Embodiment

A first embodiment of the invention, which is applicable to each pixel of the first example of pixel configuration shown in FIG. 1, will be described below with reference to the drawings.

Figure 2:
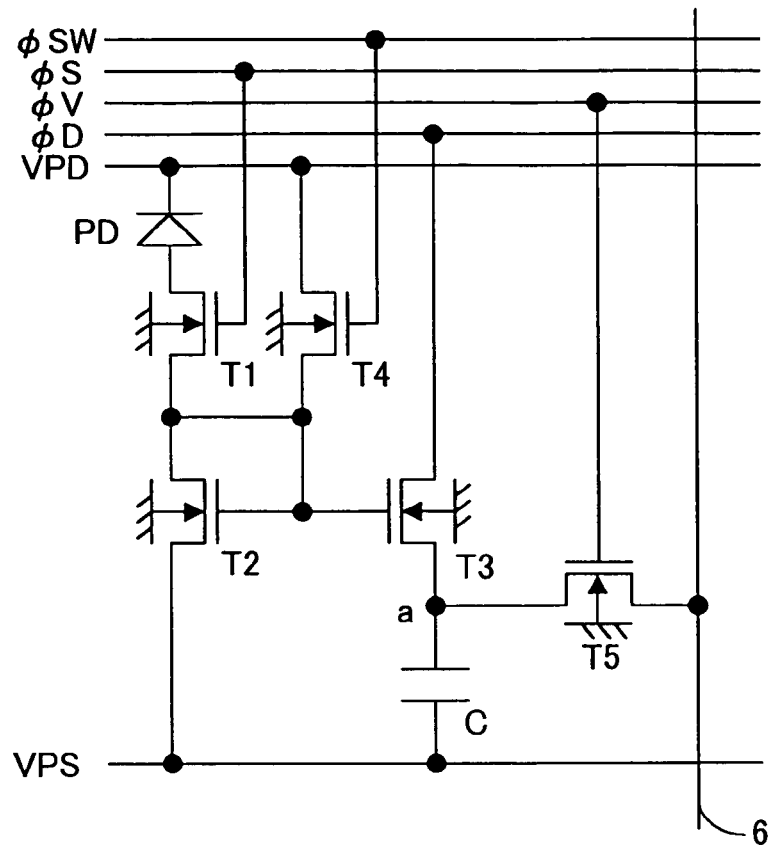
FIG. 2 is a circuit diagram showing the configuration of each pixel in a first embodiment of the invention.

In FIG. 2, a pn photodiode PD constitutes a photosensor (photoelectric converter). The anode of this photodiode PD is connected to the drain of a MOS transistor T1. The source of this MOS transistor T1 is connected to the drain and gate of a MOS transistor T2, to the gate of a MOS transistor T3, and to the source of a MOS transistor T4. The source of the MOS transistor T3 is connected to the drain of a MOS transistor T5 for row selection. The source of this MOS transistor T5 is connected to an output signal line 6 (this output signal line 6 corresponds to the output signal lines 6-1, 6-2, . . . , 6-$m$ in FIG. 1). The MOS transistors T1 to T5 are all N-channel MOS transistors with their back gates grounded.

A direct-current voltage VPD is applied to the cathode of the photodiode PD. On the other hand, a direct-current voltage VPS is applied to the source of the MOS transistor T2, and also to one end of a capacitor C of which the other end is connected to the source of the MOS transistor T3. The direct-current voltage VPD is applied also to the drain of the MOS transistor T4, and a signal φSW is fed to the gate of this MOS transistor T4. A signal φD is fed to the drain of the MOS transistor T3. Moreover, a signal φS is fed to the gate of the MOS transistor T1, and a signal φV is fed to the gate of the MOS transistor T5.

(1) The Operation Performed to Convert the Light Incident on Each Pixel into an Electric Signal First, the signal φS is turned to a high level to turn the MOS transistor T1 on, so that the MOS transistor T2 operates in a subthreshold region. During this operation, the MOS transistor T4, receiving at its gate a low level as the signal φSW, remains off, and therefore can be regarded as practically nonexistent. In this state, when light is incident on the photodiode PD, a photocurrent is generated therein, and, due to the subthreshold characteristics of a MOS transistor, a voltage natural-logarithmically proportional to the photocurrent appears at the gates of the MOS transistors T2 and T3. This voltage causes a current to flow through the MOS transistor T3, and thus an amount of electric charge equivalent to the value obtained by natural-logarithmically converting the integral of the photocurrent is accumulated in the capacitor C. That is, a voltage proportional to the value obtained by natural-logarithmically converting the integral of the photocurrent appears at the node "a" between the capacitor C and the source of the MOS transistor T3. Here, the MOS transistor T5 is assumed to be off.

Next, the pulse signal φV is fed to the gate of the MOS transistor T5 to turn this MOS transistor T5 on, so that the electric charge accumulated in the capacitor C is delivered, as an output current, to the output signal line 6. The current thus delivered to the output signal line 6 is natural-logarithmically proportional to the integral of the photocurrent. In this way, it is possible to read out a signal (output current) proportional to the logarithm of the amount of incident light. After this signal is read out, the MOS transistor T5 is turned off. During this operation, whereby the amount of incident light is converted into an output current natural-logarithmically proportional thereto as described above, the signal φSW is kept at a low level.

(2) The Operation Performed to Reset Each Pixel

Figure 3:
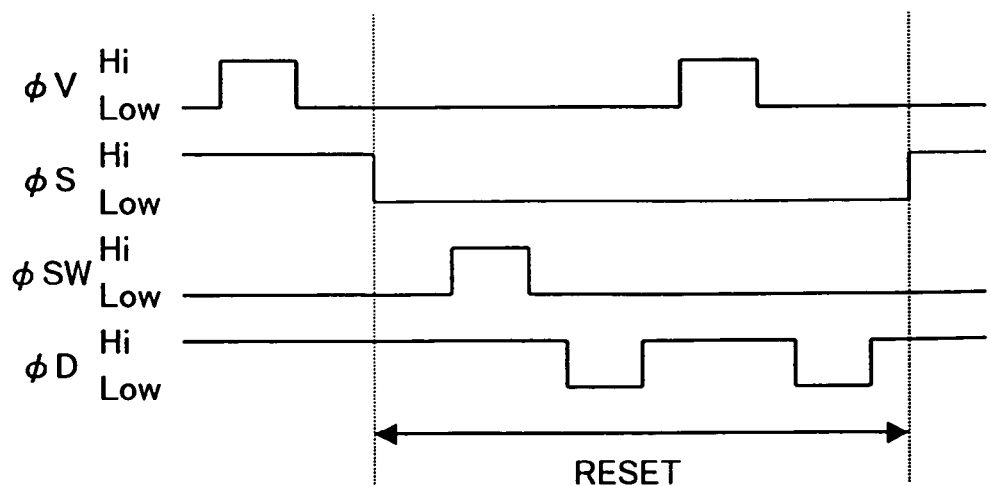
FIG. 3 is a timing chart of the signals fed to the constituent circuit elements of each pixel used in the first embodiment.
Figure 4A:
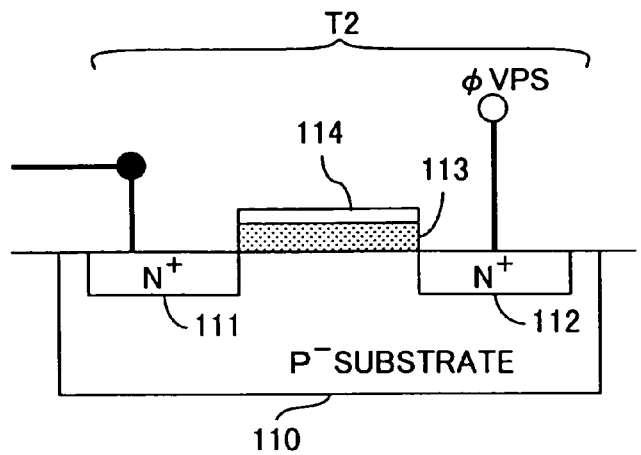
FIG. 4A is a diagram showing the structure of each pixel shown in FIG. 1.

Now, how this pixel, having a circuit configured as shown in FIG. 2, is reset will be described with reference to the drawings. FIG. 3 is a timing chart of the signals fed, during a reset operation, to the individual signal lines connected to the constituent circuit elements of each pixel. FIG. 4A is a diagram showing the structure of the MOS transistor T2, and FIGS. 4B to 4E are diagrams showing the potential relationship observed in the MOS transistor T2. In FIGS. 4B to 4E, arrows indicate the direction in which the potentials become higher.

Incidentally, as shown in FIG. 4A, the MOS transistor T2 is formed, for example, by forming N-type diffusion layers 111 and 112 in a P-type semiconductor substrate (hereinafter called the "P-type substrate") 110 and then forming, on top of the channel left between those N-type diffusion layers 111 and 112, an oxide film 113 and, further on top, a polysilicon layer 114. Here, the N-type diffusion layers 111 and 112 function as the drain and the source, respectively, of the MOS transistor T2, and the oxide film 113 and the polysilicon layer 114 function as the gate insulating film and the gate electrode, respectively, thereof. Here, in the P-type substrate 110, the region between the N-type diffusion layers 111 and 112 is called the sub-gate region.

As described under (1) above, in the pixel having a circuit configured as shown in FIG. 2, when the pulse signal φV is fed to the gate of the MOS transistor T5, an electric signal (output signal) proportional to the logarithm of the amount of incident light is output to the output signal line 6. After this output signal is output and the pulse signal φV is turned to a low level, a reset operation is started. How this reset operation is performed will be described below with reference to FIGS. 3 and 4B to 4E.

Figure 4B:
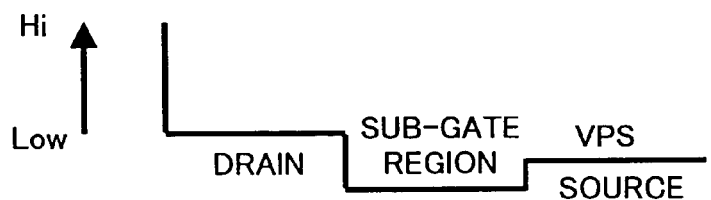
FIGS. 4B to 4E are diagrams showing the potential relationship.

After the pulse signal φV is fed to the gate of the MOS transistor T5 and an output signal is output, first, the signal φS is turned to a low level to turn the MOS transistor T1 off. This causes negative electric charge to flow into the MOS transistor T2 through its source and recombine with the positive electric charge accumulated at the gate and drain of the MOS transistor T2 and at the gate of the MOS transistor T3. As a result, as shown in FIG. 4B, the potentials at the drain and the sub-gate region of the MOS transistor T2 drop down to certain levels.

Figure 4C:
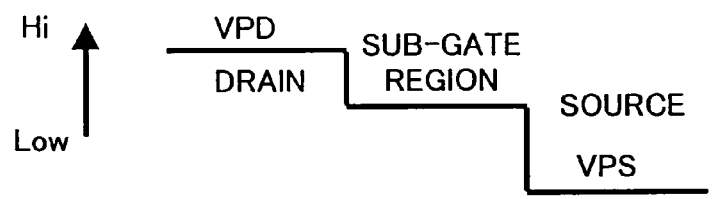

In this way, the potentials at the drain and the sub-gate region of the MOS transistor T2 start being reset to their original levels, but the resetting slows down when those potentials reach certain levels. This slowing down is particularly remarkable when a thus far brightly-lit subject has suddenly become dimly-lit. Therefore, next, the voltage φSW fed to the gate of the MOS transistor T4 is turned to a high level to turn this MOS transistor T4 on. This causes the drain voltage and the gate voltage of the MOS transistor T2 to become higher, and thus causes the potentials in the MOS transistor T2 to change as shown in FIG. 4C; that is, the potentials at the sub-gate region and the drain thereof become higher. As a result, positive electric charge flows into the MOS transistor T4 through its drain.

Figure 4D:
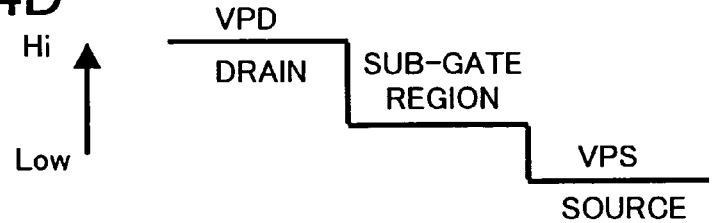
Figure 4E:
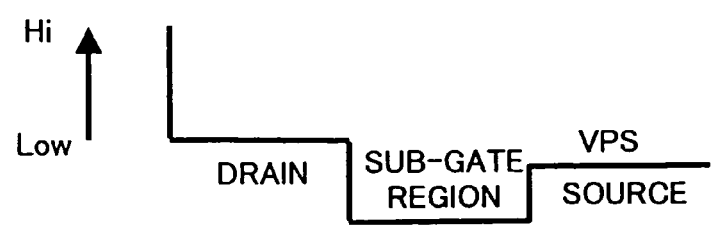

Here, the direct-current voltage VPD is applied to the drain and the gate of the MOS transistor T4, and thus, as shown in FIG. 4D, the potential at the sub-gate region of the MOS transistor T2 settles to the potential that is determined by the gate-to-drain threshold level of the MOS transistor T2. Then, the voltage φSW applied to the gate of the MOS transistor T4 is turned to a low level to turn this MOS transistor T4 off. As a result, the potentials at the drain and the sub-gate region of the MOS transistor T2 drop as shown in FIG. 4E and are thus reset to their original levels, and simultaneously the gate voltage of the MOS transistor T3 is also reset. After the potentials in the MOS transistor T2 are reset to their original levels in this way, the voltage of the signal φD is turned to a low level to discharge the capacitor C and to reset the potential at the node "a" to its original level. Then, the voltage of the signal φD is turned back to a high level.

Thereafter, the pulse signal φV is fed to the MOS transistor T5, so that the output current obtained during the reset operation is delivered to the output signal line 6 and is acquired as compensation data to be used to correct the output from each pixel. Then, the voltage of the signal φD is once again turned to a low level to reset the capacitor C to its original state, and then the voltage of the signal φD is turned back to a high level. Subsequently, the signal φS is turned to a high level to bring the MOS transistor T1 into a conducting state in preparation for an image sensing operation.

Figure 76:
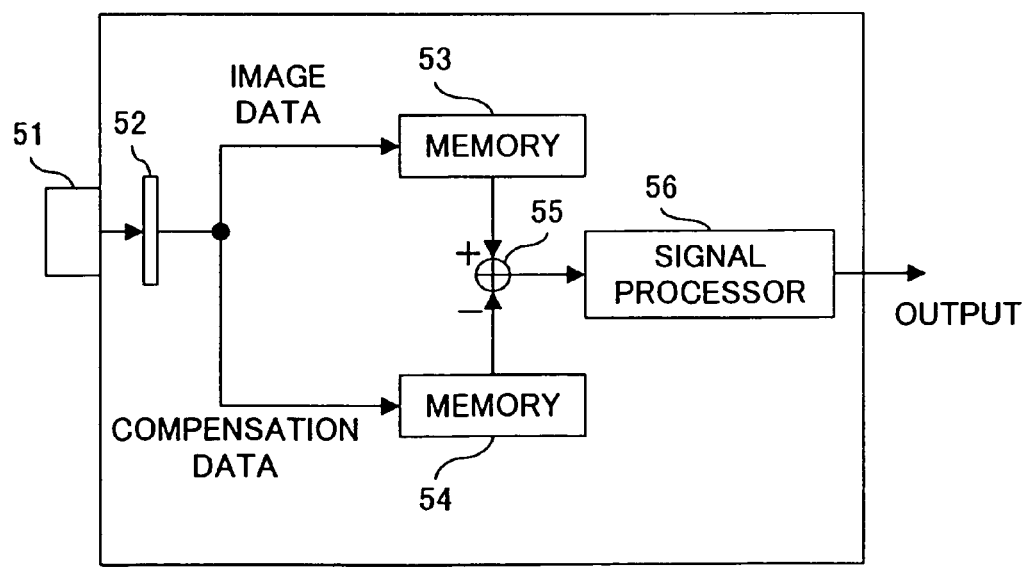
FIG. 76 is a block diagram showing the internal configuration of an image acquisition apparatus provided with the solid-state image-sensing device of one of the embodiments of the invention.
Figure 77:
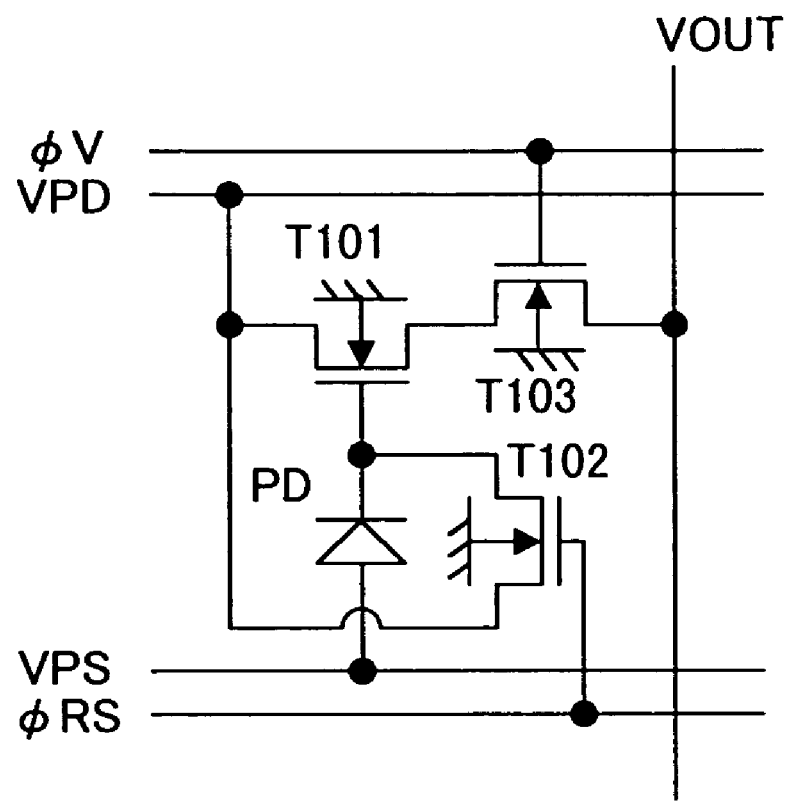
FIG. 77 is a circuit diagram showing the configuration of each pixel in a conventional solid-state image-sensing device.

This output signal obtained during the reset operation is output serially, from one pixel after another, by way of the signal line 9 shown in FIG. 1 to the succeeding circuit so as to be stored as pixel-by-pixel compensation data in a memory provided therein. Then, by correcting pixel by pixel the output current obtained during an actual image sensing operation with the compensation data thus stored, it is possible to eliminate components resulting from variations in sensitivity among the individual pixels from their output signals. A practical example of how this correction is achieved is shown in FIG. 76 and will be described later. This correction may be realized by providing memories, such as line memories, within the image-sensing device.

As described above, in this embodiment, by turning on the MOS transistor T4 that is connected to the drain and the gate of the MOS transistor T2, and by feeding the signal φSW to all the pixels, it is possible to initialize the gate voltage of the MOS transistor T2 of each pixel substantially to an identical level, and thereby permits variations in sensitivity among the individual pixels to be canceled in their initial state.

Second Example of Pixel Configuration

Figure 5:
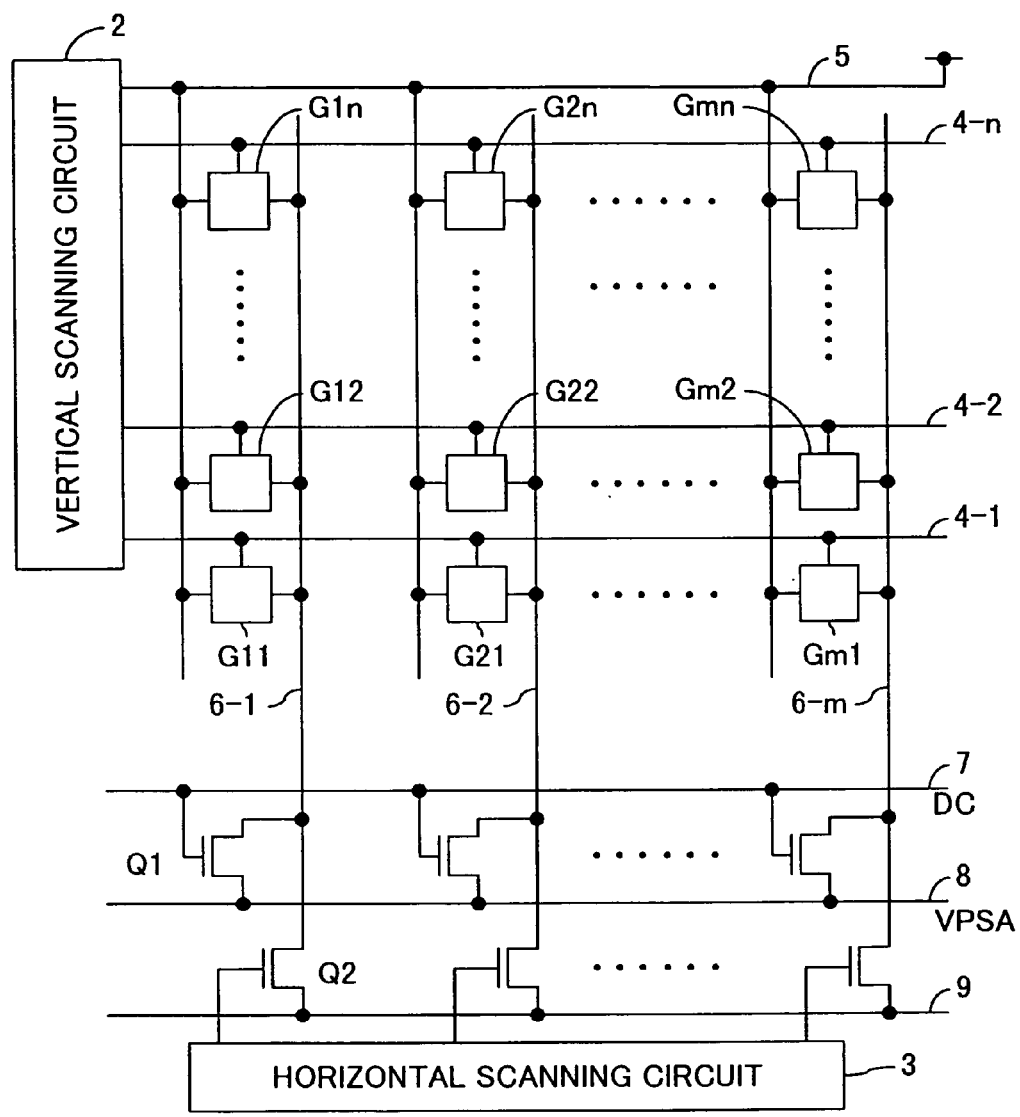
FIG. 5 is a block diagram illustrating the overall configuration of another two-dimensional solid-state image-sensing device embodying the invention.

FIG. 5 schematically shows the configuration of a portion of another two-dimensional MOS-type solid-state image-sensing device embodying the invention. In this figure, reference symbols G11 to Gmn represent pixels that are arranged in a two-dimensional array (in a matrix). Reference numeral 2 represents a vertical scanning circuit, which scans lines (rows) 4-1, 4-2, . . . , 4-n sequentially. Reference numeral 3 represents a horizontal scanning circuit, which reads out, sequentially pixel by pixel in a horizontal direction, the signals fed from the individual pixels to output signal lines 6-1, 6-2, . . . , 6-m as a result of photoelectric conversion performed in those pixels. Reference numeral 5 represents a power line. The individual pixels are connected not only to the lines 4-1, 4-2, . . . , 4-n, to the output signal lines 6-1, 6-2, . . . , 6-m, and to the power line 5 mentioned above, but also to other lines (for example, clock lines and bias supply lines). These other lines, however, are omitted in FIG. 5.

As shown in FIG. 5, for each of the output signal lines 6-1, 6-2, . . . , 6-m, a pair of N-channel MOS transistors Q1 and Q2 is provided. Here, a description will be given only with respect to the output signal line 6-1 as their representative. The MOS transistor Q1 has its gate connected to a direct-current voltage line 7, has its drain connected to the output signal line 6-1, and has its source connected to a line 8 of a direct-current voltage VPSA. On the other hand, the MOS transistor Q2 has its drain connected to the output signal line 6-1, has its source connected to a signal line 9 serving as a final destination line, and has its gate connected to the horizontal scanning circuit 3.

Figure 6A:
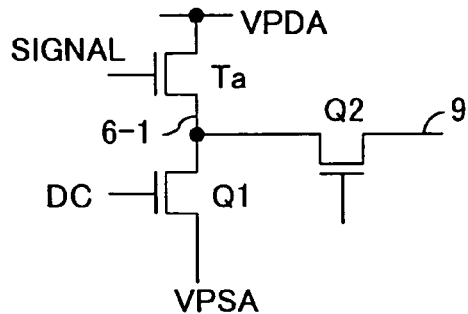
FIGS. 6A and 6B are circuit diagrams of a portion of FIG. 5.

As will be described later, the pixels G11 to Gmn are each provided with an N-channel MOS transistor Ta that outputs a signal in accordance with the photoelectric charge generated in each pixel. How this MOS transistor Ta is connected to the above-mentioned MOS transistor Q1 is shown in FIG. 6A. This MOS transistor Ta corresponds to the MOS transistor T6 in the second, third, fifth, and sixth embodiments described later, and corresponds to the MOS transistor T3 in the fourth and seventh embodiments described later. Here, the direct-current voltage VPSA connected to the source of the MOS transistor Q1 and the direct-current voltage VPDA connected to the drain of the MOS transistor Ta fulfill the relation VPDA>VPSA, where the direct-current voltage VPSA is equal to, for example, the ground-level voltage. In this circuit configuration, the signal from a pixel is fed to the gate of the upper-stage MOS transistor Ta, and a direct-current voltage DC is kept applied to the gate of the lower-stage MOS transistor Q1. Thus, the lower-stage MOS transistor Q1 is equivalent to a resistor or constant-current source, and therefore the circuit shown in FIG. 6A forms an amplifier circuit of a source-follower type. Here, it can safely be assumed that, as a result of amplification, the MOS transistor Ta outputs a current.

Figure 6B:
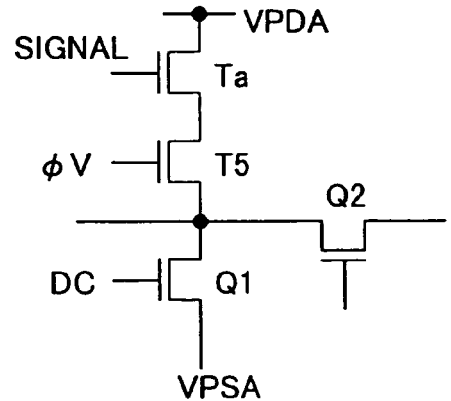

The MOS transistor Q2 is controlled by the horizontal scanning circuit 3 so as to function as a switching device. As will be described later, in the embodiments of the invention shown in FIG. 7 and the following figures, within each pixel, another N-channel MOS transistor T5 functioning as a switch is provided. If this MOS transistor T5 is illustrated explicitly, the circuit shown in FIG. 6A has, more precisely, a circuit configuration as shown in FIG. 6B. Specifically, the MOS transistor T5 is inserted between the MOS transistor Q1 and the MOS transistor Ta. Here, the MOS transistor T5 serves to select a row, and the MOS transistor Q2 serves to select a column. It is to be noted that the circuit configurations shown in FIGS. 5, 6A, and 6B are common to the second to seventh embodiments of the invention described hereinafter.

The circuit configuration shown in FIGS. 6A and 6B permits the signal to be output with a high gain. Accordingly, even in a case where the photocurrent generated in a photosensitive element is converted natural-logarithmically to obtain a wider dynamic range and thus the output signal obtained is comparatively low, this amplifier circuit amplifies the signal so as to make it sufficiently high and thus easier to process in the succeeding signal processing circuit (not shown). Here, the MOS transistor Q1 that serves as the load resistor of the amplifier circuit is provided within each pixel; however, such transistors may be provided, instead, one for each of the output signal lines 6-1, 6-2, . . . , 6-m to which the pixels arranged in columns are collectively connected column by column. This helps reduce the number of load resistors or constant-current sources required, and thus reduce the area occupied by the amplifying circuits on a semiconductor chip.

Second Embodiment

Figure 7:
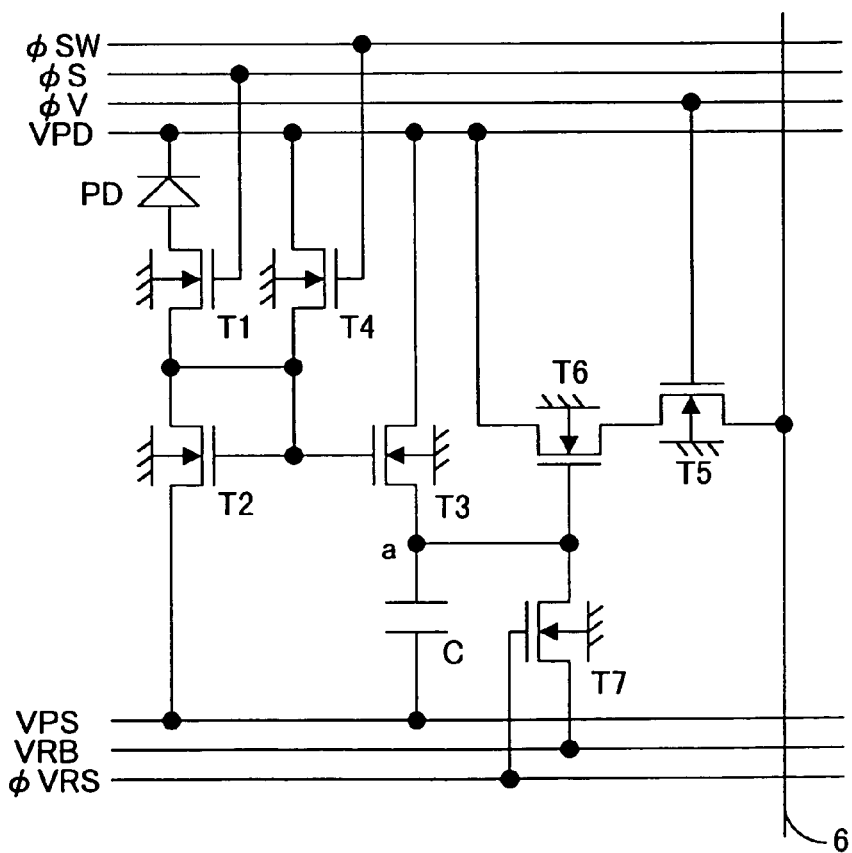
FIG. 7 is a circuit diagram showing the configuration of each pixel in a second embodiment of the invention.

A second embodiment of the invention, which is applicable to each pixel of the second example of pixel configuration shown in FIG. 5, will be described below with reference to the drawings. FIG. 7 is a circuit diagram showing the configuration of each pixel provided in the solid-state image-sensing device of this embodiment. In the following descriptions, such circuit elements, signal lines, and others as serve the same purposes as in the pixel shown in FIG. 2 are identified with the same reference numerals or symbols, and their detailed explanations will not be repeated.

As shown in FIG. 7, in this embodiment, as compared with the pixel shown in FIG. 2, a MOS transistor T6 having its gate connected to the node "a" so as to perform current amplification according to the voltage at the node "a", a MOS transistor T5 for row selection having its drain connected to the source of the MOS transistor T6, and a MOS transistor T7 having its drain connected to the node "a" so as to initialize the capacitor C and the potential at the node "a" are additionally provided. The source of the MOS transistor T5 is connected to the output signal line 6 (this output signal line 6 corresponds to the output signal lines 6-1, 6-2, . . . 6-m). The MOS transistors T6 and T7, just like the MOS transistors T1 to T5, are all N-channel MOS transistors having their back gates grounded.

A direct-current voltage VPD is applied to the drain of the MOS transistor T6, and a signal φV is fed to the gate of the MOS transistor T5. Moreover, a direct-current voltage VRB is applied to the source of the MOS transistor T7, and a signal φVRS is fed to the gate of this MOS transistor T7. The direct-current voltage VPD is applied also to the drain of the MOS transistor T3. In this embodiment, the MOS transistors T1 to T4 and the capacitor C operate in the same manner as in the first embodiment (FIG. 2) to perform a reset operation and an image sensing operation as described below.

(1) The Operation Performed to Convert the Light Incident on Each Pixel into an Electric Signal First, the operation will be described that is performed when the signal φS is turned to a high level to turn the MOS transistor T1 on so that the MOS transistor T2 operates in a subthreshold region. During this operation, the MOS transistor T4, receiving at its gate a low level as the signal φSW, remains off, and therefore can be regarded as practically nonexistent.

When light is incident on the photodiode PD, a photocurrent is generated therein, and, due to the subthreshold characteristics of a MOS transistor, a voltage natural-logarithmically proportional to the photocurrent appears at the gates of the MOS transistors T2 and T3. This voltage causes a current to flow through the MOS transistor T3, and thus an amount of electric charge equivalent to the value obtained by natural-logarithmically converting the integral of the photocurrent is accumulated in the capacitor C. That is, a voltage proportional to the value obtained by natural-logarithmically converting the integral of the photocurrent appears at the node "a" between the capacitor C and the source of the MOS transistor T3. Here, the MOS transistors T5 and T7 are assumed to be off.

Next, the pulse signal φV is fed to the gate of the MOS transistor T5 to turn this MOS transistor T5 on, so that a current proportional to the voltage at the gate of the MOS transistor T6 is delivered, through the MOS transistors T5 and T6, to the output signal line 6. Now, the voltage at the gate of the MOS transistor T6 is equal to the voltage at the node "a", and therefore the current thus delivered to the output signal line 6 is natural-logarithmically proportional to the integral of the photocurrent. In this way, it is possible to read out a signal (output current) proportional to the logarithm of the amount of incident light.

(2) The Operation Performed to Reset Each Pixel

Figure 8:
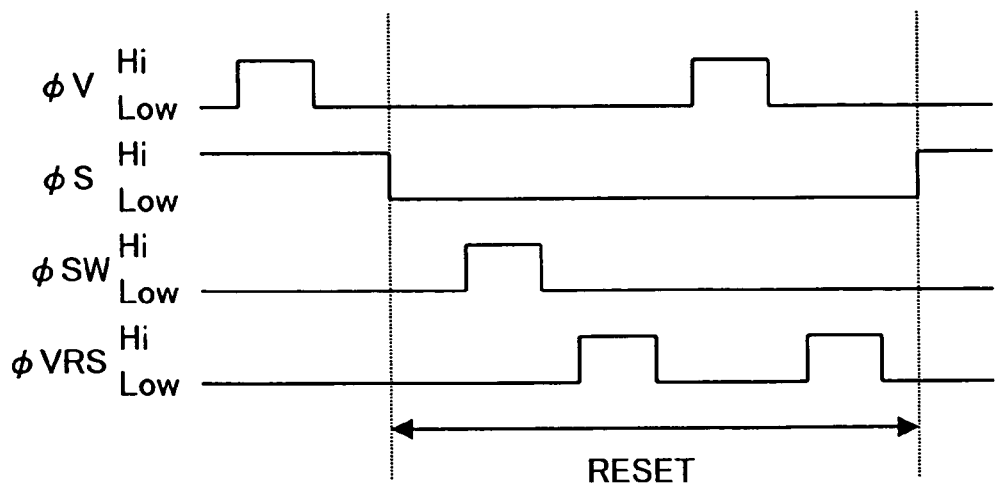
FIG. 8 is a timing chart of the signals fed to the constituent circuit elements of each pixel used in the second embodiment.

Now, how this pixel, having a circuit configured as shown in FIG. 7, is reset will be described with reference to the drawings. FIG. 8 is a timing chart of the signals fed, during a reset operation, to the individual signal lines connected to the constituent circuit elements of each pixel.

After, as described under (1) above, the pulse signal φV is fed to the gate of the MOS transistor T5 and an output signal is output, first, the signal φS is turned to a low level to turn the MOS transistor T1 off. This causes the MOS transistor T2 to be disconnected from the photodiode PD. As a result, the potentials at the drain and the sub-gate region of the MOS transistor T2 start being reset to their original levels, but the resetting slows down when those potentials reach certain levels.

Next, the voltage φSW fed to the gate of the MOS transistor T4 is turned to a high level to turn this MOS transistor T4 on. This causes the direct-current voltage VPD to be applied to the drain and the gate of the MOS transistor T4, and thus the potential at the sub-gate region of the MOS transistor T2 settles to the potential that is determined by the gate-to-drain threshold level of the MOS transistor T2. Subsequently, the voltage φSW applied to the gate of the MOS transistor T4 is turned to a low level to turn this MOS transistor T4 off, so that the potentials in the MOS transistor T2 are reset to their original levels. Simultaneously, the gate voltage of the MOS transistor T3 is also reset.

After the MOS transistor T2 is reset in this way, the signal φVRS is turned to a high level to turn the MOS transistor T7 on to reset the capacitor C and the potential at the node "a", and then the signal φVRS is turned back to a low level. Thereafter, the pulse signal φV is fed to the MOS transistor T5, so that the output current obtained during the reset operation is delivered to the output signal line 6 and is acquired as compensation data to be used to correct the output from each pixel. Then, the voltage of the pulse signal φVRS is once again fed to the gate of the MOS transistor T7 to reset the capacitor C to its original state. Subsequently, the signal φS is turned to a high level to bring the MOS transistor T1 into a conducting state in preparation for an image sensing operation.

Third Embodiment

Figure 9:
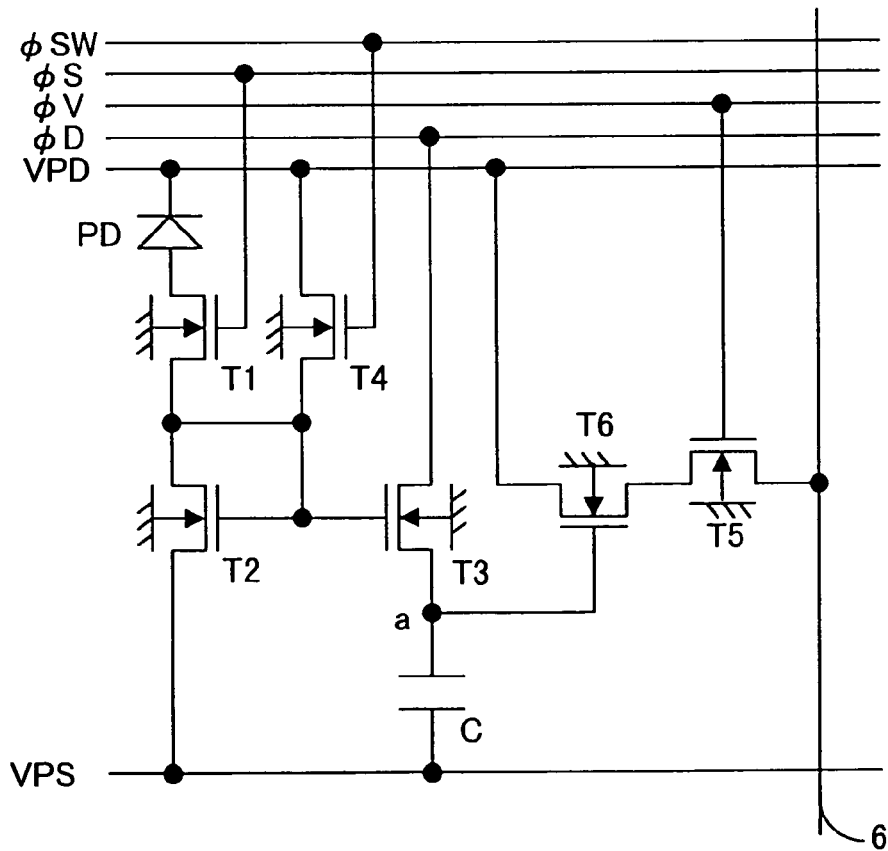
FIG. 9 is a circuit diagram showing the configuration of each pixel in a third embodiment of the invention.

A third embodiment of the invention will be described below with reference to the drawings. FIG. 9 is a circuit diagram showing the configuration of each pixel provided in the solid-state image-sensing device of this embodiment. In the following descriptions, such circuit elements, signal lines, and others as serve the same purposes as in the pixel shown in FIG. 7 are identified with the same reference numerals or symbols, and their detailed explanations will not be repeated.

As shown in FIG. 9, in this embodiment, initialization of the capacitor C and the potential at the node "a" is achieved by feeding a signal φD to the drain of the MOS transistor T3. This makes it possible to omit the MOS transistor T7 found in the previous (second) embodiment. In other respects, the pixel of this embodiment is configured in the same manner as that of the second embodiment (FIG. 7). Here, as in the first embodiment (FIG. 2), in a period in which the signal φD is at a high level, the capacitor C performs integration; in a period in which the signal φD is at a low level, the electric charge accumulated in the capacitor C is discharged through the MOS transistor T3, so that the voltage at the capacitor C, and thus the voltage at the gate of the MOS transistor T6, becomes substantially equal to the low-level voltage of the signal φD (i.e. is reset). In this embodiment, the omission of the MOS transistor T7 contributes to a simpler circuit configuration.

In this embodiment, when an image sensing operation is performed, as in the second embodiment, the MOS transistor T1 is turned on, and the signal φSW is turned to a low level to turn the MOS transistor T4 off, so that the MOS transistor T2 operates in a subthreshold region. Then, the signal φD is turned to a high level so that an amount of electric charge equivalent to the value obtained by natural-logarithmically converting the integral of the photocurrent is accumulated in the capacitor C. Then, with predetermined timing, the MOS transistor T5 is turned on, so that a current proportional to the voltage at the gate of the MOS transistor T6 is delivered, through the MOS transistors T5 and T6, to the output signal line 6.

When a reset operation is performed, as in the first embodiment, the signals are controlled with the timing shown in FIG. 3. Specifically, as in the first embodiment, after the pulse signal φV is fed in, first, the signal φS is turned to a low level to turn the MOS transistor T1 off, and this starts a reset operation. Next, the pulse signal φSW is fed to the gate of the MOS transistor T4 to reset the gate voltage and the drain voltage of the MOS transistor T2 and the gate voltage of the MOS transistor T3.

Then, the voltage of the signal φD is turned to a low level to discharge the capacitor C and to reset the potential at the node "a" to its original level, and then the voltage of the signal φD is turned back to a high level. Thereafter, the pulse signal φV is fed to the MOS transistor T5, so that the output current obtained during the reset operation is delivered to the output signal line 6 and is acquired as compensation data to be used to correct the output from each pixel. Then, the voltage of the signal φD is once again turned to a low level to reset the capacitor C to its original state, and then the voltage of the signal φD is turned back to a high level. Subsequently, the signal φS is turned to a high level to bring the MOS transistor T1 into a conducting state in preparation for an image sensing operation.

Fourth Embodiment

Figure 10:
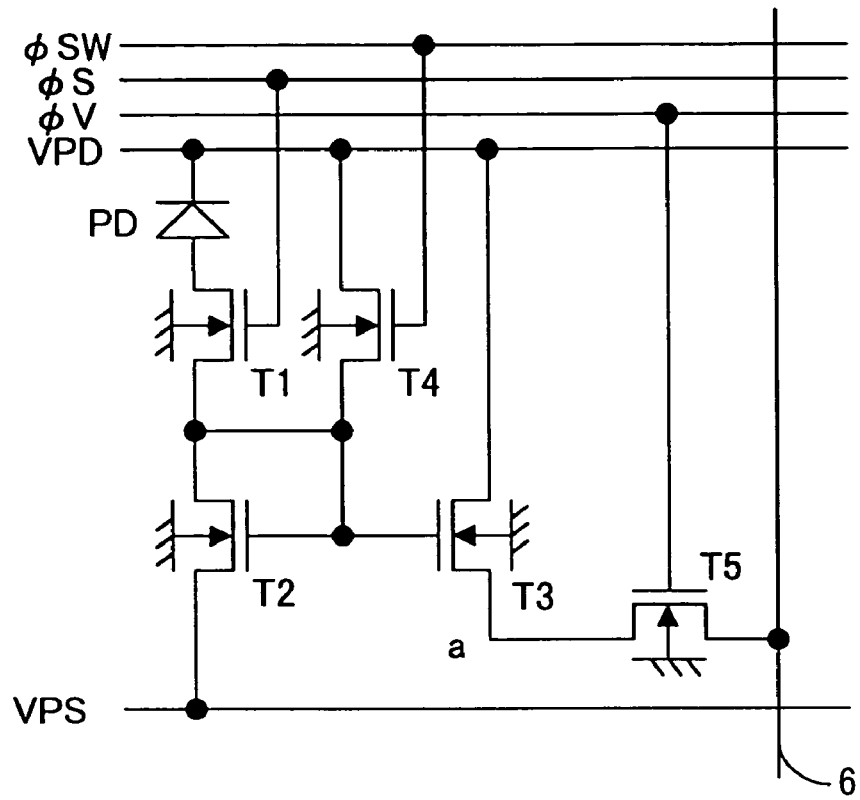
FIG. 10 is a circuit diagram showing the configuration of each pixel in a fourth embodiment of the invention.

A fourth embodiment of the invention will be described below with reference to the drawings. FIG. 10 is a circuit diagram showing the configuration of each pixel provided in the solid-state image-sensing device of this embodiment. In the following descriptions, such circuit elements, signal lines, and others as serve the same purposes as in the pixel shown in FIG. 9 are identified with the same reference numerals or symbols, and their detailed explanations will not be repeated.

As shown in FIG. 10, in this embodiment, the direct-current voltage VPD is applied to the drain of the MOS transistor T3, and the capacitor C and the MOS transistor T6 found in the previous (third) embodiment are omitted. That is, the source of the MOS transistor T3 is connected to the drain of the MOS transistor T5. In other respects, the pixel of this embodiment is configured in the same manner as that of the third embodiment (FIG. 9).

In this pixel having a circuit configured as described above, when an image sensing operation is performed, as in the third embodiment, the MOS transistor T1 is turned on and the signal φSW is turned to a low level to turn the MOS transistor T4 off, so that the MOS transistor T2 operates in a subthreshold level. As a result of the MOS transistor T2 operating in this way, a current natural-logarithmically proportional to the photocurrent flows through the MOS transistor T3 as its drain current.

Then, the pulse signal φV is fed to the gate of the MOS transistor T5 to turn this MOS transistor T5 on, so that a current natural-logarithmically proportional to the photocurrent flows through the MOS transistor T5 as its drain current, and is delivered to the output signal line 6. As a result, the drain voltage of the MOS transistor Q1 (FIG. 6), which is determined by the on-state resistances of the MOS transistors T3 and Q1 and the current flowing therethrough, appears, as an output signal, on the output signal line 6. After this signal is read out, the MOS transistor T5 is turned off.

Figure 11:
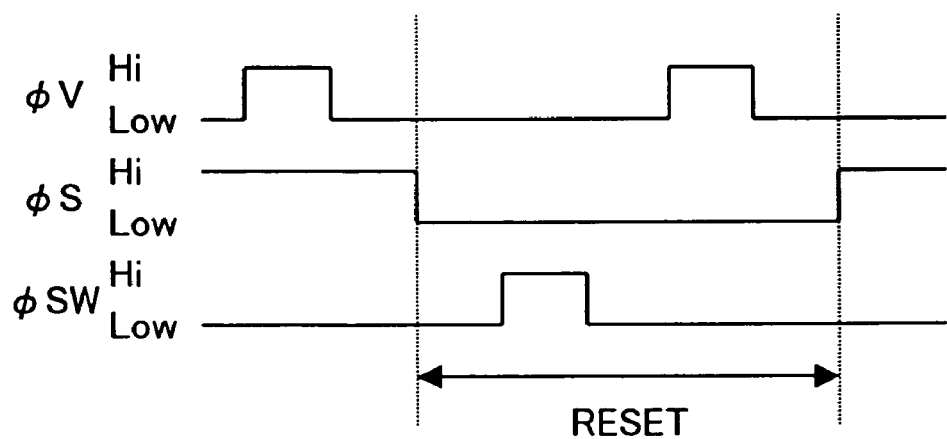
FIG. 11 is a timing chart of the signals fed to the constituent circuit elements of each pixel used in the fourth embodiment.

On the other hand, when a reset operation is performed, the signals are controlled as shown in the timing chart of FIG. 11. After the pulse signal φV is fed in, first, the signal φS is turned to a low level to turn the MOS transistor T1 off, and this starts a reset operation. Next, the pulse signal φSW is fed to the gate of the MOS transistor T4 to reset the gate voltage and the drain voltage of the MOS transistor T2 and the gate voltage of the MOS transistor T3.

Then, the pulse signal φV is fed to the gate of the MOS transistor T5, so that the output voltage obtained during the reset operation is delivered to the output signal line 6 and is acquired as compensation data to be used to correct the output from each pixel. After the compensation data is acquired in this way, the MOS transistor T5 is turned off, and then the signal φS is turned to a high level to turn the MOS transistor T1 on in preparation for the next image sensing operation.

In this embodiment, it is not necessary to perform integration of the photoelectric signal by the use of a capacitor C as performed in the third embodiment described previously, and thus no time is required for such integration, nor is it necessary to reset the capacitor C. This ensures accordingly faster signal processing. Moreover, in this embodiment, as compared with the third embodiment, the capacitor C and the MOS transistor T6 can be omitted, and this helps further simplify the circuit configuration and reduce the pixel size.

Pixel Configurations Including a Depletion-Mode MOS Transistor

Figure 12:
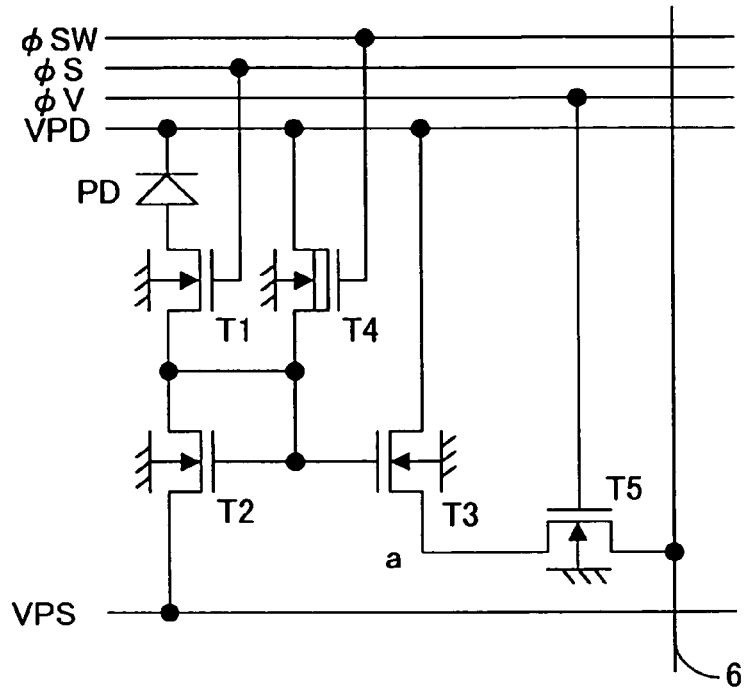
FIG. 12 is a circuit diagram showing another example of the configuration of each pixel in the fourth embodiment.

In the first to fourth embodiments (FIGS. 2, 7, 9, and 10), the MOS transistor T4 may be formed as a depletion-mode N-channel MOS transistor. In that case, for example, the pixel of the fourth embodiment (FIG. 10) has a circuit configuration as shown in FIG. 12. As shown in FIG. 12, all the MOS transistors T1 to T5 except the MOS transistor T4 are enhancement-mode N-channel MOS transistors.

Where, as in the pixel configured as shown in FIG. 10, all the MOS transistors provided within the pixel are enhancement-mode MOS transistors, the MOS transistors T2 and T4 are connected in series, and therefore the high-level voltage of the signal φSW fed to the gate of the MOS transistor T4 is normally higher than the voltage supplied to the pixel. Accordingly, it is usually necessary to provide a separate power source for feeding the signal φSW to the MOS transistor T4.

By contrast, by using as this MOS transistor T4 a depletion-mode MOS transistor as described above, it is possible to lower the high-level voltage of the signal φSW fed to the gate thereof, and thus make this high-level voltage equal to the high-level signals fed to the other MOS transistors. The reason is that a depletion-mode MOS transistor has a negative threshold level and can thus be turned on with a lower gate voltage than with an enhancement-mode MOS transistor.

Pixel Configurations Including a P-Channel MOS Transistor

Figure 13:
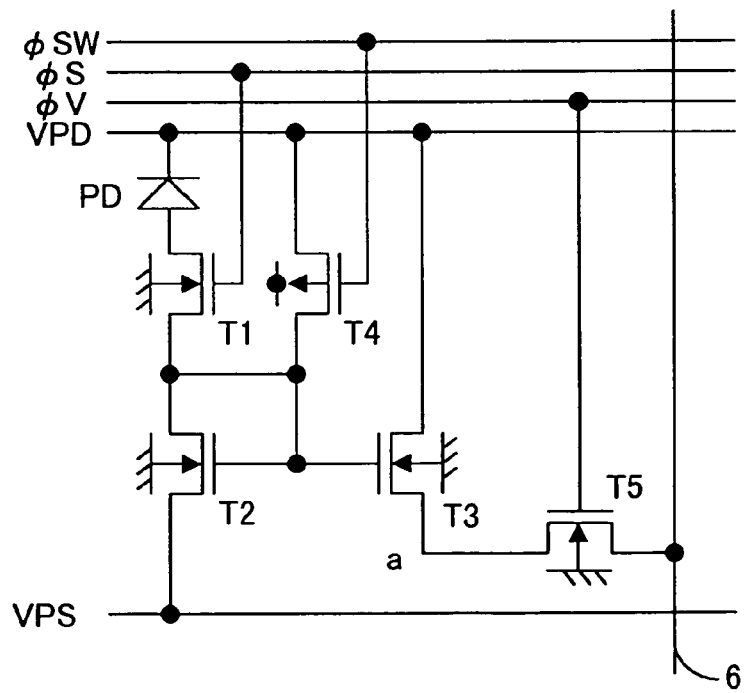
FIG. 13 is a circuit diagram showing another example of the configuration of each pixel in the fourth embodiment.

Alternatively, in the first to fourth embodiments, the MOS transistor T4 may be formed as a P-channel MOS transistor. In that case, for example, the pixel of the fourth embodiment has a circuit configuration as shown in FIG. 13. As shown in FIG. 13, all the MOS transistors T1 to T5 except the MOS transistor T4 are N-channel MOS transistors. Moreover, the MOS transistor T4 receives at its source the direct-current voltage VPD, and has its drain connected to the drain and the gate of the MOS transistor T2.

In this circuit configuration, the MOS transistor T4 is turned on when its gate-to-drain voltage difference is greater than its threshold level, and is turned off when its gate-to-drain voltage difference is smaller than its threshold level.

Accordingly, the signal φSW fed to the gate of the MOS transistor T4 has an inverted level-shift pattern as compared with the signal φSW in the first to fourth embodiments. Moreover, the MOS transistor T4 can be turned on and off without being affected by the MOS transistor T2 that is connected in series with the drain of the MOS transistor T4.

Moreover, since the MOS transistor T4 can be turned on and off without being affected by the MOS transistor T2, there is no need to provide a separate power source for feeding the signal φSW. Furthermore, this circuit configuration permits the MOS transistor T4 to be formed as an enhancement-mode MOS transistor like all the other MOS transistors, and thus allows the MOS transistor T4 to be produced together with the other MOS transistors in a single step. This helps simplify the manufacturing process as compared with the circuit configuration described above in which only the MOS transistor T4 is formed as a depletion-mode MOS transistor.

In the first to fourth embodiments, instead of or in addition to the MOS transistor T4, the MOS transistor T1 may be formed as a depletion-mode MOS transistor or a P-channel MOS transistor. Forming the MOS transistor T1 in this way provides the same advantages as when the MOS transistor T4 is formed as a depletion-mode MOS transistor or a P-channel MOS transistor.

Fifth Embodiment

Figure 14:
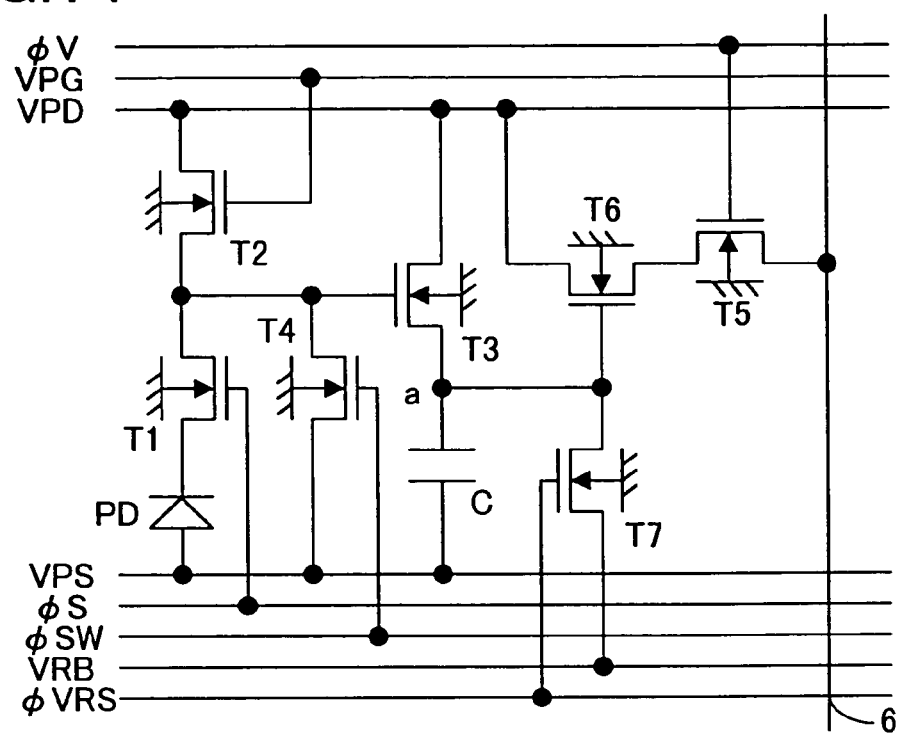
FIG. 14 is a circuit diagram showing the configuration of each pixel in a fifth embodiment of the invention.

A fifth embodiment of the invention will be described below with reference to the drawings. FIG. 14 is a circuit diagram showing the configuration of each pixel provided in the solid-state image-sensing device of this embodiment. In the following descriptions, such circuit elements, signal lines, and others as serve the same purposes as in the pixel shown in FIG. 7 are identified with the same reference numerals or symbols, and their detailed explanations will not be repeated.

As shown in FIG. 14, in this embodiment, the MOS transistors T3, T5, T6, and T7 and the capacitor C, which constitute the output-side portion of the pixel, are configured in the same manner as in the pixel shown in FIG. 7. In this pixel configured as shown in FIG. 14, the direct-current voltage VPS is applied to the anode of the photodiode PD, and the direct-current voltage VPD is fed to the drain of the MOS transistor T2, of which the source is connected to the gate of the MOS transistor T3. The MOS transistor T1 has its drain connected to the source of the MOS transistor T2, and has its source connected to the cathode of the photodiode PD. The source of the MOS transistor T2 is connected to the drain of the MOS transistor T4, and the direct-current voltage VPS is applied also to the source of this MOS transistor T4. Moreover, the direct-current voltage VPG is fed to the gate of the MOS transistor T2, a signal φS is fed to the gate of the MOS transistor T1, and a signal φSW is fed to the gate of the MOS transistor T4. This pixel configured as described above performs a reset operation and an image sensing operation as described below.

(1) The Operation Performed to Convert the Light Incident on Each Pixel into an Electric Signal First, the operation will be described that is performed when the signal φS is turned to a high level to turn the MOS transistor T1 on so that the MOS transistor T2 operates in a subthreshold region. During this operation, the MOS transistor T4, receiving at its gate a low level as the signal φSW, remains off, and therefore can be regarded as practically nonexistent.

When light is incident on the photodiode PD, a photocurrent is generated therein, and, due to the subthreshold characteristics of a MOS transistor, a voltage natural-logarithmically proportional to the photocurrent appears at the source of the MOS transistor T2 and at the gate of the MOS transistor T3. Here, the photoelectric charge generated in the photodiode PD is negative, and therefore flows into the MOS transistor T2 through its source. Thus, the more intense the incident light, the lower the source voltage of the MOS transistor T2 becomes.

When a voltage natural-logarithmically proportional to the photocurrent appears at the gate of the MOS transistor T3 in this way, first, a high level is fed as the signal φVRS to the gate of the MOS transistor T7 to turn this MOS transistor T7 and thereby reset the capacitor C and the voltage at the node "a". Here, to permit the MOS transistor T3 to operate, the voltage at the node "a" is reset to a voltage lower than the surface potential that is determined by the gate voltage of the MOS transistor T3. Next, the signal φVRS is turned to a low level to turn off the MOS transistor T7, and then the signal φV is turned to a high level to turn the MOS transistor T5 on.

Here, as a result of the voltage at the node "a" being reset by the MOS transistor T7, the MOS transistor T3 operates in such a way that a voltage obtained by sampling the surface potential that is determined by the gate voltage of the MOS transistor T3 is fed to the gate of the MOS transistor T6. Thus, the voltage at the gate of the MOS transistor T6 is natural-logarithmically proportional to the amount of incident light, and therefore, when the MOS transistor T5 is turned on, a current or voltage natural-logarithmically proportional to the photocurrent is delivered, through the MOS transistors T6 and T5, to the output signal line 6. In this way, a signal (output current) proportional to the logarithm of the amount of incident light is read out. Then, the MOS transistor T5 is turned off.

(2) The Operation Performed to Reset Each Pixel

Figure 15:
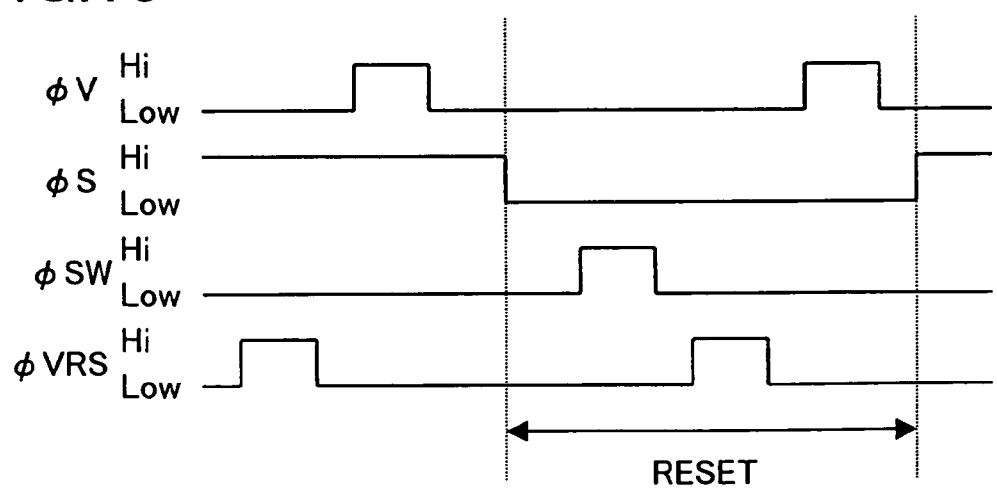
FIG. 15 is a timing chart of the signals fed to the constituent circuit elements of each pixel used in the fifth embodiment.
Figure 16A:
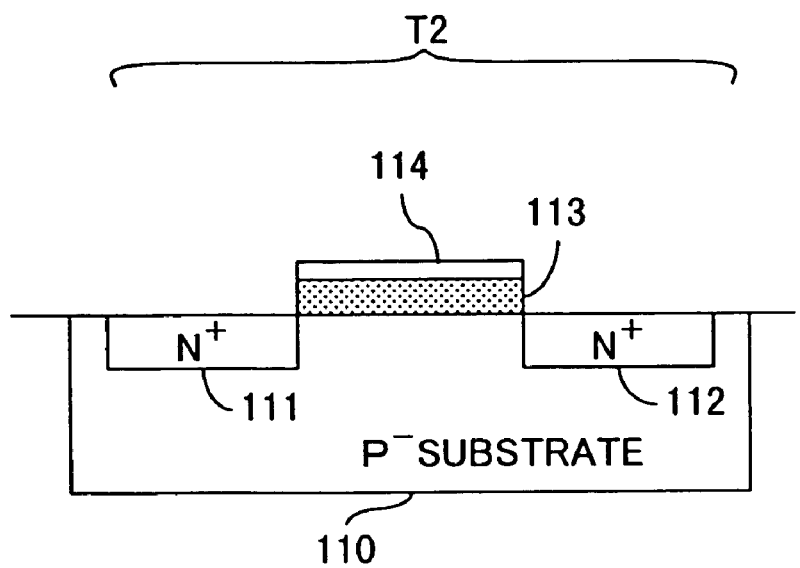
FIG. 16A is a diagram showing the structure of each pixel shown in FIG. 14.
Figure 16B:
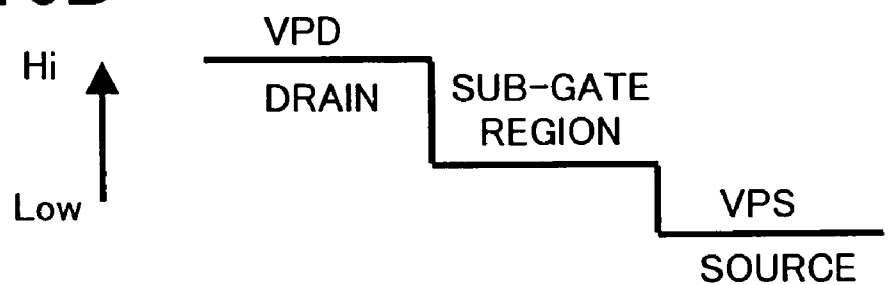
FIGS. 16B and 16C are diagrams showing the potential relationship.
Figure 16C:
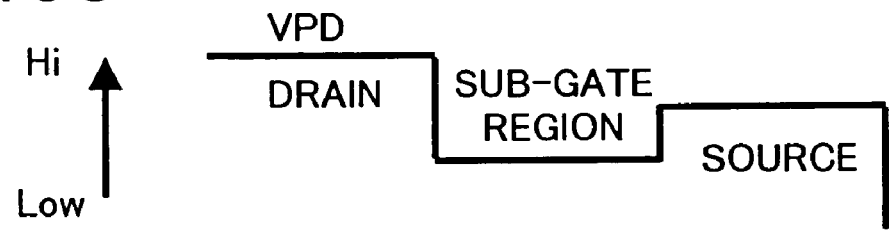

Now, how this pixel, having a circuit configured as shown in FIG. 14, is reset will be described with reference to the drawings. FIG. 15 is a timing chart of the signals fed, during a reset operation, to the individual signal lines connected to the constituent circuit elements of each pixel. FIG. 16A is, like FIG. 4A, a diagram showing the structure of the MOS transistor T2, and FIGS. 16B and 16C are diagrams showing the potential relationship observed in the MOS transistor T2.

After, as described above, the pulse signal φVRS is fed to the MOS transistor T7 to reset the voltage at the node "a" and then the pulse signal φV is fed to the gate of the MOS transistor T5 to read out an output signal, first, the signal φS is turned to a low level to turn the MOS transistor T1 off, and then the signal φSW is turned to a high level to turn the MOS transistor T4 on. As a result, as shown in FIG. 16B, the potential at the source of the MOS transistor T2 drops down to the potential of the voltage VPS.

Next, the signal φSW is turned to a low level to turn the MOS transistor T4 off. This causes the potential at the source of the MOS transistor T2 to rise targeting, as shown in FIG. 16C, at the potential corresponding to the gate-to-source threshold level of the MOS transistor T2. Then, the pulse signal φVRS is fed to the gate of the MOS transistor T7 to reset the voltage at the node "a", and then the pulse signal φV is fed to the gate of the MOS transistor T5 to read out an output signal.

The output signal thus read out is proportional to the threshold voltage of the MOS transistor T2, and is thus acquired as compensation data to be used to correct the output from each pixel. Finally, the signal φS is turned to a high level to turn the MOS transistor T1 on in preparation for an image sensing operation.

Here, as in the third embodiment (FIG. 9), the pixel may be so configured that a pulse signal (for example, φVPDA) is fed to the drain of the MOS transistor T3 so that this pulse signal φVPDA enables the MOS transistor T3 to reset the voltage at the node "a". This makes it possible to omit the MOS transistor T7 from the pixel configured as shown in FIG. 14.

Sixth Embodiment

Figure 17:
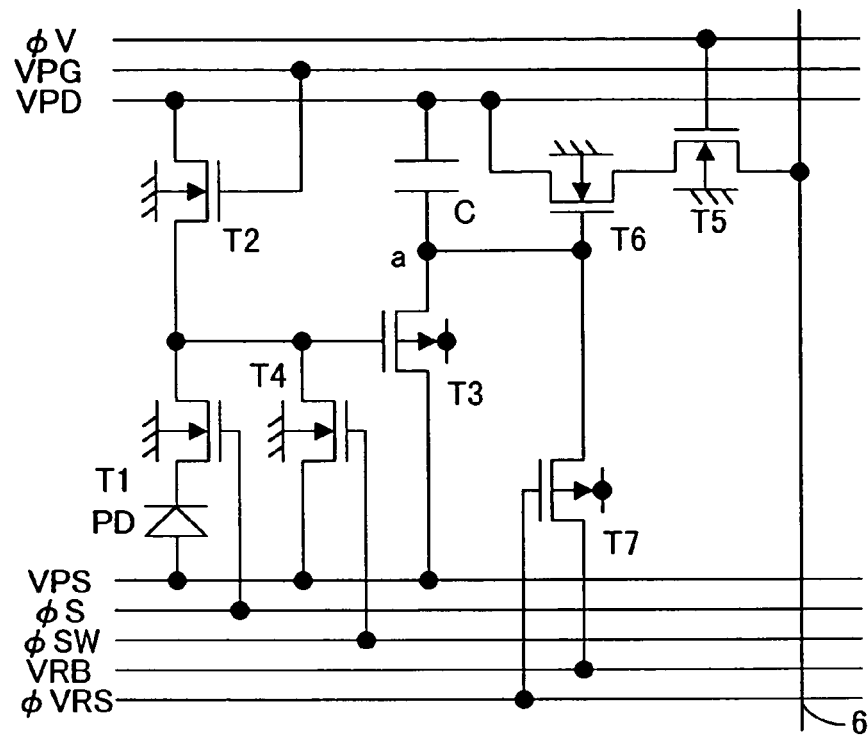
FIG. 17 is a circuit diagram showing the configuration of each pixel in a sixth embodiment of the invention.

A sixth embodiment of the invention will be described below with reference to the drawings. FIG. 17 is a circuit diagram showing the configuration of each pixel provided in the solid-state image-sensing device of this embodiment. In the following descriptions, such circuit elements, signal lines, and others as serve the same purposes as in the pixel shown in FIG. 14 are identified with the same reference numerals or symbols, and their detailed explanations will not be repeated.

As shown in FIG. 17, in this embodiment, as compared with the pixel shown in FIG. 14, the MOS transistors T3 and T7 are replaced with P-channel MOS transistors. Accordingly, the direct-current voltage VPS is applied to the drain of the MOS transistor T3, and the direct-current voltage VPD is applied to one end of the capacitor C, of which the other end is connected to the source of that MOS transistor T3. Moreover, the direct-current voltage VRB is applied to the drain of the MOS transistor T7, and the source of this MOS transistor T7 is connected to the gate of the MOS transistor T6. In other respects, the pixel of this embodiment is configured in the same manner as the pixel shown in FIG. 14. Here, the direct-current voltage VRB applied to the source of the MOS transistor T7 is higher than the direct-current voltage VPS. This pixel configured as described above performs a reset operation and an image sensing operation as described below.

(1) The Operation Performed to Convert the Light Incident on Each Pixel into an Electric Signal First, the operation will be described that is performed when the signal AS is turned to a high level to turn the MOS transistor T1 on so that the MOS transistor T2 operates in a subthreshold region. During this operation, the MOS transistor T4, receiving at its gate a low level as the signal φSW, remains off, and therefore can be regarded as practically nonexistent. Here, it is assumed that the capacitor C and the voltage at the node "a" have already been reset by the MOS transistor T7.

When light is incident on the photodiode PD, a photocurrent is generated therein, and, due to the subthreshold characteristics of a MOS transistor, a voltage natural-logarithmically proportional to the photocurrent appears at the source of the MOS transistor T2 and at the gate of the MOS transistor T3. Here, the photoelectric charge generated in the photodiode PD is negative, and therefore flows into the MOS transistor T2 through its source. Thus, the more intense the incident light, the lower the source voltage of the MOS transistor T2 becomes.

When a voltage natural-logarithmically proportional to the photocurrent appears at the gate of the MOS transistor T3 in this way, since the node "a" has already been reset to a voltage higher than the surface potential that is determined by the gate voltage of the MOS transistor T3, positive electric charge flows out of the capacitor C into the MOS transistor T3. Here, the amount of positive electric charge that flows out of the capacitor C is determined by the gate voltage of the MOS transistor T3. That is, the more intense the incident light and thus the lower the source voltage of the MOS transistor T2, the larger the amount of positive electric charge flowing out of the capacitor C.

In this way, positive electric charge flows out of the capacitor C, and this makes the voltage at the node "a" logarithmically proportional to the integral of the amount of incident light. Then, the pulse signal φV is fed to the MOS transistor T5 to turn this MOS transistor T5 on, so that a current natural-logarithmically proportional to the integral of the photocurrent is delivered, through the MOS transistors T6 and T5, to the output signal line 6. In this way, a signal (output current) proportional to the logarithm of the amount of incident light is read out. Then, the MOS transistor T5 is turned off.

(2) The Operation Performed to Reset Each Pixel

Figure 18:
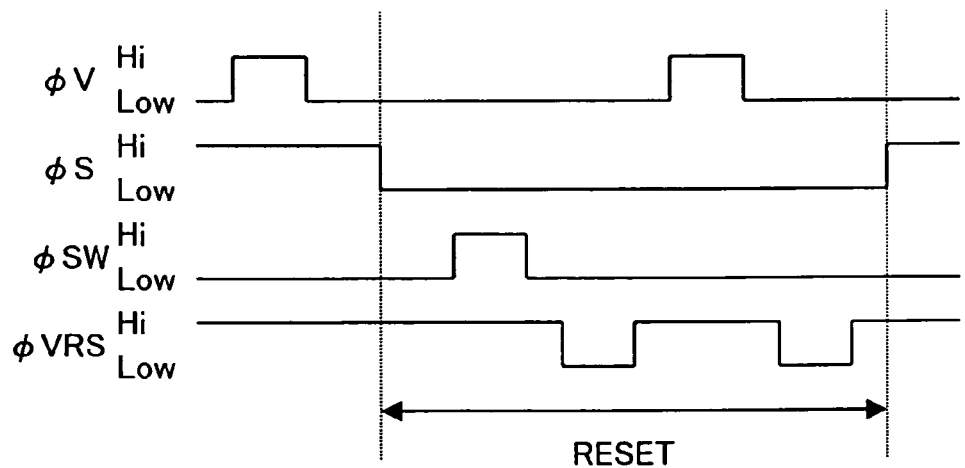
FIG. 18 is a timing chart of the signals fed to the constituent circuit elements of each pixel used in the sixth embodiment.

Now, how this pixel, having a circuit configured as shown in FIG. 17, is reset will be described with reference to the drawings. FIG. 18 is a timing chart of the signals fed, during a reset operation, to the individual signal lines connected to the constituent circuit elements of each pixel. After the pulse signal φV is fed to the gate of the MOS transistor T5 and an output signal is read out as described above, first, as in the fifth embodiment (FIG. 14), the signal φS is turned to a low level to turn the MOS transistor T1 off. Then, the signal φSW is turned to a high level to turn the MOS transistor T4 on to lower the potential at the source of the MOS transistor T2.

Next, the signal φSW is turned to a low level to turn the MOS transistor T4 off. This causes the potential at the source of the MOS transistor T2 to rise targeting at the potential corresponding to the gate-to-source threshold level of the MOS transistor T2. Then, the pulse signal φVRS is fed to the gate of the MOS transistor T7 to reset the voltage at the node "a", and then the pulse signal φV is fed to the gate of the MOS transistor T5 to read out an output signal. Here, the pulse signal φVRS fed to the gate of the MOS transistor T7 is a low-level pulse signal.

The output signal thus read out is proportional to the threshold voltage of the MOS transistor T2, and is thus acquired as compensation data to be used to correct the output from each pixel. Finally, the pulse signal φVRS is fed to the gate of the MOS transistor T7 to reset the voltage at the node "a", and then the signal φS is turned to a high level to turn the MOS transistor T1 on in preparation for an image sensing operation.

Here, as in the third embodiment (FIG. 9), the pixel may be so configured that a pulse signal (for example, φVPS) is fed to the drain of the MOS transistor T3 so that this pulse signal φVPS enables the MOS transistor T3 to reset the voltage at the node "a". This makes it possible to omit the MOS transistor T7 from the pixel configured as shown in FIG. 17. In this case, the pulse signal φVPS fed to the drain of the MOS transistor T3 is fed in by way of a separate power line from that for the direct-current voltage VPS that is applied to the anode of the photodiode PD.

Seventh Embodiment

Figure 19:
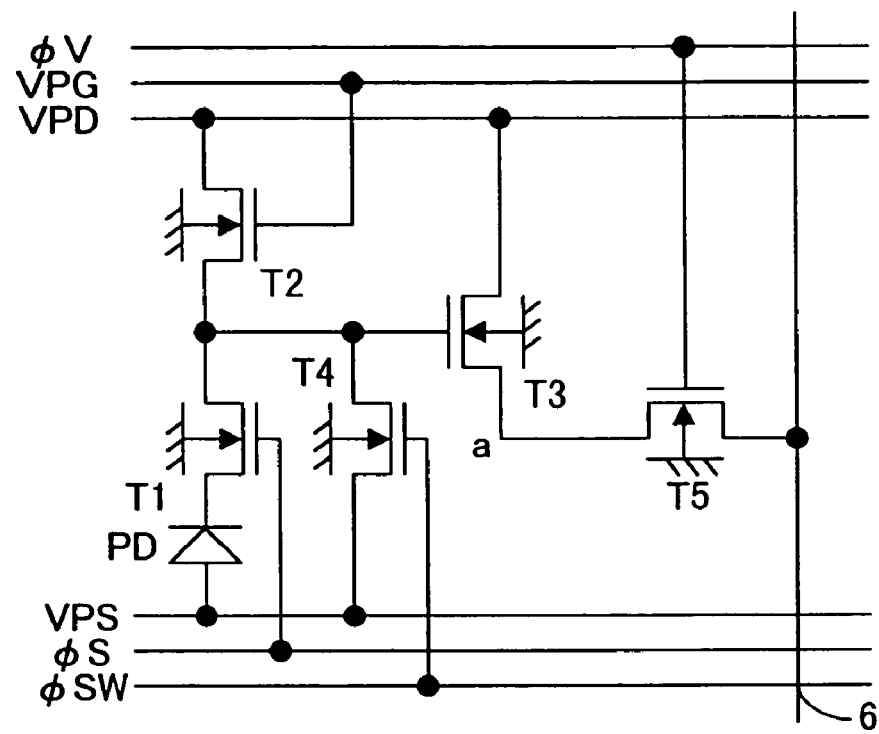
FIG. 19 is a circuit diagram showing the configuration of each pixel in a seventh embodiment of the invention.

A seventh embodiment of the invention will be described below with reference to the drawings. FIG. 19 is a circuit diagram showing the configuration of each pixel provided in the solid-state image-sensing device of this embodiment. In the following descriptions, such circuit elements, signal lines, and others as serve the same purposes as in the pixel shown in FIG. 14 are identified with the same reference numerals or symbols, and their detailed explanations will not be repeated.

As shown in FIG. 19, in this embodiment, the source of the MOS transistor T3 is connected to the drain of the MOS transistor T5. This makes it possible to omit the capacitor C and the MOS transistors T6 and T7. In other respects, the pixel of this embodiment is configured in the same manner as that of the fifth embodiment (FIG. 14). This pixel configured as described above performs a reset operation and an image sensing operation as described below.

(1) The Operation Performed to Convert the Light Incident on Each Pixel into an Electric Signal First, the operation will be described that is performed when the signal φS is turned to a high level to turn the MOS transistor T1 on so that the MOS transistor T2 operates in a subthreshold region. During this operation, the MOS transistor T4, receiving at its gate a low level as the signal φSW, remains off, and therefore can be regarded as practically nonexistent.

When light is incident on the photodiode PD, a photocurrent is generated therein, and, due to the subthreshold characteristics of a MOS transistor, a voltage natural-logarithmically proportional to the photocurrent appears at the source of the MOS transistor T2 and at the gate of the MOS transistor T3. Here, the photoelectric charge generated in the photodiode PD is negative, and therefore flows into the MOS transistor T2 through its source. Thus, the more intense the incident light, the lower the source voltage of the MOS transistor T2 becomes.

When a voltage natural-logarithmically proportional to the photocurrent appears at the gate of the MOS transistor T3 in this way, the pulse signal φV is fed in to turn the MOS transistor T5 on. This causes a current natural-logarithmically proportional to the photocurrent to be delivered, through the MOS transistors T3 and T5, to the output signal line 6. In this way, a signal (output current) proportional to the logarithm of the amount of incident light is read out. Then, the MOS transistor T5 is turned off.

(2) The Operation Performed to Reset Each Pixel

Figure 20:
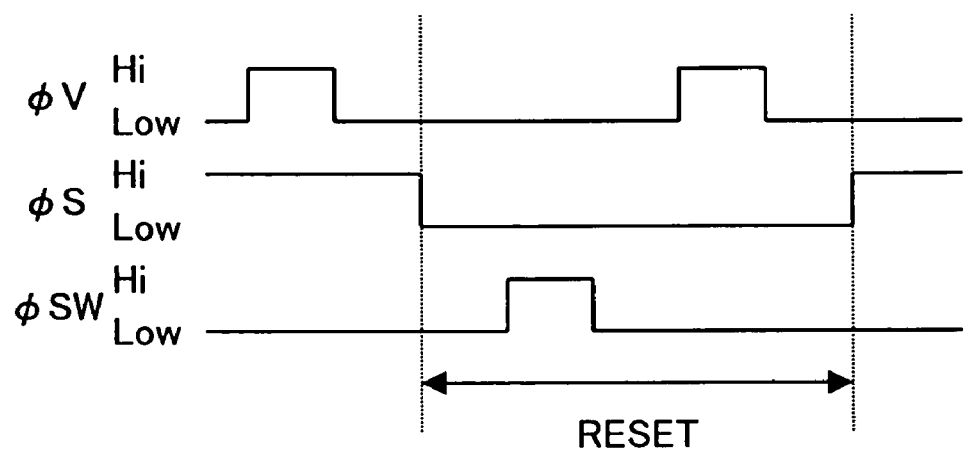
FIG. 20 is a timing chart of the signals fed to the constituent circuit elements of each pixel used in the seventh embodiment.

Now, how this pixel, having a circuit configured as shown in FIG. 19, is reset will be described with reference to the drawings. FIG. 20 is a timing chart of the signals fed, during a reset operation, to the individual signal lines connected to the constituent circuit elements of each pixel. After the pulse signal φV is fed to the gate of the MOS transistor T5 and an output signal is read out as described above, first, as in the fifth embodiment (FIG. 14), the signal φS is turned to a low level to turn the MOS transistor T1 off, and then the pulse signal φSW is fed to the gate of the MOS transistor T4 to reset the potential at the source of the MOS transistor T2. Next, the pulse signal φV is fed to the gate of the MOS transistor T5 to read out an output signal.

The output signal thus read out is proportional to the threshold voltage of the MOS transistor T2, and is thus acquired as compensation data to be used to correct the output from each pixel. Finally, the signal φS is turned to a high level to turn the MOS transistor T1 on in preparation for an image sensing operation.

Third Example of Pixel Configuration

Figure 21:
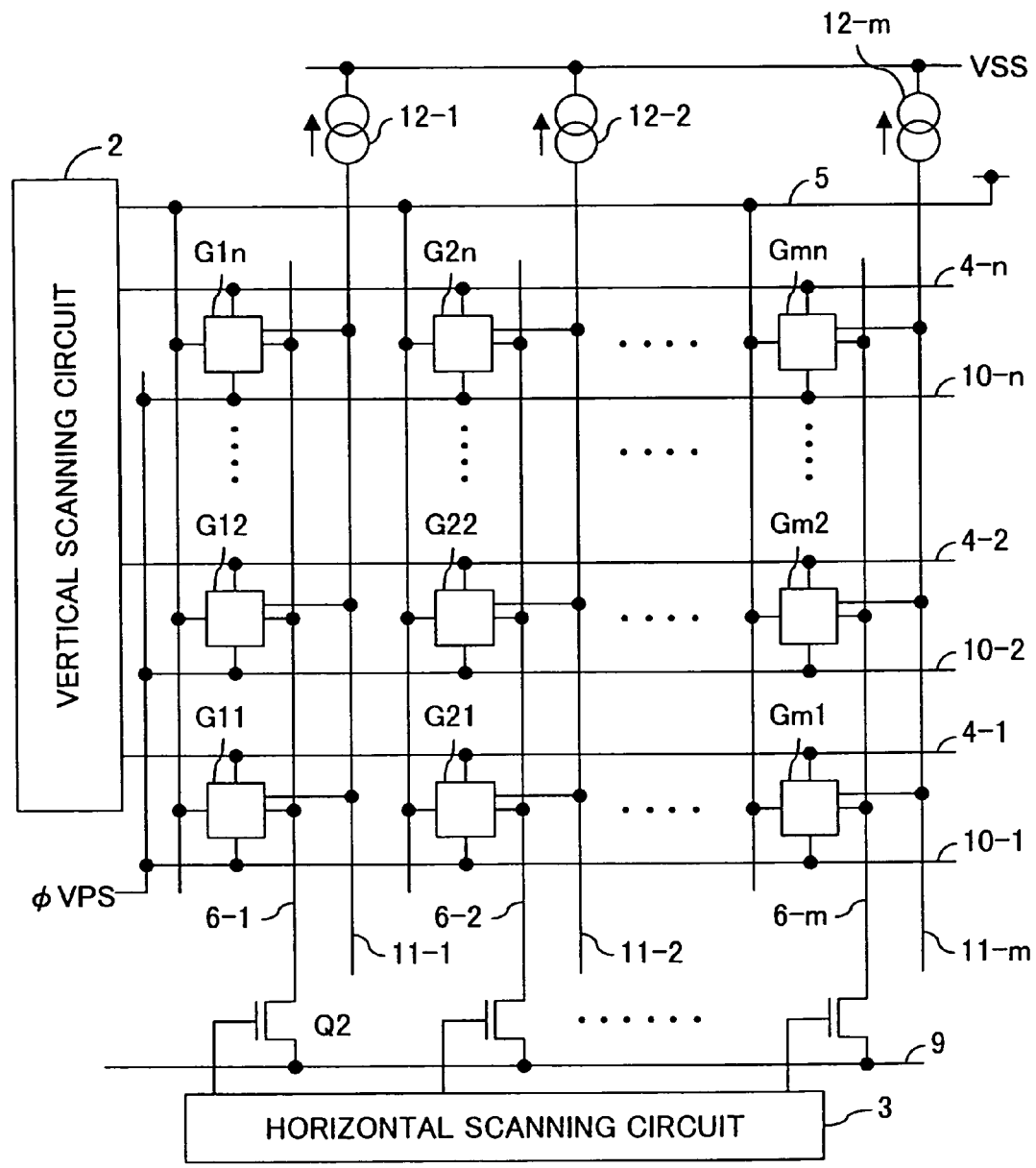
FIG. 21 is a block diagram illustrating the overall configuration of another two-dimensional solid-state image-sensing device embodying the invention.

FIG. 21 schematically shows the configuration of a portion of another two-dimensional MOS-type solid-state image-sensing device embodying the invention. In this figure, such elements as are found also in the configuration shown in FIG. 1 are identified with the same reference numerals or symbols, and their detailed explanations will not be repeated. In the solid-state image-sensing device shown in FIG. 21, constant-current sources 12-1, 12-2, . . . , 12-m are provided one for each column, and are connected by way of current feed lines 11-1, 11-2, . . . , 11-m to the pixels G11 to G1n, G21 to G2n, . . . , Gm1 to Gmn, respectively. Moreover, lines 10-1, 10-2, . . . , 10-n for supplying a direct-current voltage VPS are provided one for each row, and are connected to the pixels G11 to Gm1. G12 to Gm2 . . . G1n to Gmn, respectively.

Figure 22:
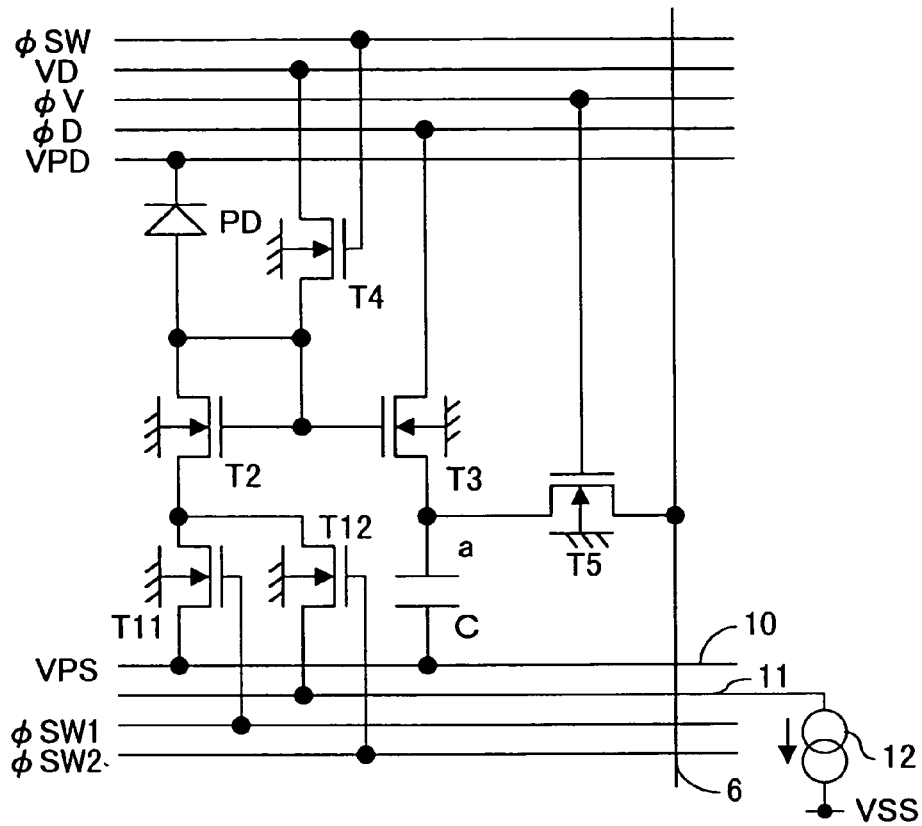
FIG. 22 is a circuit diagram showing the configuration of each pixel in an eighth embodiment of the invention.

The individual pixels are connected not only to the lines 4-1, 4-2, . . . , 4-n, to the lines 10-1, 10-2, . . . , 10-n, to the current feed lines 11-1, 11-2, . . . , 11-m, to the output signal lines 6-1, 6-2, . . . , 6-m, and to the power line 5 mentioned above, but also to other lines (for example, clock lines and bias supply lines). These other lines, however, are omitted in FIG. 21. As will be described later, within each pixel, of which the configuration is shown in FIG. 22, another N-channel MOS transistor T5 functioning as a switch is provided. Whereas this MOS transistor T5 serves to select a row, the MOS transistor Q2 serves to select a column.

Eighth Embodiment

An eighth embodiment (FIG. 22) of the invention, which is applicable to each pixel of the third example of pixel configuration shown in FIG. 21, will be described below with reference to the drawings. In the following descriptions, such circuit elements, signal lines, and others as serve the same purposes as in the pixel shown in FIG. 2 are identified with the same reference numerals or symbols, and their detailed explanations will not be repeated.

In the pixel shown in FIG. 22, as compared with the pixel of the first embodiment (FIG. 2), the MOS transistor T1 is omitted, and the anode of the photodiode PD is connected to the drain of the MOS transistor T2. Moreover, a direct-current voltage VD is applied to the drain of the MOS transistor T4. Furthermore, the source of the MOS transistor T2 is connected to the drains of MOS transistors T11 and T12. These MOS transistors T11 and T12 are, like the MOS transistors T2 to T5, N-channel MOS transistors having their back gates grounded.

The MOS transistor T11 receives at its source the direct-current voltage VPS in FIG. 21). The MOS transistor T12 has its source connected, by way of a line 11 (this line 11 corresponds to the current feed lines 11-1, 11-2, ..., 11-*m* shown in FIG. 21), to one end of a constant-current source 12 (this constant-current source corresponds to the constant-current sources 12-1, 12-2, ..., 12-*m* shown in FIG. 21), which receives at the other end a direct-current voltage VSS. The MOS transistors T11 and T12 receive at their gates signals φSW1 and φSW2, respectively.

(1) The Operation Performed to Convert the Light Incident on Each Pixel into an Electric Signal First, the signals φSW and φSW2 are turned to a low level to turn the MOS transistors T4 and T12 off, and the signal φSW1 is turned to a high level to turn the MOS transistor T11 on so that the MOS transistor T2 operates in a sub-threshold region. Moreover, the signal φD is at a high level, and has a voltage equal or close to the direct-current voltage VPD.

In this state, when light is incident on the photodiode PD, a photocurrent is generated therein, and, due to the sub-threshold characteristics of a MOS transistor, a voltage natural-logarithmically proportional to the photocurrent appears at the gates of the MOS transistors T2 and T3. This voltage causes a current to flow through the MOS transistor T3, and thus an amount of electric charge equivalent to the value obtained by natural-logarithmically converting the integral of the photocurrent is accumulated in the capacitor C. That is, a voltage proportional to the value obtained by natural-logarithmically converting the integral of the photocurrent appears at the node "a" between the capacitor C and the source of the MOS transistor T3. Here, the MOS transistor T5 is assumed to be off.

Next, the pulse signal φV is fed to the gate of the MOS transistor T5 to turn this MOS transistor T5 on, so that the electric charge accumulated in the capacitor C is delivered, as an output current, to the output signal line 6. The current thus delivered to the output signal line 6 is natural-logarithmically proportional to the integral of the photocurrent. In this way, it is possible to read out a signal (output current) proportional to the logarithm of the amount of incident light. After this signal is read out, the MOS transistor T5 is turned off.

(2) The Operation Performed to Reset Each Pixel

Figure 23:
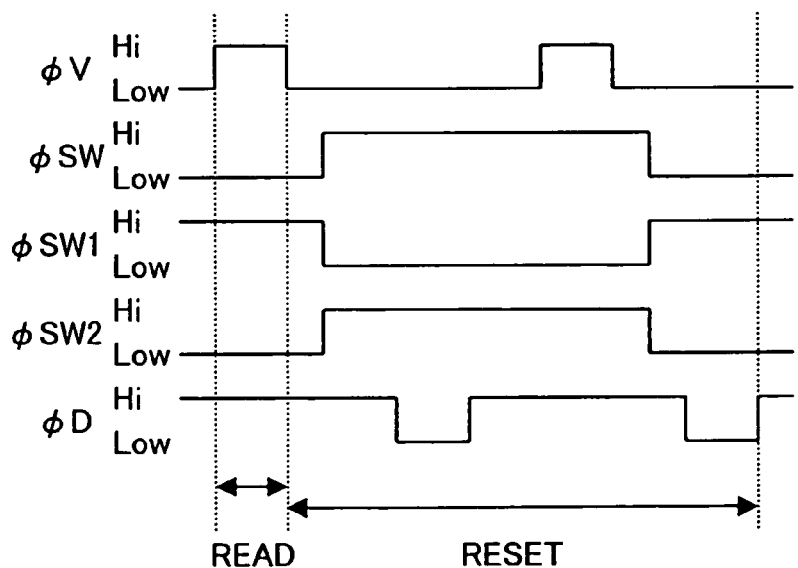
FIG. 23 is a timing chart of the signals fed to the constituent circuit elements of each pixel used in the eighth embodiment.

Now, how this pixel, having a circuit configured as shown in FIG. 22, is reset will be described with reference to the drawings. FIG. 23 is a timing chart of the signals fed, during a reset operation, to the individual signal lines connected to the constituent circuit elements of each pixel.

After, as described under (1) above, the pulse signal φV is fed to the gate of the MOS transistor T5 and an output signal is output, first, the signals φSW and φSW2 are turned to a high level to turn the MOS transistors T4 and T12 on, and the signal φSW1 is turned to a low level to turn the MOS transistor T11 off. This permits the current flowing through the constant-current source 12 to flow through the MOS transistor T2. Here, the current flowing through the constant-current source 12 is far higher than the photocurrent output from the photodiode PD, and therefore the drain current of the MOS transistor T2 is substantially equal to the current supplied from the constant-current source 12. Then, the signal φD is turned to a low level to discharge the electric charge accumulated in the capacitor C through the MOS transistor T3 to the signal line of the signal φD and thereby initialize the capacitor C and the potential at the node "a", and then the signal φD is turned back to the high level.

While the signals φSW and φSW2 are kept at a high level and the signal φSW1 is kept at a low level in this way, a constant current flows through the MOS transistor T2. Thus, the source-to-gate voltage of the MOS transistor T2 is determined by the drain current of the MOS transistor T2, and is thereby initialized. After the gate voltage of the MOS transistor T2 is reset to its initial level in this way, the pulse signal φV is fed to the gate of the MOS transistor T5, so that the output signal (output current) obtained during the reset operation is output to the output signal line 6.

After the output signal obtained during the reset operation is read out in this way, the signals φSW and the φSW2 are turned to a low level to turn the MOS transistor T4 and T12 off, and the signal φSW1 is turned to a high level to turn the MOS transistor T11 on. Subsequently, the signal φD is turned to a low level to discharge the electric charge accumulated in the capacitor C through the MOS transistor T3 to the signal line of the signal φD and thereby initialize the capacitor C and the potential at the node "a". Then, the signal φD is turned back to a high level in preparation for the next image sensing operation.

Fourth Example of Pixel Configuration

Figure 24:
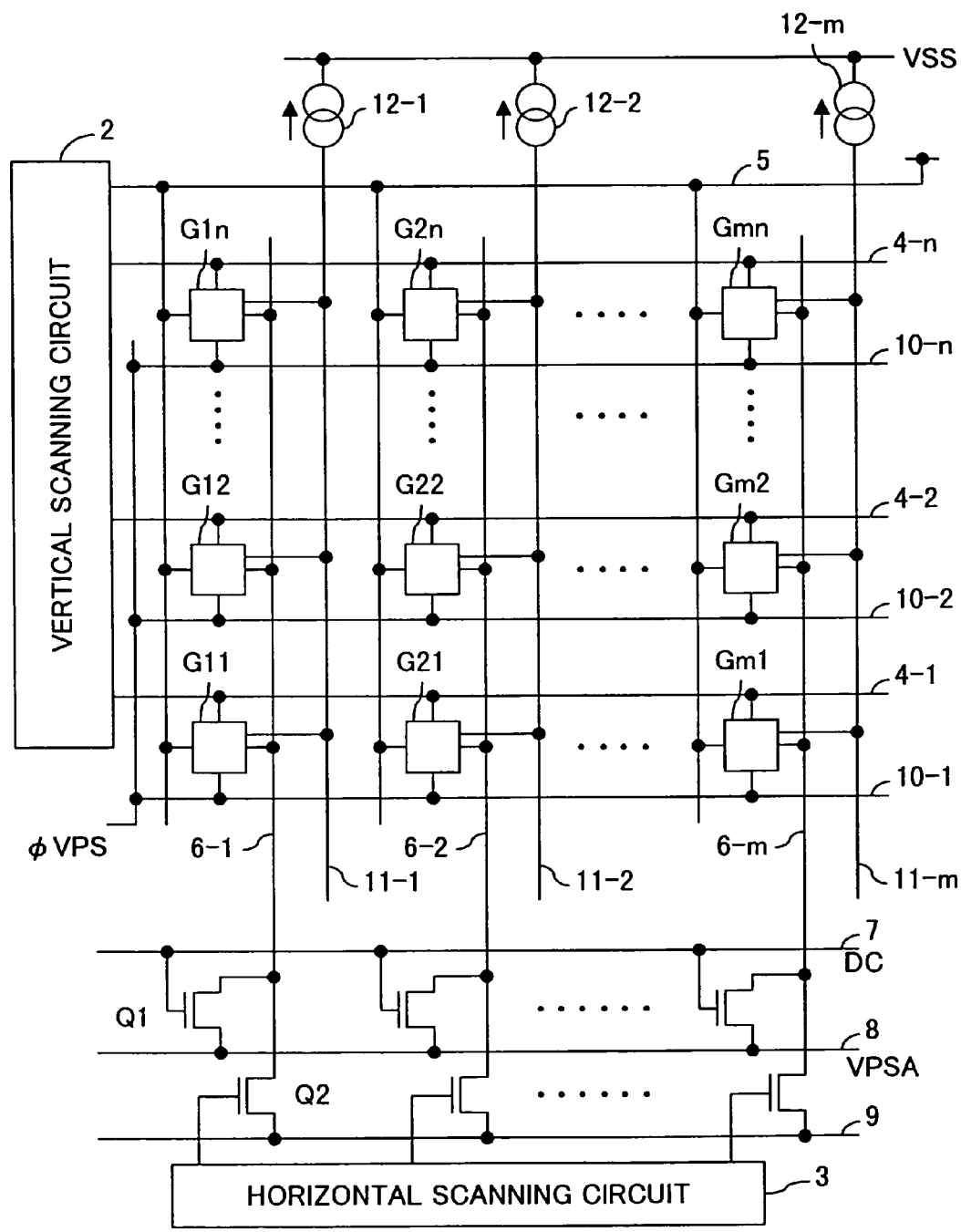
FIG. 24 is a block diagram illustrating the overall configuration of another two-dimensional solid-state image-sensing device embodying the invention.

FIG. 24 schematically shows the configuration of a portion of another two-dimensional MOS-type solid-state image-sensing device embodying the invention. In this figure, such elements as are found also in the configuration shown in FIG. 5 are identified with the same reference numerals or symbols, and their detailed explanations will not be repeated. In the solid-state image-sensing device shown in FIG. 24, constant-current sources 12-1, 12-2, ..., 12-*m* are provided one for each column, and are connected by way of current feed lines 11-1, 11-2, ..., 11-*m* to the pixels G11 to G1*n*, G21 to G2*n*, ..., Gm1 to Gmn, respectively. Moreover, lines 10-1, 10-2, ..., 10-*n* for supplying a direct-current voltage VPS are provided one for each row, and are connected to the pixels G11 to Gm1, G12 to Gm2, ..., G1*n* to Gmn, respectively.

The individual pixels are connected not only to the lines 4-1, 4-2, ..., 4-*n*, to the lines 10-1, 10-2, ..., 10-*n*, to the current feed lines 11-1, 11-2, ..., 11-*m*, to the output signal lines 6-1, 6-2, ..., 6-*m*, and to the power line 5 mentioned above, but also to other lines (for example, clock lines and bias supply lines). These other lines, however, are omitted in FIG. 24.

As shown in FIG. 24, for each of the output signal lines 6-1, 6-2, ..., 6-*m*, a pair of N-channel MOS transistors Q1 and Q2 is provided. The MOS transistor Ta provided in each of the pixels G11 to Gmn and the MOS transistor Q1 are interconnected, just as in the second example of picture configuration, as shown in FIG. 6A. The MOS transistor Ta corresponds to the MOS transistor T6 in the ninth and tenth embodiments, and corresponds to the MOS transistor T3 in the eleventh and twelfth embodiments. The MOS transistor Q2 is controlled by the horizontal scanning circuit 3 so as to function as a switching device.

As will be described later, in the embodiments of the invention shown in FIG. 25 and the following figures, within each pixel, another N-channel MOS transistor T5 functioning as a switch is provided. If this MOS transistor T5 is illustrated explicitly, the circuit shown in FIG. 6A has, more precisely, a circuit configuration as shown in FIG. 6B. Specifically, the MOS transistor T5 is inserted between the MOS transistor Q1 and the MOS transistor Ta. Here, the MOS transistor T5 serves to select a row, and the MOS transistor Q2 serves to select a column. It is to be noted that the circuit configurations shown in FIGS. 24, 6A, and 6B are common to the ninth to twelfth embodiments of the invention described hereinafter.

The circuit configuration shown in FIGS. 6A and 6B permits the signal to be output with a high gain. Accordingly, even in a case where the photocurrent generated in a photosensitive element is converted natural-logarithmically to obtain a wider dynamic range and thus the output signal obtained is comparatively low, this amplifier circuit amplifies the signal so as to make it sufficiently high and thus easier to process in the succeeding signal processing circuit (not shown). Here, the MOS transistor Q1 that serves as the load resistor of the amplifier circuit is provided within each pixel; however, such transistors may be provided, instead, one for each of the output signal lines 6-1, 6-2, . . . , 6-$m$ to which the pixels arranged in columns are collectively connected column by column. This helps reduce the number of load resistors or constant-current sources required, and thus reduce the area occupied by the amplifying circuits on a semiconductor chip.

Ninth Embodiment

A ninth embodiment of the invention, which is applicable to each pixel of the fourth example of pixel configuration shown in FIG. 24, will be described below with reference to the drawings. FIG. 25 is a circuit diagram showing the configuration of each pixel provided in the solid-state image-sensing device of this embodiment. In the following descriptions, such circuit elements, signal lines, and others as serve the same purposes as in the pixel shown in FIG. 22 are identified with the same reference numerals or symbols, and their detailed explanations will not be repeated.

Figure 25:
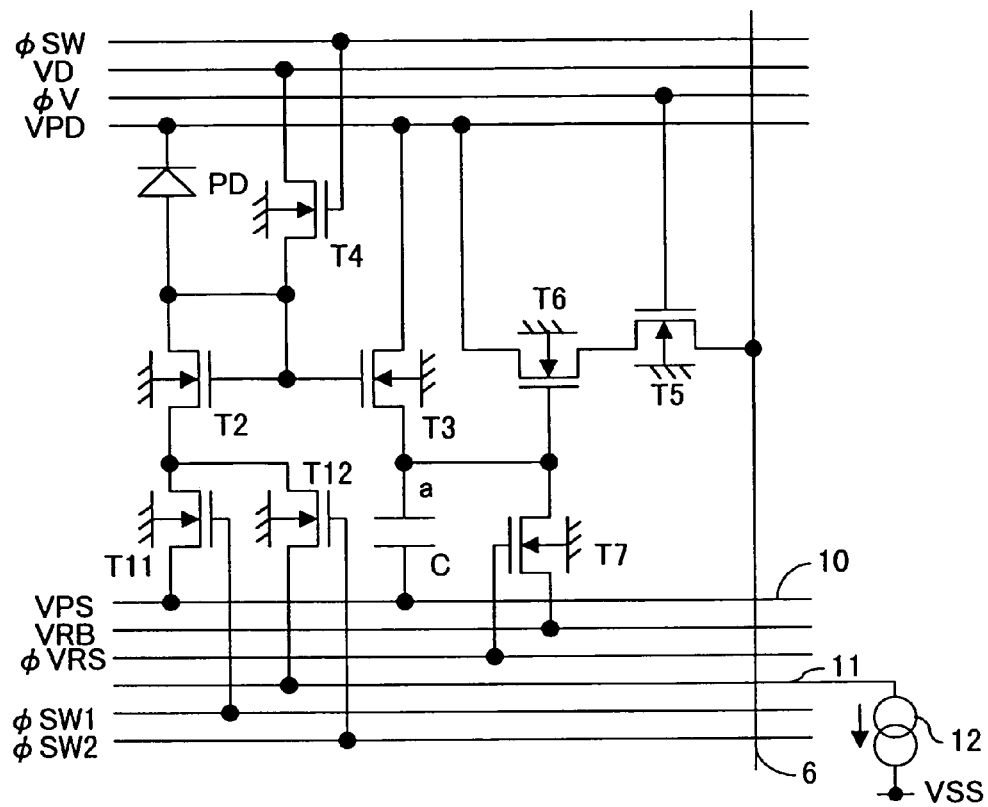
FIG. 25 is a circuit diagram showing the configuration of each pixel in a ninth embodiment of the invention.

As shown in FIG. 25, in this embodiment, as compared with the pixel shown in FIG. 22, a MOS transistor T6 having its gate connected to the node "a" so as to perform current amplification according to the potential at the node "a", and a MOS transistor T7 having its drain connected to the node "a" so as to initialize the capacitor C and the node "a" are additionally provided. The source of the MOS transistor T6 is connected to the drain of the MOS transistor T5 for row selection. The source of the MOS transistor T5 is connected to the output signal line (this output signal line 6 correspond to the output signal lines 6-1, 6-2, . . . , 6-$m$ shown in FIG. 24). The MOS transistors T6 and T7 are N-channel MOS transistors having their back gates grounded.

The direct-current voltage VPD is applied to the drain of the MOS transistor T6, and the signal φV is fed to the gate of the MOS transistor T5. Moreover, a direct-current voltage VRB is applied to the source of the MOS transistor T7, and a signal φVRS is fed to the gate of this MOS transistor T7. Furthermore, in this embodiment, the MOS transistors T2 to T4, T11, and T12 and the capacitor C operate in the same manner as in the eighth embodiment (FIG. 22) to perform a reset operation and an image sensing operation as described below.

(1) The Operation Performed to Convert the Light Incident on Each Pixel into an Electric Signal First, the signals φSW and φSW2 are turned to a low level to turn the MOS transistors T4 and T12 off, and the signal φSW1 is turned to a high level to turn the MOS transistor T11 on so that the MOS transistor T2 operates in a sub-threshold region.

In this state, when light is incident on the photodiode PD, a photocurrent is generated therein, and, due to the sub-threshold characteristics of a MOS transistor, a voltage natural-logarithmically proportional to the photocurrent appears at the gates of the MOS transistors T2 and T3. This voltage causes a current to flow through the MOS transistor T3, and thus an amount of electric charge equivalent to the value obtained by natural-logarithmically converting the integral of the photocurrent is accumulated in the capacitor C. That is, a voltage proportional to the value obtained by natural-logarithmically converting the integral of the photocurrent appears at the node "a" between the capacitor C and the source of the MOS transistor T3. Here, the MOS transistors T5 and T7 are assumed to be off.

Next, the pulse signal φV is fed to the gate of the MOS transistor T5 to turn this MOS transistor T5 on, so that a current proportional to the voltage at the gate of the MOS transistor T6 is delivered, through the MOS transistors T6 and T5, to the output signal line 6. Now, the voltage at the gate of the MOS transistor T6 is equal to the voltage at the node "a", and therefore the current thus delivered to the output signal line 6 is natural-logarithmically proportional to the integral of the photocurrent. In this way, it is possible to read out a signal (output current) proportional to the logarithm of the amount of incident light. After this signal is read out, the MOS transistor T5 is turned off.

(2) The Operation Performed to Reset Each Pixel

Figure 26:
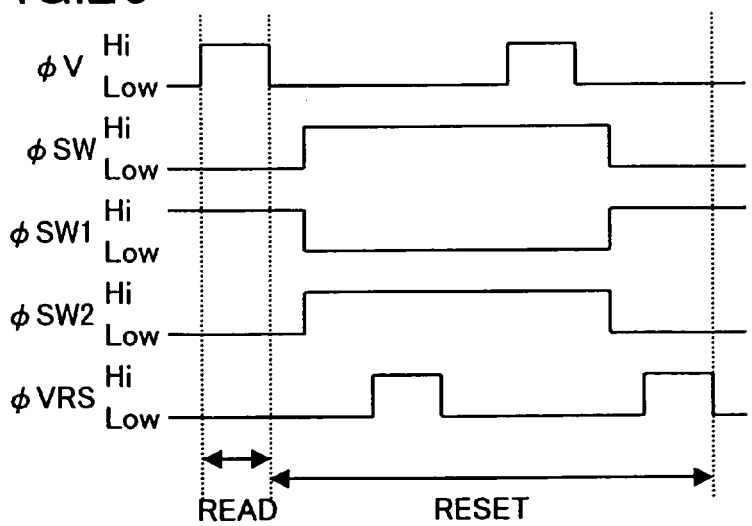
FIG. 26 is a timing chart of the signals fed to the constituent circuit elements of each pixel used in the ninth embodiment.

Now, how this pixel, having a circuit configured as shown in FIG. 25, is reset will be described with reference to the drawings. FIG. 26 is a timing chart of the signals fed, during a reset operation, to the individual signal lines connected to the constituent circuit elements of each pixel.

After, as described under (1) above, the pulse signal φV is fed to the gate of the MOS transistor T5 and an output signal is output, first, the signals φSW and φSW2 are turned to a high level to turn the MOS transistors T4 and T12 on, and the signal φSW1 is turned to a low level to turn the MOS transistor T11 off. This permits the current flowing through the constant-current source 12 to flow through the MOS transistor T2. Here, the current flowing through the constant-current source 12 is far higher than the photocurrent output from the photodiode PD, and therefore the drain current of the MOS transistor T2 is substantially equal to the current supplied from the constant-current source 12. Then, the pulse signal φVRS is fed to the gate of the MOS transistor T7 to discharge the electric charge accumulated in the capacitor C through the MOS transistor T7 to the direct-current voltage line to which the direct-current voltage VRB is applied. This initializes the capacitor C and the potential at the node "a".

While the signals φSW and φSW2 are kept at a high level and the signal φSW1 is kept at a low level in this way, a constant current flows through the MOS transistor T2. Thus, the source-to-gate voltage of the MOS transistor T2 is determined by the drain current of the MOS transistor T2, and is thereby initialized. After the gate voltage of the MOS transistor T2 is reset to its initial level in this way, the pulse signal φV is fed to the gate of the MOS transistor T5, so that the output signal (output current) obtained during the reset operation is output to the output signal line 6.

After the output signal obtained during the reset operation is read out in this way, the signals φSW and the φSW2 are turned to a low level to turn the MOS transistor T4 and T12 off, and the signal φSW1 is turned to a high level to turn the MOS transistor T11 on. Subsequently, the pulse signal φVRS is fed to the gate of the MOS transistor T7 to initialize, through the MOS transistor T7, the capacitor C and the potential at the node "a". Then, the signal φVRS is turned back to a low level in preparation for the next image sensing operation.

Tenth Embodiment

Figure 27:
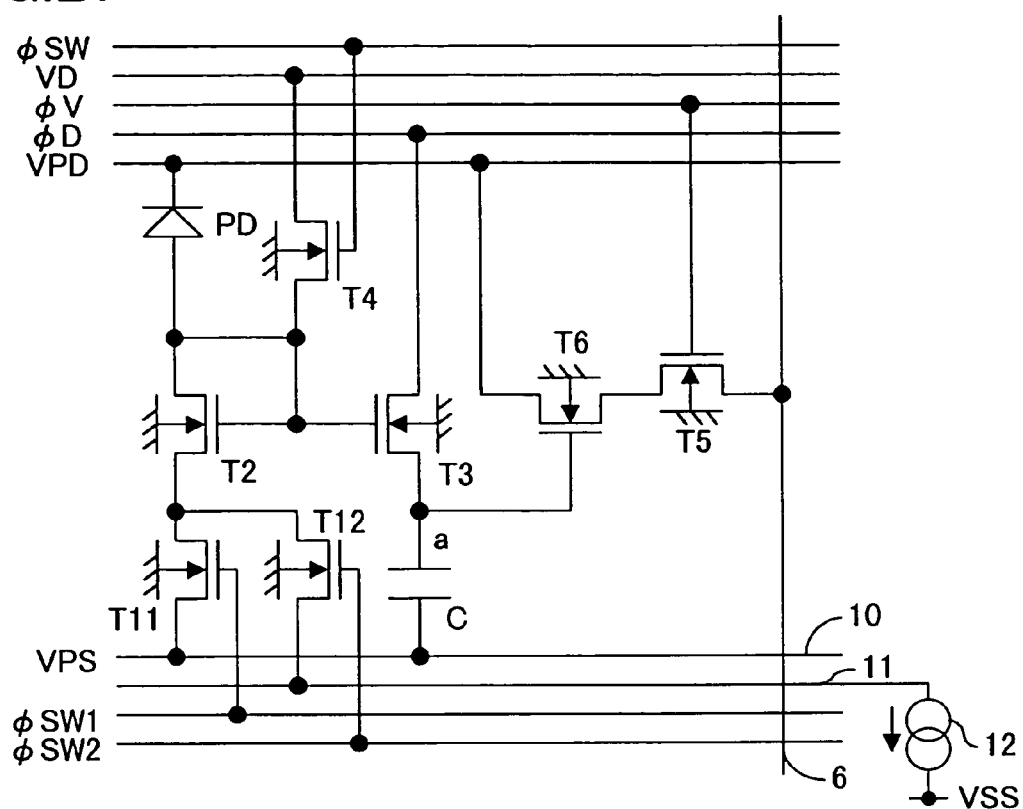
FIG. 27 is a circuit diagram showing the configuration of each pixel in a tenth embodiment of the invention.

A tenth embodiment of the invention will be described below with reference to the drawings. FIG. 27 is a circuit diagram showing the configuration of each pixel provided in the solid-state image-sensing device of this embodiment. In the following descriptions, such circuit elements, signal lines, and others as serve the same purposes as in the pixel shown in FIG. 25 are identified with the same reference numerals or symbols, and their detailed explanations will not be repeated.

As shown in FIG. 27, in this embodiment, initialization of the capacitor C and the potential at the node "a" is achieved by feeding a signal φD to the drain of the MOS transistor T3. This makes it possible to omit the MOS transistor T7 found in the previous (ninth) embodiment. In other respects, the pixel of this embodiment is configured in the same manner as that of the ninth embodiment (FIG. 25). Here, as in the eighth embodiment (FIG. 22), in a period in which the signal φD is at a high level, the capacitor C performs integration; in a period in which the signal φD is at a low level, the electric charge accumulated in the capacitor C is discharged through the MOS transistor T3, so that the voltage at the capacitor C, and thus the voltage at the gate of the MOS transistor T6, becomes substantially equal to the low-level voltage of the signal φD (i.e. is reset). In this embodiment, the omission of the MOS transistor T7 contributes to a simpler circuit configuration.

In this embodiment, when an image sensing operation is performed, as in the ninth embodiment, the MOS transistors T4 and T12 are tuned off so that no current flows from the constant-current source 12 to the MOS transistor T2, and the MOS transistor T11 is turned on so that the MOS transistor T2 operates in a subthreshold region. Moreover, the signal φD is turned to a high level so that an amount of electric charge equivalent to the value obtained by natural-logarithmically converting the integral of the photocurrent is accumulated in the capacitor C. Then, with predetermined timing, the MOS transistor T5 is turned on, so that a current proportional to the voltage at the gate of the MOS transistor T6 is delivered, through the MOS transistors T6 and T5, to the output signal line 6.

When a reset operation is performed, as in the eighth embodiment, the signals are controlled with the timing shown in FIG. 23. Specifically, after the pulse signal φV is fed in, first, the signals φSW and SW2 are turned to a high level and the signal φSW1 is turned to a low level, and this starts a reset operation. Turning the MOS transistors T4 and T12 on in this way permits the current flowing through the constant-current source 12 to flow through the MOS transistor T2, and thus resets the gate voltage of the MOS transistor T2 to its fixed initial level.

Meanwhile, the signal φD is turned to a low level to discharge the electric charge accumulated in the capacitor C through the MOS transistor T3 to the signal line of the signal φD and thereby initialize the capacitor C and the potential at the node "a", and then the signal φD is turned back to a high level. Thereafter, the pulse signal φV is fed to the gate of the MOS transistor T5, so that the output signal obtained when the MOS transistor T2 is reset is output to the output signal line 6. Then, the signals φSW and φSW2 are turned to a low level, and the signal φSW1 is turned to a high level. Subsequently, the signal φD is turned to a low level to discharge the electric charge accumulated in the capacitor C through the MOS transistor T3 to the signal line of the signal φD and thereby initialize the capacitor C and the potential at the node "a". Then, the signal φD is turned back to a high level in preparation for the next image sensing.

Eleventh Embodiment

Figure 28:
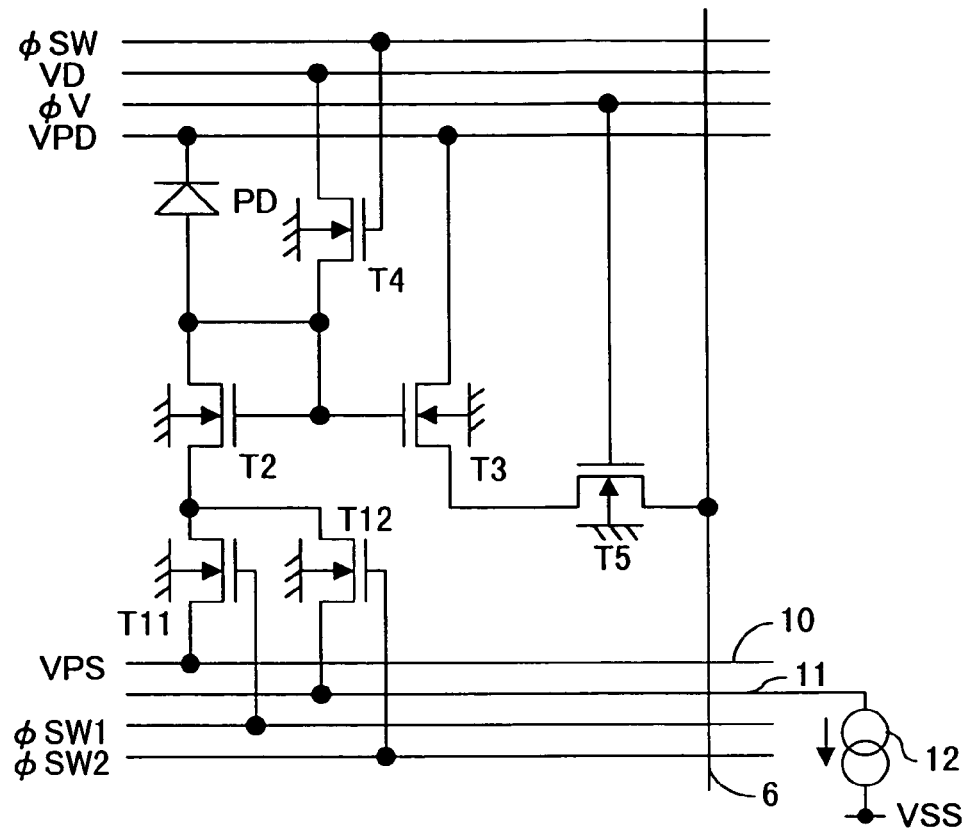
FIG. 28 is a circuit diagram showing the configuration of each pixel in an eleventh embodiment of the invention.

An eleventh embodiment of the invention will be described below with reference to the drawings. FIG. 28 is a circuit diagram showing the configuration of each pixel provided in the solid-state image-sensing device of this embodiment. In the following descriptions, such circuit elements, signal lines, and others as serve the same purposes as in the pixel shown in FIG. 27 are identified with the same reference numerals or symbols, and their detailed explanations will not be repeated.

As shown in FIG. 28, in this embodiment, the direct-current voltage VPD is applied to the drain of the MOS transistor T3, and the capacitor C and the MOS transistor T6 found in the previous (tenth) embodiment are omitted. That is, the source of the MOS transistor T3 is connected to the drain of the MOS transistor T5. In other respects, the pixel of this embodiment is configured in the same manner as that of the tenth embodiment (FIG. 27).

In this embodiment, when an image sensing operation is performed, as in the tenth embodiment, the MOS transistors T4 and T12 are tuned off so that the current flowing through the constant-current source 12 does not flow through the MOS transistor T2, and the MOS transistor T11 is turned on so that the MOS transistor T2 operates in a subthreshold region. As a result of the MOS transistor T2 operating in this way, a current natural-logarithmically proportional to the photocurrent flows through the MOS transistor T3 as its drain current.

Then, the pulse signal φV is fed to the gate of the MOS transistor T5 to turn this MOS transistor T5 on, so that a current natural-logarithmically proportional to the photocurrent flows through the MOS transistor T5 as its drain current, and is delivered to the output signal line 6. As a result, the drain voltage of the MOS transistor Q1 (FIG. 24), which is determined by the on-state resistances of the MOS transistors T3 and Q1 and the current flowing therethrough, appears, as an output signal, on the output signal line 6. After this signal is read out, the MOS transistor T5 is turned off.

Figure 29:
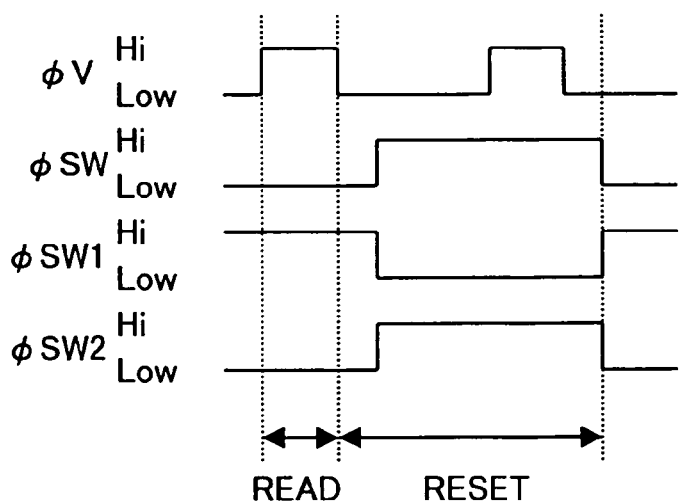
FIG. 29 is a timing chart of the signals fed to the constituent circuit elements of each pixel used in the eleventh embodiment.

When a reset operation is performed, the signals are controlled as shown in the timing chart of FIG. 29. Specifically, after the pulse signal φV is fed in, first, the signals φSW and SW2 are turned to a high level and the signal φSW1 is turned to a low level, and this starts a reset operation. Turning the MOS transistors T4 and T12 on in this way permits the current flowing through the constant-current source 12 to flow through the MOS transistor T2, and thus resets the gate voltage of the MOS transistor T2 to its fixed initial level. Thereafter, the pulse signal φV is fed to the gate of the MOS transistor T5, so that the output signal obtained when the MOS transistor T2 is reset is output to the output signal line 6. Then, the signals φSW and φSW2 are turned to a low level to turn the MOS transistors T4 and T12 off, and the signal φSW1 is turned to a high level to turn the MOS transistor T11 on in preparation for the next image sensing.

In this embodiment, it is not necessary to perform integration of the photoelectric signal by the use of a capacitor C as performed in the tenth embodiment described previously, and thus no time is required for such integration, nor is it necessary to reset the capacitor C. This ensures accordingly faster signal processing. Moreover, in this embodiment, as compared with the tenth embodiment, the capacitor C and the MOS transistor T6 can be omitted, and this helps further simplify the circuit configuration and reduce the pixel size.

Twelfth Embodiment

Figure 30:
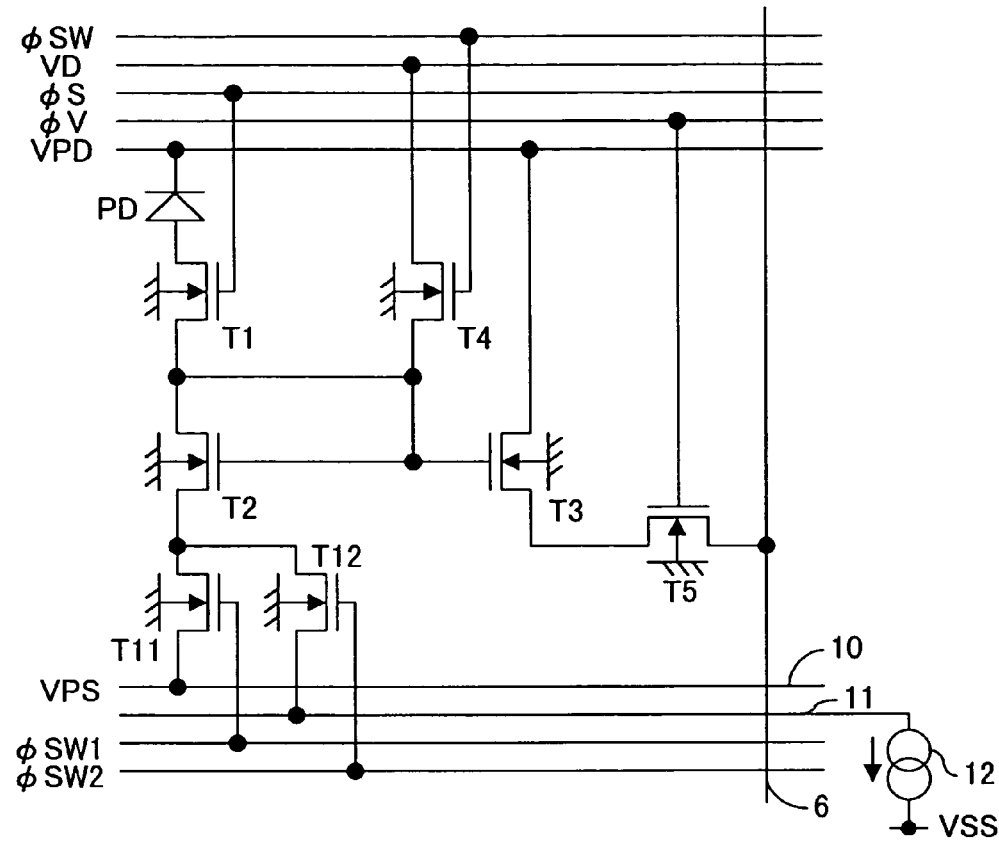
FIG. 30 is a circuit diagram showing the configuration of each pixel in a twelfth embodiment of the invention.

A twelfth embodiment of the invention will be described below with reference to the drawings. FIG. 30 is a circuit diagram showing the configuration of each pixel provided in the solid-state image-sensing device of this embodiment. In the following descriptions, such circuit elements, signal lines, and others as serve the same purposes as in the pixel shown in FIG. 28 are identified with the same reference numerals or symbols, and their detailed explanations will not be repeated.

As shown in FIG. 30, in this embodiment, as compared with the pixel of the eleventh embodiment (FIG. 28), a MOS transistor T1 is additionally provided that is connected between the anode of the photodiode PD and the drain of the MOS transistor T2. That is, the MOS transistor T1 has its drain connected to the anode of the photodiode PD, and has its source connected to the node at which the drain and the gate of the MOS transistor T2 and the source of the MOS transistor T4 are connected together. Moreover, a signal φS is fed to the gate of the MOS transistor T1. This pixel configured as described above operates as described below.

(1) The Operation Performed to Convert the Light Incident on Each Pixel into an Electric Signal First, as in the eleventh embodiment, the signals φSW and φSW2 are turned to a low level, and the signal φSW1 is turned to a high level. Here, the signal φS is also turned to a high level so that the photocurrent is fed from the photodiode PD to the MOS transistor T2. On the other hand, the MOS transistors T4 and T12 are off, and therefore, as in the eleventh embodiment, the current flowing through the constant-current source 12 does not flow through the MOS transistor T2. In this way, the MOS transistor T2 is made to operate in a subthreshold region, and thus a current natural-logarithmically proportional to the photocurrent flows through the MOS transistor T3 as its drain current.

Then, the pulse signal φV is fed to the gate of the MOS transistor T5 to turn this MOS transistor T5 on, so that a current natural-logarithmically proportional to the photocurrent flows through the MOS transistor T5 as its drain current, and is delivered to the output signal line 6. As a result, the drain voltage of the MOS transistor Q1 (FIG. 24), which is determined by the on-state resistances of the MOS transistors T3 and Q1 and the current flowing therethrough, appears, as an output signal, on the output signal line 6. After this signal is read out, the MOS transistor T5 is turned off.

(2) The Operation Performed to Reset Each Pixel

Figure 31:
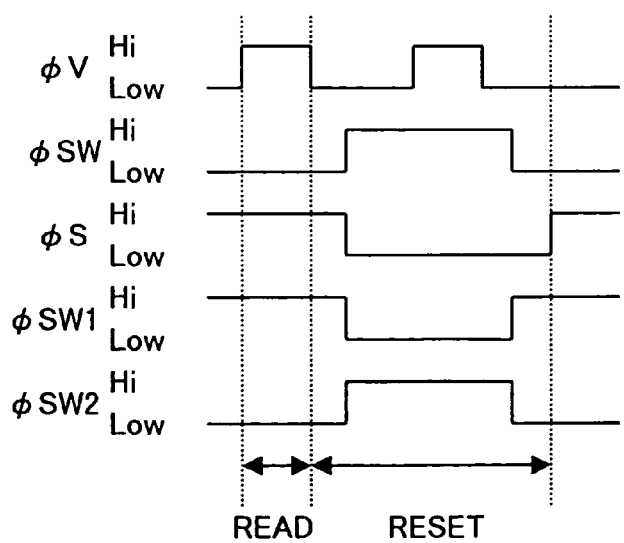
FIG. 31 is a timing chart of the signals fed to the constituent circuit elements of each pixel used in the twelfth embodiment.

Now, how this pixel, having a circuit configured as shown in FIG. 30, is reset will be described with reference to the drawings. FIG. 31 is a timing chart of the signals fed, during a reset operation, to the individual signal lines connected to the constituent circuit elements of each pixel.

After, as described under (1) above, the pulse signal φV is fed to the gate of the MOS transistor T5 and an output signal is output, the signals φSW and φSW2 are turned to a high level to turn the MOS transistors T4 and T12 on, and the signals φSW1 and φS are turned to a low level to turn the MOS transistors T11 and T1 off. This permits the current flowing through the constant-current source 12 to flow through the MOS transistor T2, and prevents the photocurrent from flowing from the photodiode PD to the MOS transistor T2. Thus, the source-to-gate voltage of the MOS transistor T2 is determined by the drain current of the MOS transistor T2, and is thereby reset to its initial level.

After the gate voltage of the MOS transistor T2 is reset to its initial level in this way, the pulse signal φV is fed to the gate of the MOS transistor T5, so that the output signal obtained when the MOS transistor T2 is reset is output to the output signal line 6. Then, the signals φSW and φSW2 are turned to a low level to turn the MOS transistors T4 and T12 off, and the signals φSW1 and φS are turned to a high level to turn the MOS transistors T11 and T1 on in preparation for the next image sensing operation.

As described above, in a reset operation, the photocurrent does not flow from the photodiode PD to the MOS transistor T2, and therefore the constant current flowing through the constant-current source 12 flows through the MOS transistor T2 as its drain current. Moreover, additionally providing the MOS transistor T1 and keeping it off during a reset operation prevents the drain current of the MOS transistor T2 from being affected by the photocurrent from the photodiode PD. This helps make the constant current flowing through the constant-current source 12 lower than in the eleventh embodiment.

In this embodiment, as in the ninth embodiment (FIG. 25), the pixel may be so configured that the source of the MOS transistor T3 is connected to a capacitor C that receives at the other end the direct-current voltage VPS, to the gate of a MOS transistor T6, and to the drain of a MOS transistor T7 for resetting the capacitor C, and that the source of the MOS transistor T6 is connected to the drain of the MOS transistor T5. Alternatively, as in the tenth embodiment (FIG. 27), the pixel may be so configured that a signal D is fed to the drain of the MOS transistor T3 so that, as compared with the previously-described configuration of the ninth embodiment (FIG. 25), the MOS transistor T7 can be omitted.

Figure 32:
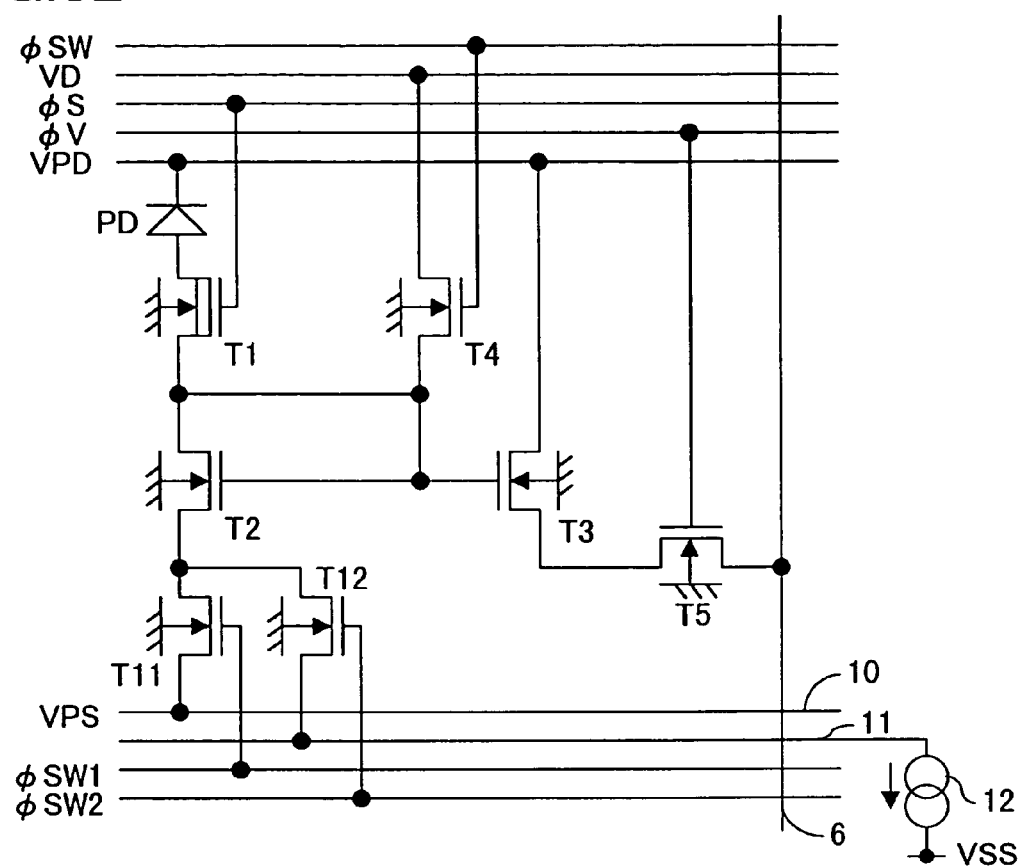
FIG. 32 is a circuit diagram showing another example of the configuration of each pixel in a twelfth embodiment of the invention.

In this embodiment, the MOS transistor T1 may be formed as a depletion-mode N-channel MOS transistor. In that case, the pixel has a circuit configuration as shown in FIG. 32. As shown in FIG. 32, all the MOS transistors T2 to T5, T11, and T12 are enhancement-mode N-channel MOS transistors.

Where, as in the pixel configured as shown in FIG. 30, all the MOS transistors provided within the pixel are enhancement-mode MOS transistors, the MOS transistors T1 and T2 are connected in series, and therefore the high-level voltage of the signal φS fed to the gate of the MOS transistor T1 sometimes needs to be higher than the voltage supplied to the pixel. Accordingly, it is necessary to provide a separate power source for feeding the signal φS to the MOS transistor T1.

By contrast, by using as this MOS transistor T1 a depletion-mode MOS transistor as described above, it is possible to lower the high-level voltage of the signal φS fed to the gate thereof, and thus make this high-level voltage equal or close to the high-level signals fed to the other MOS transistors. The reason is that a depletion-mode MOS transistor has a negative threshold level and can thus be turned on with a lower gate voltage than with an enhancement-mode MOS transistor.

Figure 33:
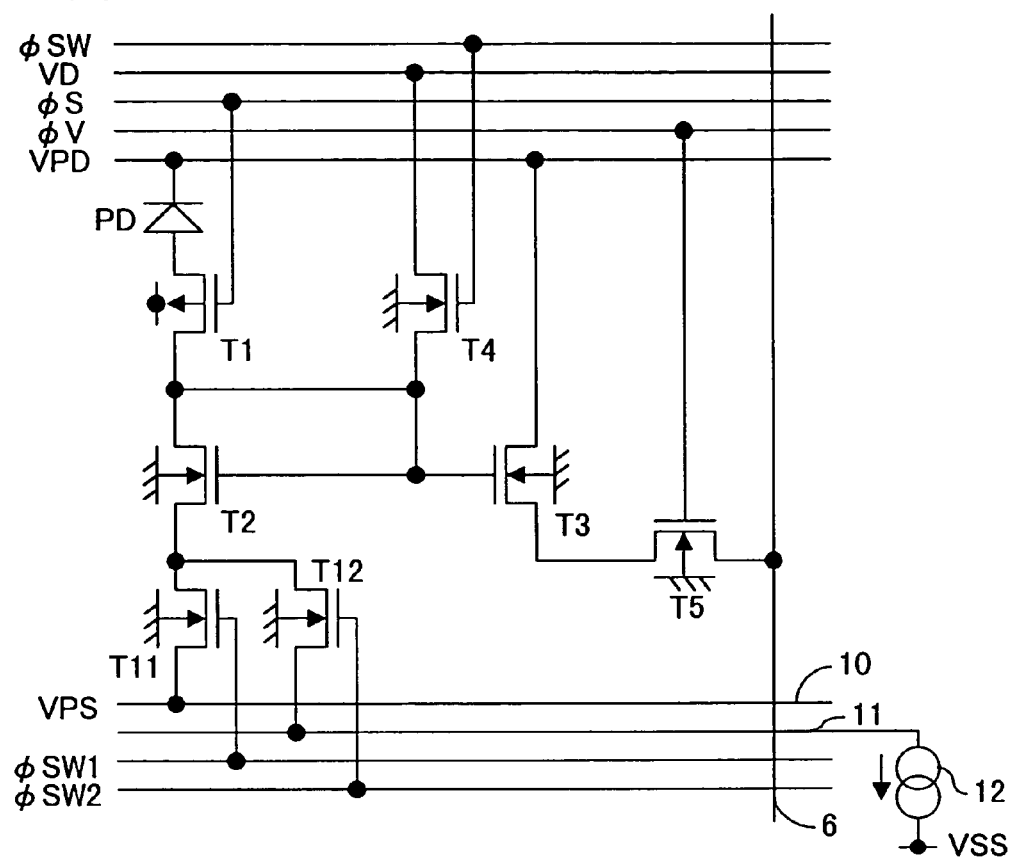
FIG. 33 is a circuit diagram showing another example of the configuration of each pixel in a twelfth embodiment of the invention.

Alternatively, in this embodiment, the MOS transistor T1 may be formed as a P-channel MOS transistor. In that case, the pixel has a circuit configuration as shown in FIG. 33. As shown in FIG. 33, all the MOS transistors T2 to T5, T11, and T12 are N-channel MOS transistors. Moreover, the MOS transistor T1 has its source connected to the anode of the photodiode PD, and has its drain connected to the drain of the MOS transistor T2.

In this circuit configuration, the MOS transistor T1 is turned on when its gate-to-drain voltage difference is greater than its threshold level, and is turned off when its gate-to-drain voltage difference is smaller than its threshold level. Accordingly, the signal φS fed to the gate of the MOS transistor T1 has an inverted level-shift pattern as compared with the signal φS in FIG. 31. Moreover, the MOS transistor T1 can be turned on and off without being affected by the MOS transistor T2 that is connected in series with the drain of the MOS transistor T1.

Moreover, since the MOS transistor T1 can be turned on and off without being affected by the MOS transistor T2, there is no need to provide a separate power source for feeding the signal φS. Furthermore, this circuit configuration permits the MOS transistor T1 to be formed as an enhancement-mode MOS transistor like all the other MOS transistors, and thus allows the MOS transistor T1 to be produced together with the other MOS transistors in a single step. This helps simplify the manufacturing process as compared with the circuit configuration described above in which only the MOS transistor T1 is formed as a depletion-mode MOS transistor.

Figure 34:
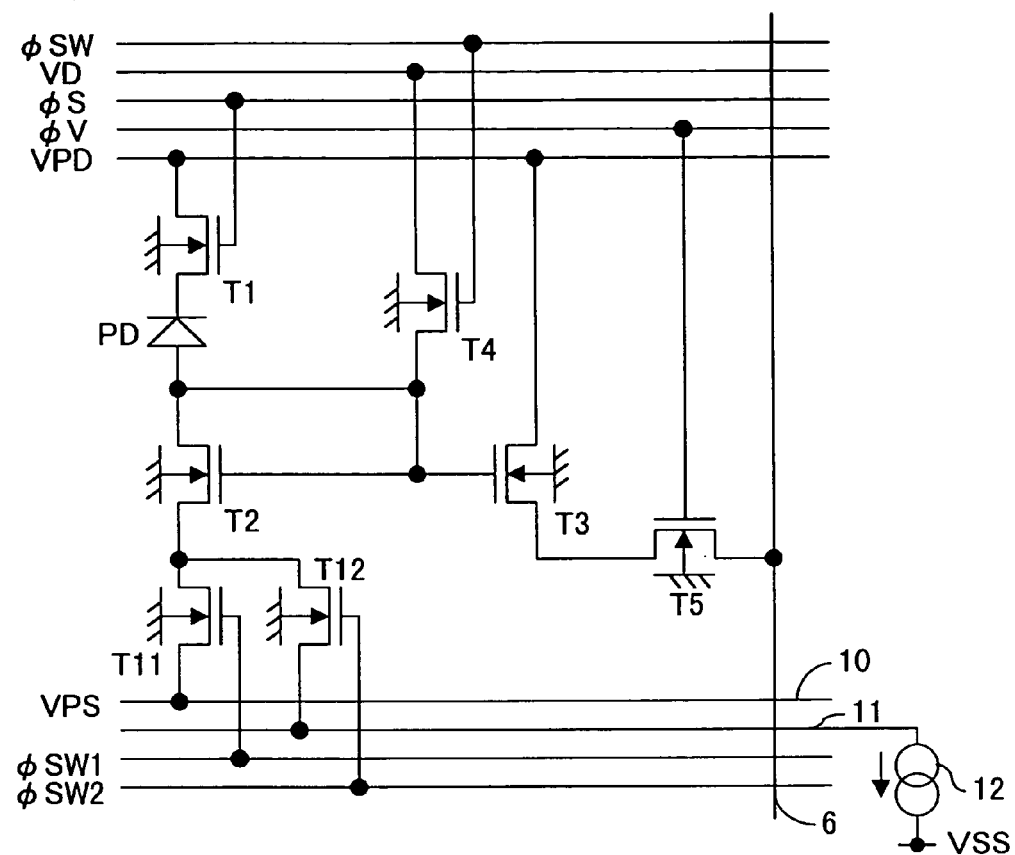
FIG. 34 is a circuit diagram showing another example of the configuration of each pixel in a twelfth embodiment of the invention.

As shown in FIG. 34, a MOS transistor T1 may be additionally provided between the direct-current voltage VPD line and the cathode of the photodiode PD. That is, the direct-current voltage VPD is applied to the drain of the MOS transistor T1, and the source of this MOS transistor T1 is connected to the cathode of the photodiode PD. Moreover, in the pixel configured in this manner, the MOS transistor T1 may be formed as a depletion-mode MOS transistor or a P-channel MOS transistor as described above.

Fifth Example of Pixel Configuration

Figure 35:
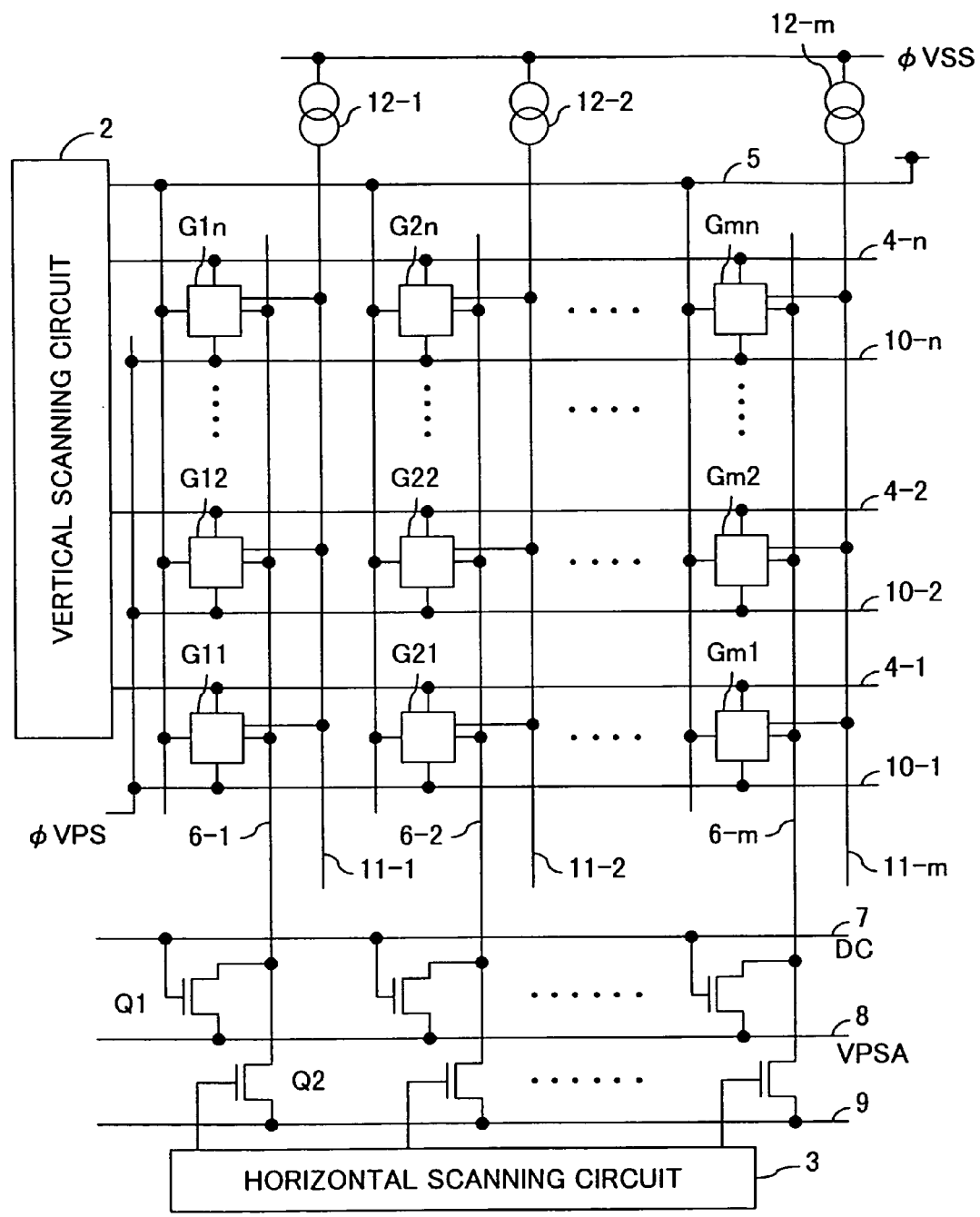
FIG. 35 is a block diagram illustrating the overall configuration of another two-dimensional solid-state image-sensing device embodying the invention.

FIG. 35 schematically shows the configuration of a portion of another two-dimensional MOS-type solid-state image-sensing device embodying the invention. In this figure, such elements as are found also in the configuration shown in FIG. 24 are identified with the same reference numerals or symbols, and their detailed explanations will not be repeated. In the solid-state image-sensing device shown in FIG. 35, a signal φVSS is fed to the constant-current sources 12-1, 12-2, ..., 12-m that feed currents by way of the current feed lines 11-1, 11-2, ..., 11-m to the pixels G11 to G1n, G21 to G2n. ..., Gm1 to Gmn.

The individual pixels are connected not only to the lines 4-1, 4-2, ..., 4-n, to the lines 10-1, 10-2, ..., 10-n, to the current feed lines 11-1, 11-2, ..., 11-m, to the output signal lines 6-1, 6-2, ..., 6-m, and to the power line 5 mentioned above, but also to other lines (for example, clock lines and bias supply lines). These other lines, however, are omitted in FIG. 35.

As shown in FIG. 25, for each of the output signal lines 6-1, 6-2, ..., 6-m, a pair of N-channel MOS transistors Q1 and Q2 is provided. The MOS transistor Ta provided in each of the pixels G11 to Gmn and the MOS transistor Q1 are interconnected, just as in the second example of picture configuration, as shown in FIG. 6A. The MOS transistor Ta corresponds to the MOS transistor T6 in the thirteenth to fifteenth embodiments, and corresponds to the MOS transistor T3 in the sixteenth embodiment. The MOS transistor Q2 is controlled by the horizontal scanning circuit 3 so as to function as a switching device.

As will be described later, in the embodiments of the invention shown in FIG. 36 and the following figures, within each pixel, another N-channel MOS transistor T5 functioning as a switch is provided. If this MOS transistor T5 is illustrated explicitly, the circuit shown in FIG. 6A has, more precisely, a circuit configuration as shown in FIG. 6B. Specifically, the MOS transistor T5 is inserted between the MOS transistor Q1 and the MOS transistor Ta. Here, the MOS transistor T5 serves to select a row, and the MOS transistor Q2 serves to select a column. It is to be noted that the circuit configurations shown in FIGS. 35, 6A, and 6B are common to the thirteenth to sixteenth embodiments of the invention described hereinafter.

The circuit configuration shown in FIGS. 6A and 6B permits the signal to be output with a high gain. Accordingly, even in a case where the photocurrent generated in a photosensitive element is converted natural-logarithmically to obtain a wider dynamic range and thus the output signal obtained is comparatively low, this amplifier circuit amplifies the signal so as to make it sufficiently high and thus easier to process in the succeeding signal processing circuit (not shown). Here, the MOS transistor Q1 that serves as the load resistor of the amplifier circuit is provided within each pixel; however, such transistors may be provided, instead, one for each of the output signal lines 6-1, 6-2, ..., 6-m to which the pixels arranged in columns are collectively connected column by column. This helps reduce the number of load resistors or constant-current sources required, and thus reduce the area occupied by the amplifying circuits on a semiconductor chip.

Thirteenth Embodiment

A thirteenth embodiment of the invention, which is applicable to each pixel of the fifth example of pixel configuration shown in FIG. 35, will be described below with reference to the drawings. FIG. 36 is a circuit diagram showing the configuration of each pixel provided in the solid-state image-sensing device of this embodiment. In the following descriptions, such circuit elements, signal lines, and others as serve the same purposes as in the pixel shown in FIG. 14 are identified with the same reference numerals or symbols, and their detailed explanations will not be repeated.

Figure 36:
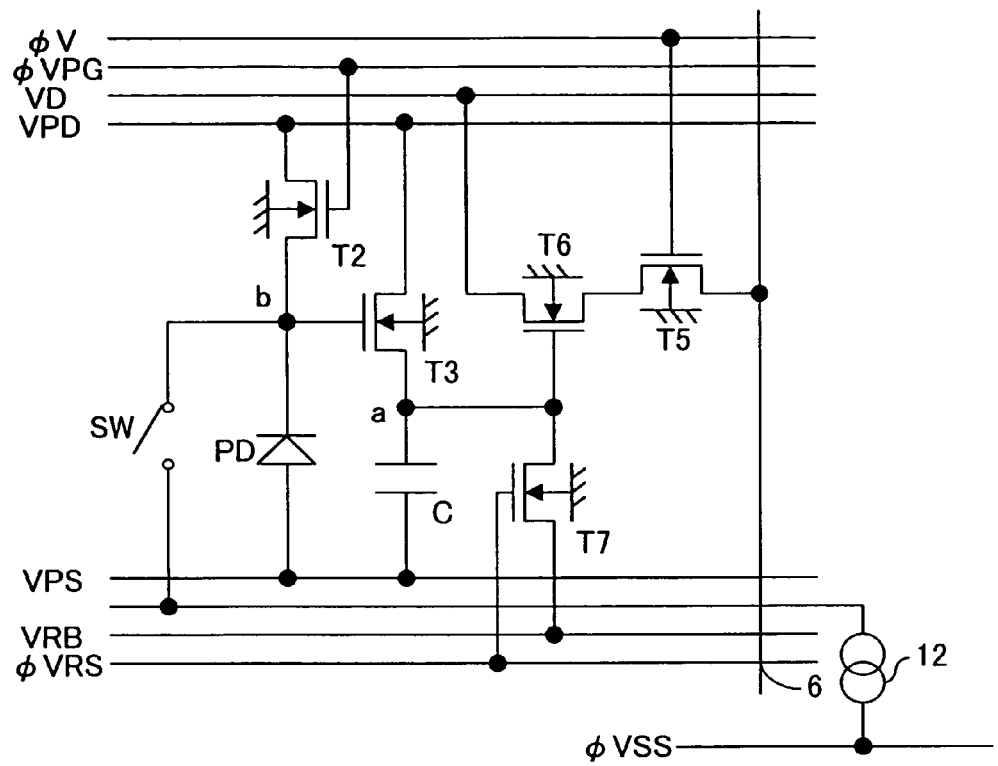
FIG. 36 is a circuit diagram showing the configuration of each pixel in a thirteenth embodiment of the invention.

In the pixel shown in FIG. 36, as compared with the pixel of the fifth embodiment (FIG. 14), the MOS transistors T1 and T4 are omitted, and the cathode of the photodiode PD is connected to the source of the MOS transistor T2 and to the gate of the MOS transistor T3. Moreover, a signal φVPG is fed to the gate of the MOS transistor T2, and a direct-current voltage VD is applied to the drain of the MOS transistor T6. Furthermore, a switch SW is provided between the node at which the source of the MOS transistor T2 and the cathode of the photodiode PD are connected together and a constant-current source 12 (this constant-current source 12 corresponds to the constant-current sources 12-1, 12-2, ..., 12-m).

In this embodiment, by switching the voltage of the signal φVPG and thereby turning the MOS transistor T2 on and off, it is possible to switch the operation of each pixel between two modes, namely between a mode in which the output signal delivered to the output signal line 6 is natural-logarithmically proportional to the photocurrent that the photodiode PD outputs according to the amount of incident light and a mode in which the output signal is linearly proportional to the photocurrent. How each pixel operates in each mode will be described below.

The signal φVPG takes either a first voltage that permits the MOS transistor T2 to operate in a subthreshold region or a second voltage that turns the MOS transistor T2 off. On the other hand, the signal φVSS fed to the constant-current source 12 takes either a third voltage that permits a current to flow through the MOS transistor T2 in an operation for detecting pixel-to-pixel variations or a fourth voltage that raises the gate voltage of the MOS transistor T3 in a reset operation.

(1) The Mode in Which the Photocurrent is Converted Natural-Logarithmically for Output In this mode, the signal φVSS is kept at the third voltage.

(1-a) Image Sensing Operation

First, the signal φVPG is turned to the first voltage to make the MOS transistor T2 operate in a subthreshold region, and the switch SW is turned off to disconnect the constant-current source 12 from the node "b" between the source of the MOS transistor T2 and the cathode of the photodiode PD. In this state, when light is incident on the photodiode PD, a photocurrent is generated therein, and, due to the subthreshold characteristics of a MOS transistor, a voltage natural-logarithmically proportional to the photocurrent appears at the source of the MOS transistor T2 and at the gate of the MOS transistor T3. Here, the photoelectric charge generated in the photodiode PD is negative, and therefore flows into the MOS transistor T2 through its source. Thus, the more intense the incident light, the lower the source voltage of the MOS transistor T2 becomes.

When a voltage natural-logarithmically proportional to the photocurrent appears at the gate of the MOS transistor T3 in this way, first, a high level is fed as the signal φVRS to the gate of the MOS transistor T7 to turn this MOS transistor T7 on and thereby reset the capacitor C and the voltage at the node "a". Here, to permit the MOS transistor T3 to operate, the voltage at the node "a" is reset to a voltage lower than the surface potential that is determined by the gate voltage of the MOS transistor T3. Next, the signal φVRS is turned to a low level to turn the MOS transistor T7 off, and then the signal φV is turned to a high level to turn the MOS transistor T5 on.

As a result of the voltage at the node "a" being reset by the MOS transistor T7, the MOS transistor T3 operates in such a way that a voltage obtained by sampling the surface potential that is determined by the gate voltage of the MOS transistor T3 is fed to the gate of the MOS transistor T6. Thus, the voltage at the gate of the MOS transistor T6 is natural-logarithmically proportional to the amount of incident light, and therefore, when the MOS transistor T5 is turned on, a current natural-logarithmically proportional to the photocurrent is delivered, through the MOS transistors T5 and T6, to the output signal line 6. In this way, a signal (output current) proportional to the logarithm of the amount of incident light is read out. Then, the MOS transistor T5 is turned off.

(1-b) Sensitivity Variation Detection Operation

Figure 37:
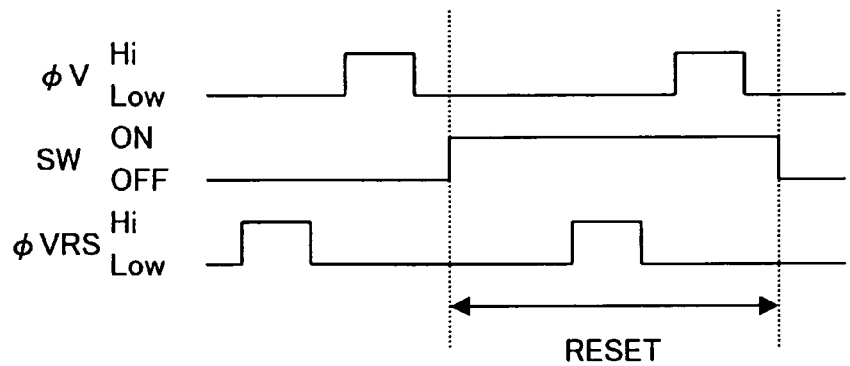
FIG. 37 is a timing chart of the signals fed to the constituent circuit elements of each pixel used in the thirteenth embodiment.

FIG. 37 is a timing chart of the relevant signals during an operation for detecting variations in sensitivity among individual pixels. After, as described above, the pulse signal φVRS is fed to the gate of the MOS transistor T7 to reset the voltage at the node "a" and then the pulse signal φV is fed to the gate of the MOS transistor T5 to read out an output signal, first, the switch SW is turned on to connect the constant-current source 12 to the node "b". Here, as described previously, the signal φVSS is kept at the third voltage so that a high current flows from the MOS transistor T2 to the constant-current source 12. In this case, to permit a high current to flow from the MOS transistor T2 to the constant-current source 12, the third voltage is set, for example, at a voltage lower than the direct-current voltage VPS.

Here, the current flowing through the constant-current source 12 is far higher than the photocurrent generated in the photodiode PD, and therefore the current flowing through the MOS transistor T2 is substantially equal to the current flowing through the constant-current source 12. Thus, the voltage appearing at the node "b" now is determined by the current flowing through the constant-current source 12, and is proportional to the variation in the threshold level of the MOS transistor T2 of each pixel. Then, the pulse signal φVRS is fed to the gate of the MOS transistor T7 to reset the voltage at the node "a". Then, the pulse signal φV is fed to the gate of the MOS transistor T5 so that the output signal amplified by the MOS transistor T6 is read out.

The output signal thus read out is an output signal obtained in a state artificially created by the constant-current source 12 to simulate incidence of intense light with an identical current flowing through the MOS transistor T2 of each pixel, and thus this output signal represents the variation in sensitivity of each pixel. On completion of this sensitivity variation detection operation, finally, the switch SW is turned off in preparation for the next image sensing operation. The output signal obtained in a sensitivity variation detection operation as described above is stored as compensation data in a memory such as a line memory so that, during an actual image sensing operation, the output signal from each pixel is corrected with the compensation data thus stored. This makes it possible to eliminate components resulting from variations in sensitivity among individual pixels from their output signals.

By making the MOS transistors operate as described above in each pixel, the output signal obtained when the gate voltage of the MOS transistor T3 is reset is output to the output signal line 6 and is then fed out serially, from one pixel after another, to the succeeding circuit so as to be stored as pixel-by-pixel compensation data in a memory provided therein. Then, by correcting pixel by pixel the output current obtained during an actual image sensing operation with the compensation data thus stored, it is possible to eliminate components resulting from variations in sensitivity among individual pixels from their output signal.

(2) The Mode in Which the Photocurrent is Converted Linearly for Output

In this mode, the signal φVPG is kept at the second voltage to keep the MOS transistor T2 off so that the MOS transistor T3 operates as a transistor for signal amplification. On the other hand, the signal φVSS is kept at the fourth voltage.

(2-a) Image Sensing Operation

First, the switch SW is turned off to disconnect the constant-current source 12 from the node "b" between the gate of the MOS transistor T3 and the cathode of the photodiode PD. This causes a photocurrent to flow through the photodiode PD, and thus causes the gate voltage of the MOS transistor T3 to change. Specifically, negative photoelectric charge is fed from the photodiode PD to the gate of the MOS transistor T3, and thus the gate voltage of the MOS transistor T3 is linearly proportional to the photocurrent. Here, the photoelectric charge that is generated in the photodiode PD and then flows into the MOS transistor T3 through its gate is negative. Thus, the more intense the incident light, the lower the gate voltage of the MOS transistor T3 becomes.

When a voltage linearly proportional to the photocurrent appears at the gate of the MOS transistor T3 in this way, first, a high level is fed as the signal φVRS to the gate of the MOS transistor T7 to turn this MOS transistor T7 on and thereby reset the capacitor C and the voltage at the node "a". Here, to permit the MOS transistor T3 to operate, the voltage at the node "a" is reset to a voltage lower than the surface potential that is determined by the gate voltage of the MOS transistor T3. Next, the signal φVRS is turned to a low level to turn the MOS transistor T7 off, and then the signal φV is turned to a high level to turn the MOS transistor T5 on.

As a result of the voltage at the node "a" being reset by the MOS transistor T7, the MOS transistor T3 operates in such a way that a voltage obtained by sampling the surface potential that is determined by the gate voltage of the MOS transistor T3 is fed to the gate of the MOS transistor T6. Thus, the voltage at the gate of the MOS transistor T6 is linearly proportional to the amount of incident light, and therefore, when the MOS transistor T5 is turned on, a current linearly proportional to the photocurrent is delivered, through the MOS transistors T5 and T6, to the output signal line 6. In this way, a signal (output current) proportional to the amount of incident light is read out. Then, the MOS transistor T5 is turned off.

(2-b) Reset Operation

Figure 38:
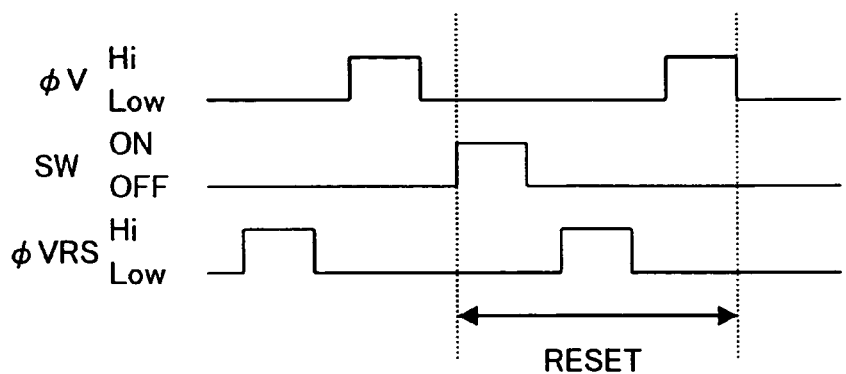
FIG. 38 is a timing chart of the signals fed to the constituent circuit elements of each pixel used in the thirteenth embodiment.

FIG. 38 is a timing chart of the relevant signals during an operation for resetting each pixel. After, as described above, the pulse signal φVRS is fed to the gate of the MOS transistor T7 to reset the voltage at the node "a" and then the pulse signal φV is fed to the gate of the MOS transistor T5 to read out an output signal, first, the switch SW is turned on to connect the constant-current source 12 to the node "b". After the switch SW is turned on in this way, the signal φVSS is fed through the constant-current source 12 and the switch SW to the gate of the MOS transistor T3 to reset the gate voltage of the MOS transistor T3. Here, as described previously, to permit the gate voltage of the MOS transistor T3 to be reset to a higher voltage, the signal φVSS is kept at the fourth voltage that is higher than the direct-current voltage VPS.

Next, the pulse signal φVRS is fed to the gate of the MOS transistor T7 to reset the voltage at the node "a", and then the pulse signal φV is fed to the gate of the MOS transistor T5 to read out an output signal. The output signal thus obtained is proportional to the gate voltage of the MOS transistor T3, and is therefore read out as an output signal obtained when the pixel is initialized. When this output signal is read out, an image sensing operation as described above is started again.

The output signal obtained when the pixel is initialized as described above is stored as compensation data in a memory such as a line memory so that, during an actual image sensing operation, the output signal from each pixel is corrected with the compensation data thus stored. This makes it possible to eliminate components resulting from variations in sensitivity among individual pixels from their output signals. When the operation of the pixel is switched to the logarithmic conversion mode or to the linear conversion mode, first, the signal φVSS is turned to the third or fourth voltage, respectively, then the pixel is reset by performing a variation detection operation as described above in the thus established mode, and then an image sensing operation as described above is performed.

Figure 39:
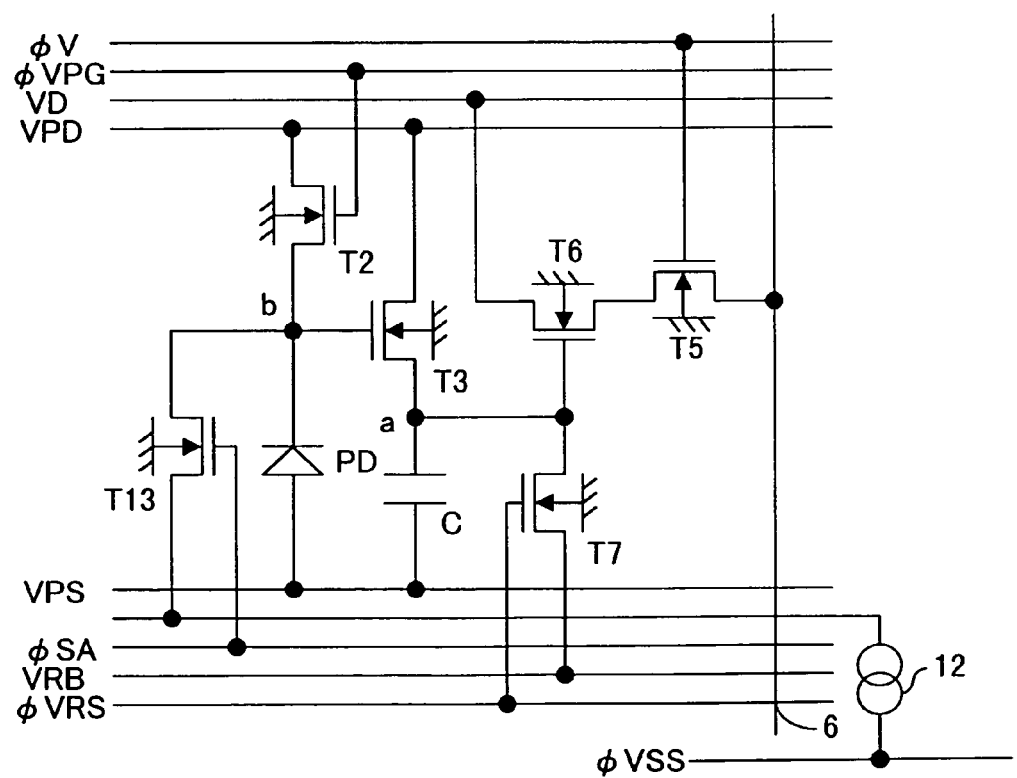
FIG. 39 is a circuit diagram showing another example of the configuration of each pixel in a thirteenth embodiment of the invention.

In the pixel of this embodiment, the switch SW may be replaced with a MOS transistor as shown in FIG. 39. Specifically, instead of the switch SW, a MOS transistor T13 is provided that has its drain connected to the node "b" and that has its source connected to the constant-current source 12, and a signal φSA is fed to the gate of this MOS transistor T13. During an image sensing operation, the MOS transistor T13 receives at its gate a low level as the signal φSA so as to be kept off; during a variation detection operation and a reset operation, the MOS transistor T13 receives at its gate a high level as the signal φSA so as to be kept on.

Fourteenth Embodiment

Figure 40:
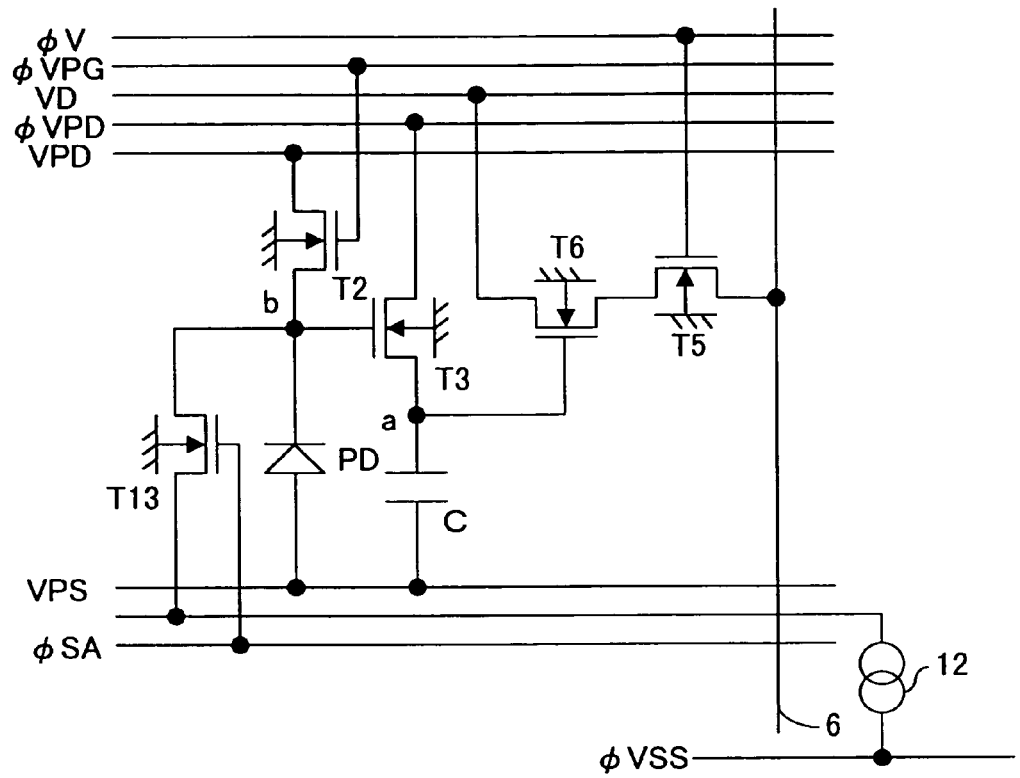
FIG. 40 is a circuit diagram showing the configuration of each pixel in a fourteenth embodiment of the invention.

A fourteenth embodiment of the invention will be described below with reference to the drawings. FIG. 40 is a circuit diagram showing the configuration of each pixel provided in the solid-state image-sensing device of this embodiment. In the following descriptions, such circuit elements, signal lines, and others as serve the same purposes as in the pixel shown in FIG. 39 are identified with the same reference numerals or symbols, and their detailed explanations will not be repeated.

As shown in FIG. 40, in this embodiment, initialization of the capacitor C and the potential at the node "a" is achieved by feeding a signal φVPD to the drain of the MOS transistor T3. This makes it possible to omit the MOS transistor T7 found in the previous (thirteenth) embodiment. In other respects, the pixel of this embodiment is configured in the same manner as that of the thirteenth embodiment (FIG. 39). Here, in a period in which the signal φVPD is at a high level, the capacitor C performs integration; in a period in which the signal φVPD is at a low level, the electric charge accumulated in the capacitor C is discharged through the MOS transistor T3, so that the voltage at the capacitor C, and thus the voltage at the gate of the MOS transistor T6, becomes substantially equal to the low-level voltage of the signal φVPD (i.e. is reset). In this embodiment, the omission of the MOS transistor T7 contributes to a simpler circuit configuration.

Here, as in the thirteenth embodiment, the signal φVPG takes either a first voltage that permits the MOS transistor T2 to operate in a subthreshold region or a second voltage that turns the MOS transistor T2 off. On the other hand, the signal φVSS fed to the constant-current source 12 takes either a third voltage that permits a current to flow through the MOS transistor T2 in an operation for detecting pixel-to-pixel variations or a fourth voltage that raises the gate voltage of the MOS transistor T3 in a reset operation.

(1) The Mode in Which the Photocurrent is Converted Natural-Logarithmically for Output In this mode, the signal φVSS is kept at the third voltage.

(1-a) Image Sensing Operation

The signal φVPG is turned to the first voltage to make the MOS transistor T2 operate in a subthreshold region, and the signal φSA fed to the gate of the MOS transistor T13 is turned to a low level to turn the MOS transistor T13 off. In this state, when light is incident on the photodiode PD, a photocurrent is generated therein, and, due to the subthreshold characteristics of a MOS transistor, a voltage natural-logarithmically proportional to the photocurrent appears at the source of the MOS transistor T2 and at the gate of the MOS transistor T3. Here, the photoelectric charge generated in the photodiode PD is negative, and therefore flows into the MOS transistor T2 through its source. Thus, the more intense the incident light, the lower the source voltage of the MOS transistor T2 becomes.

When a voltage natural-logarithmically proportional to the photocurrent appears at the gate of the MOS transistor T3 in this way, first, the signal φVPD is turned to a low level (i.e. a voltage lower than the direct-current voltage VPS) to discharge the electric charge accumulated in the capacitor C through the MOS transistor T3 to the signal line of the signal φVPD and thereby reset the capacitor C and the voltage at the node "a". Here, to permit the MOS transistor T3 to operate, the voltage at the node "a" is reset to a voltage lower than the surface potential that is determined by the gate voltage of the MOS transistor T3. Next, the signal φVPD is turned to a high level (i.e. a voltage approximately equal to the direct-current voltage VPD), and then the signal φV is turned to a high level to turn the MOS transistor T5 on.

As a result of the voltage at the node "a" being reset by the signal φVPD in this way, the MOS transistor T3 operates in such a way that a voltage obtained by sampling the surface potential that is determined by the gate voltage of the MOS transistor T3 is fed to the gate of the MOS transistor T6. Thus, the voltage at the gate of the MOS transistor T6 is natural-logarithmically proportional to the amount of incident light, and therefore, when the MOS transistor T5 is turned on, a current natural-logarithmically proportional to the photocurrent is delivered, through the MOS transistors T5 and T6, to the output signal line 6. In this way, a signal (output current) proportional to the logarithm of the amount of incident light is read out. Then, the MOS transistor T5 is turned off.

(1-b) Sensitivity Variation Detection Operation

Figure 41:
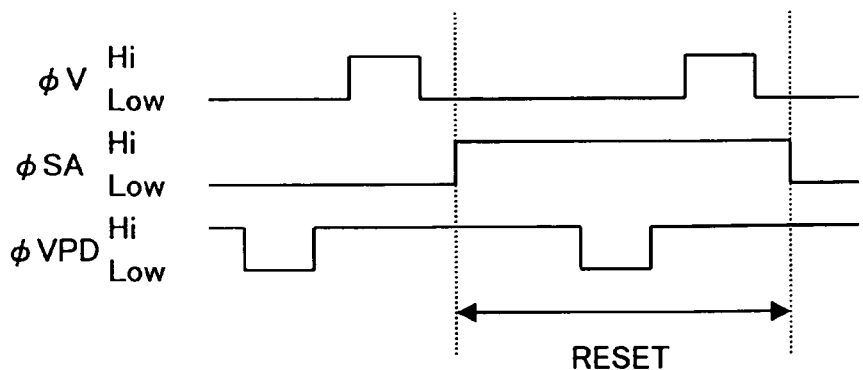
FIG. 41 is a timing chart of the signals fed to the constituent circuit elements of each pixel used in the fourteenth embodiment.

FIG. 41 is a timing chart of the relevant signals during an operation for detecting variations in sensitivity among individual pixels. After, as described above, the pulse signal φVPD is fed to the drain of the MOS transistor T3 to reset the voltage at the node "a" and then the pulse signal φV is fed to the gate of the MOS transistor T5 to read out an output signal, first, the signal φSA is turned to a high level to turn the MOS transistor T13 on so that the constant-current source 12 is connected to the node "b". Here, as described previously, the signal φVSS is kept at the third voltage so that a high current flows from the MOS transistor T2 to the constant-current source 12.

Here, as in the thirteenth embodiment, the current flowing through the MOS transistor T2 is substantially equal to the current flowing through the constant-current source 12. Thus, the voltage appearing at the node "b" now is determined by the current flowing through the constant-current source 12, and is proportional to the variation in the threshold level of the MOS transistor T2 of each pixel. Then, the pulse signal φVPD is fed to the drain of the MOS transistor T3 to reset the voltage at the node "a". Then, the pulse signal φV is fed to the gate of the MOS transistor T5 so that the output signal amplified by the MOS transistor T6 is read out.

The output signal thus read out is proportional to the threshold voltage of the MOS transistor T2, and thus permits detection of the variation in sensitivity of each pixel. Then, finally, the signal φSA is turned to a low level to turn the MOS transistor T13 off in preparation for the next image sensing operation. The output signal obtained in a sensitivity variation detection operation as described above is stored as compensation data in a memory such as a line memory so that, during an actual image sensing operation, the output signal from each pixel is corrected with the compensation data thus stored. This makes it possible to eliminate components resulting from variations in sensitivity among individual pixels from their output signals.

(2) The Mode in Which the Photocurrent is Converted Linearly for Output

In this mode, as in the thirteenth embodiment, the signal φVPG is kept at the second voltage to keep the MOS transistor T2 off so that the MOS transistor T3 operates as a transistor for signal amplification. On the other hand, the signal φVSS is kept at the fourth voltage.

(2-a) Image Sensing Operation

First, as in the thirteenth embodiment, the signal φSA is turned to a low level to turn the MOS transistor T13 off so that the constant-current source 12 is disconnected from the node "b" between the gate of the MOS transistor T3 and the cathode of the photodiode PD. This causes a photocurrent to flow through the photodiode PD, and thus causes the gate voltage of the MOS transistor T3 to change. Specifically, negative photoelectric charge is fed from the photodiode PD to the gate of the MOS transistor T3, and thus the gate voltage of the MOS transistor T3 is linearly proportional to the photocurrent. Here, the photoelectric charge that is generated in the photodiode PD and then flows into the MOS transistor T3 through its gate is negative. Thus, the more intense the incident light, the lower the gate voltage of the MOS transistor T3 becomes.

When a voltage linearly proportional to the photocurrent appears at the gate of the MOS transistor T3 in this way, first, a low level is fed as the signal φVPD to the drain of the MOS transistor T3 to discharge the electric charge accumulated in the capacitor C through the MOS transistor T3 to the signal line of the signal φVPD and thereby reset the capacitor C and the voltage at the node "a". Next, the signal φVPD is turned to a high level, and then the signal φV is turned to a high level to turn the MOS transistor T5 on.

Now that the voltage at the node "a" is reset to a voltage lower than the surface potential determined by the gate voltage of the MOS transistor T3, the MOS transistor T3 operates in such a way that a voltage obtained by sampling the surface potential that is determined by the gate voltage of the MOS transistor T3 is fed to the gate of the MOS transistor T6. Thus, the voltage at the gate of the MOS transistor T6 is linearly proportional to the amount of incident light, and therefore, when the MOS transistor T5 is turned on, a current linearly proportional to the photocurrent is delivered, through the MOS transistors T5 and T6, to the output signal line 6. In this way, a signal (output current) proportional to the amount of incident light is read out. Then, the MOS transistor T5 is turned off.

(2-b) Reset Operation

Figure 42:
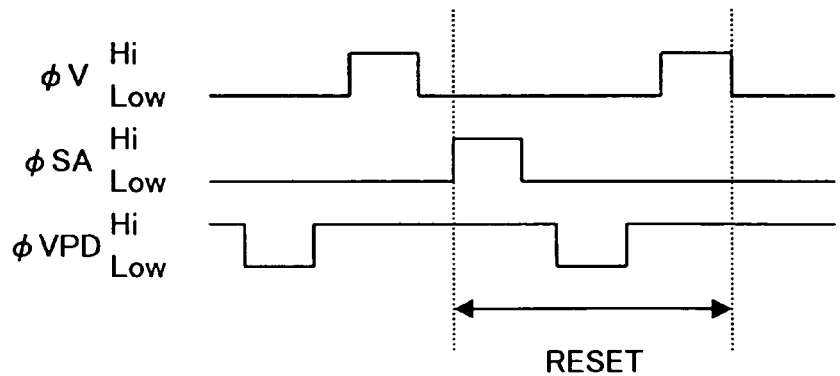
FIG. 42 is a timing chart of the signals fed to the constituent circuit elements of each pixel used in the fourteenth embodiment.

FIG. 42 is a timing chart of the relevant signals during an operation for resetting each pixel. After, as described above, the pulse signal φVPD is fed to the drain of the MOS transistor T3 to reset the voltage at the node "a" and then the pulse signal φV is fed to the gate of the MOS transistor T5 to read out an output signal, first, the signal φSA is turned to a high level to turn the MOS transistor T13 on. When the MOS transistor T13 is turned on in this way, as in the thirteenth embodiment, the MOS transistor T3 receives at its gate the fourth voltage, and thus the gate voltage of the MOS transistor T3 is reset. After the gate voltage of the MOS transistor T3 is reset in this way, the signal φSA is turned to a low level to turn the MOS transistor T13 off.

Next, the pulse signal φVPD is fed to the drain of the MOS transistor T3 to reset the voltage at the node "a", and then the pulse signal φV is fed to the gate of the MOS transistor T5 to read out an output signal. The output signal thus obtained is proportional to the gate voltage of the MOS transistor T3, and is therefore read out as an output signal obtained when the pixel is initialized. When this output signal is read out, an image sensing operation as described above is started again.

The output signal obtained when the pixel is initialized as described above is stored as compensation data in a memory such as a line memory so that, during an actual image sensing operation, the output signal from each pixel is corrected with the compensation data thus stored. This makes it possible to eliminate components resulting from variations in sensitivity among individual pixels from their output signals.

Fifteenth Embodiment

Figure 43:
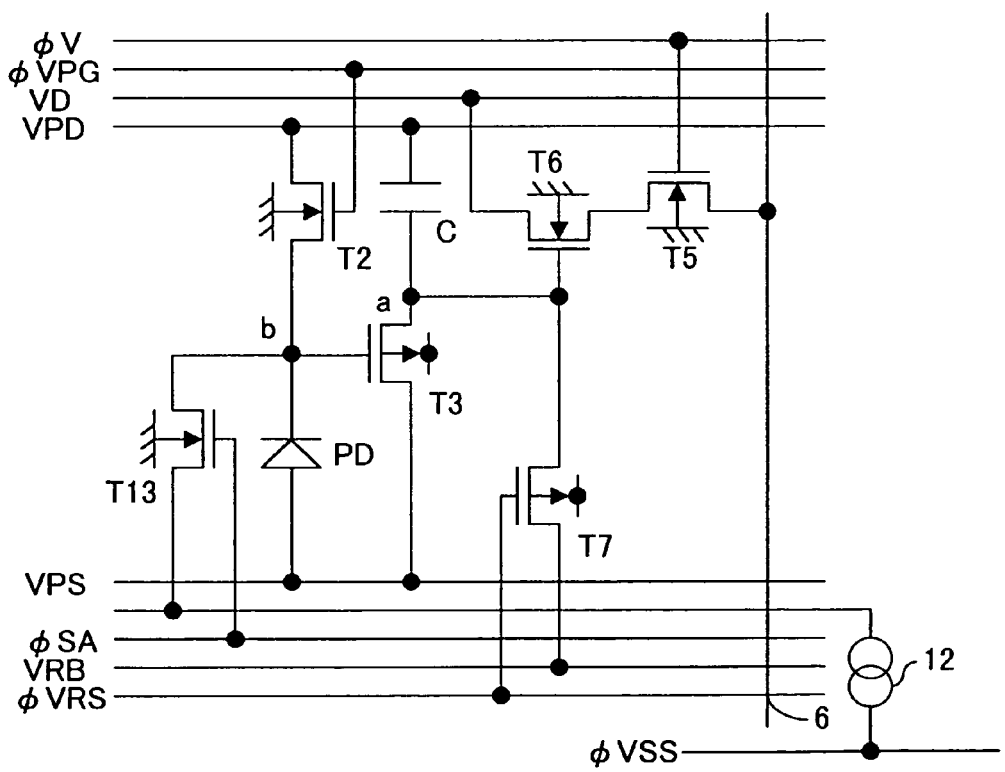
FIG. 43 is a circuit diagram showing the configuration of each pixel in a fifteenth embodiment of the invention.

A fifteenth embodiment of the invention will be described below with reference to the drawings. FIG. 43 is a circuit diagram showing the configuration of each pixel provided in the solid-state image-sensing device of this embodiment. In the following descriptions, such circuit elements, signal lines, and others as serve the same purposes as in the pixel shown in FIG. 39 are identified with the same reference numerals or symbols, and their detailed explanations will not be repeated.

As shown in FIG. 43, in this embodiment, as compared with the pixel of the thirteenth embodiment (FIG. 39), the MOS transistors T3 and T7 are replaced with P-channel MOS transistors. Accordingly, the direct-current voltage VPS is applied to the drain of the MOS transistor T3, and the direct-current voltage VPD is applied to one end of the capacitor C, of which the other end is connected to the source of that MOS transistor T3. Moreover, the direct-current voltage VRB is applied to the drain of the MOS transistor T7, and the source of this MOS transistor T7 is connected to the gate of the MOS transistor T6. In other respects, the pixel of this embodiment is configured in the same manner as the pixel shown in FIG. 39. Here, the direct-current voltage VRB applied to the source of the MOS transistor T7 is higher than the direct-current voltage VPS.

Here, as in the thirteenth embodiment, the signal φVPG takes either a first voltage that permits the MOS transistor T2 to operate in a subthreshold region or a second voltage that turns the MOS transistor T2 off. On the other hand, the signal φVSS fed to the constant-current source 12 takes either a third voltage that permits a current to flow through the MOS transistor T2 in an operation for detecting pixel-to-pixel variations or a fourth voltage that raises the gate voltage of the MOS transistor T3 in a reset operation.

(1) The Mode in Which the Photocurrent is Converted Natural-Logarithmically for Output In this mode, the signal φVSS is kept at the third voltage. Moreover, the signal φVPG is kept at the first voltage to make the MOS transistor T2 operate in a subthreshold region, and the signal φSA fed to the gate of the MOS transistor T13 is kept at a low level to keep the MOS transistor T13 off.

(1-a) Sensitivity Variation Detection Operation

Figure 44:
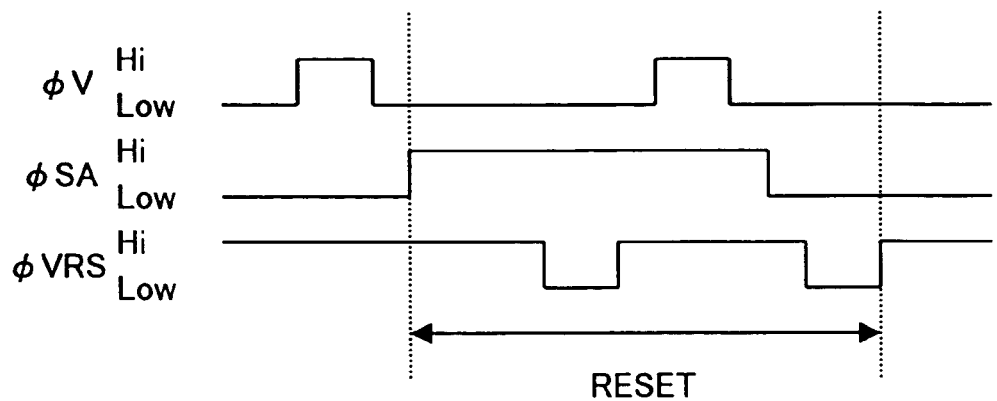
FIG. 44 is a timing chart of the signals fed to the constituent circuit elements of each pixel used in the fifteenth embodiment.

FIG. 44 is a timing chart of the relevant signals during an operation for detecting variations in sensitivity among individual pixels. After the pulse signal φV is fed to the gate of the MOS transistor T5 and an output signal is read out, first, as in the thirteenth embodiment, the signal φSA is turned to a high level to turn the MOS transistor T13 on so that the constant-current source 12 is connected to the node "b". Here, as described previously, the signal φVSS is kept at the third voltage so that a high current flows from the MOS transistor T2 to the constant-current source 12.

Here, as in the thirteenth embodiment, the current flowing through the MOS transistor T2 is substantially equal to the current flowing through the constant-current source 12. Thus, the voltage appearing at the node "b" now is determined by the current flowing through the constant-current source 12, and is proportional to the variation in the threshold level of the MOS transistor T2 of each pixel. Then, the pulse signal φVRS is fed to the gate of the MOS transistor T7 to reset the voltage at the node "a". Then, the pulse signal φV is fed to the gate of the MOS transistor T5 so that the output signal amplified by the MOS transistor T6 is read out. Here, the pulse signal φVRS fed to the gate of the MOS transistor T7 is a low-level pulse signal.

The output signal thus read out is proportional to the threshold voltage of the MOS transistor T2, and thus permits detection of the variation in sensitivity of each pixel. Then, finally, the signal φSA is turned to a low level to turn the MOS transistor T13 off, and then the pulse signal φVRS is fed to the gate of the MOS transistor T7 to reset the voltage at the node "a" in preparation for the next image sensing operation. The output signal obtained in a sensitivity variation detection operation as described above is stored as compensation data in a memory such as a line memory so that, during an actual image sensing operation, the output signal from each pixel is corrected with the compensation data thus stored. This makes it possible to eliminate components resulting from variations in sensitivity among individual pixels from their output signals.

(1-b) Image Sensing Operation

After, as described above in connection with a sensitivity variation detection operation, the pulse signal φVRS is fed to the gate of the MOS transistor T7 to reset the voltage at the node "a" and the capacitor C, an image sensing operation is started. In this state, when light is incident on the photodiode PD, a photocurrent is generated therein, and, due to the subthreshold characteristics of a MOS transistor, a voltage natural-logarithmically proportional to the photocurrent appears at the source of the MOS transistor T2 and at the gate of the MOS transistor T3. Here, the photoelectric charge generated in the photodiode PD is negative, and therefore flows into the MOS transistor T2 through its source. Thus, the more intense the incident light, the lower the source voltage of the MOS transistor T2 becomes.

When a voltage natural-logarithmically proportional to the photocurrent appears at the gate of the MOS transistor T3 in this way, now that the node "a" is reset to a voltage higher than the surface potential that is determined by the gate voltage of the MOS transistor T3, positive electric charge flows out of the capacitor C into the MOS transistor T3. Here, the amount of positive electric charge that flows out of the capacitor C is determined by the gate voltage of the MOS transistor T3. That is, the more intense the incident light and thus the lower the source voltage of the MOS transistor T2, the larger the amount of positive electric charge flowing out of the capacitor C.

In this way, positive electric charge flows out of the capacitor C, and this makes the voltage at the node "a" logarithmically proportional to the integral of the amount of incident light. Then, the pulse signal φV is fed to the MOS transistor T5 to turn this MOS transistor T5 on, so that a current natural-logarithmically proportional to the integral of the photocurrent is delivered, through the MOS transistors T5 and T6, to the output signal line 6. In this way, a signal (output current) proportional to the logarithm of the amount of incident light is read out. Then, the MOS transistor T5 is turned off.

(2) The Mode in Which the Photocurrent is Converted Linearly for Output

In this mode, as in the thirteenth embodiment, the signal φVPG is kept at the second voltage to keep the MOS transistor T2 off so that the MOS transistor T3 operates as a transistor for signal amplification. On the other hand, the signal φVSS is kept at the fourth voltage. First, as in the thirteenth embodiment, the signal φSA is turned to a low level to turn the MOS transistor T13 off so that the constant-current source 12 is disconnected from the node "b" between the gate of the MOS transistor T3 and the cathode of the photodiode PD.

(2-a) Reset Operation

Figure 45:
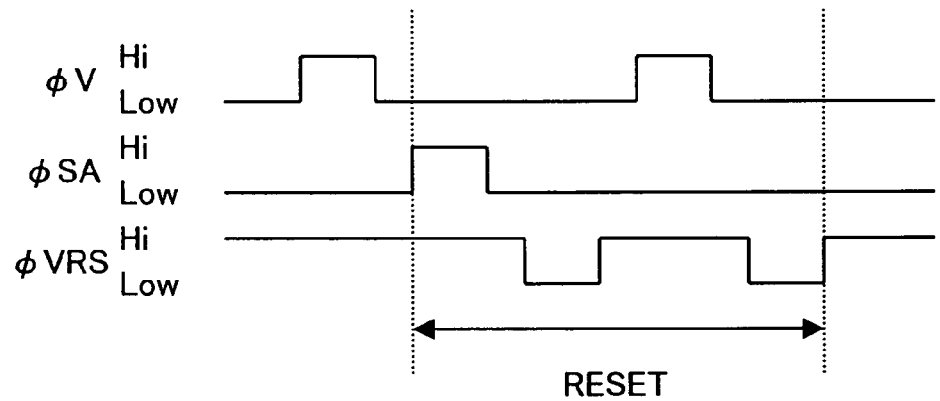
FIG. 45 is a timing chart of the signals fed to the constituent circuit elements of each pixel used in the fifteenth embodiment.

FIG. 45 is a timing chart of the relevant signals during an operation for resetting each pixel. After the pulse signal φV is fed to the gate of the MOS transistor T5 and an output signal is read out, first, the signal φSA is turned to a high level to turn the MOS transistor T13 on. When the MOS transistor T13 is turned on in this way, as in the thirteenth embodiment, the MOS transistor T3 receives at its gate the fourth voltage, and thus the gate voltage of the MOS transistor T3 is reset. After the gate voltage of the MOS transistor T3 is reset in this way, the signal φSA is turned to a low level to turn the MOS transistor T13 off.

Next, the pulse signal φVRS is fed to the gate of the MOS transistor T7 to reset the voltage at the node "a", and then the pulse signal φV is fed to the gate of the MOS transistor T5 to read out an output signal. The output signal thus obtained is proportional to the gate voltage of the MOS transistor T3, and is therefore read out as an output signal obtained when the pixel is initialized. When this output signal is read out, the pulse signal φVRS is once again fed to the gate of the MOS transistor T7 to reset the voltage at the node "a", and then an image sensing operation is started. Here, the pulse signal φVRS is a low-level pulse signal.

The output signal obtained when the pixel is initialized as described above is stored as compensation data in a memory such as a line memory so that, during an actual image sensing operation, the output signal from each pixel is corrected with the compensation data thus stored. This makes it possible to eliminate components resulting from variations in sensitivity among individual pixels from their output signals.

(2-b) Image Sensing Operation

After, as described above in connection with a reset operation, the pulse signal φVRS is fed to the gate of the MOS transistor T7 to reset the voltage at the node "a" and the capacitor C, an image sensing operation is started. This causes a photocurrent to flow through the photodiode PD, and thus causes the gate voltage of the MOS transistor T3 to change. Specifically, negative photoelectric charge is fed from the photodiode PD to the gate of the MOS transistor T3, and thus the gate voltage of the MOS transistor T3 is linearly proportional to the photocurrent. Here, the photoelectric charge that is generated in the photodiode PD and then flows into the MOS transistor T3 through its gate is negative. Thus, the more intense the incident light, the lower the gate voltage of the MOS transistor T3 becomes.

When a voltage linearly proportional to the photocurrent appears at the gate of the MOS transistor T3 in this way, now that the node "a" is reset to a voltage higher than the surface potential that is determined by the gate voltage of the MOS transistor T3, positive electric charge flows out of the capacitor C into the MOS transistor T3. Here, the amount of positive electric charge that flows out of the capacitor C is determined by the gate voltage of the MOS transistor T3. That is, the more intense the incident light and thus the lower the gate voltage of the MOS transistor T3, the larger the amount of positive electric charge flowing out of the capacitor C.

In this way, positive electric charge flows out of the capacitor C, and this makes the voltage at the node "a" proportional to the integral of the amount of incident light. Then, the pulse signal φV is fed to the MOS transistor T5 to turn this MOS transistor T5 on, so that a current linearly proportional to the integral of the photocurrent is delivered, through the MOS transistors T5 and T6, to the output signal line 6. In this way, a signal (output current) proportional to the integral of the amount of incident light is read out. Then, the MOS transistor T5 is turned off.

Here, as in the fourteenth embodiment (FIG. 40), the pixel may be so configured that a pulse signal (for example, φVPS) is fed to the drain of the MOS transistor T3 so that this pulse signal φVPS enables the MOS transistor T3 to reset the voltage at the node "a". This makes it possible to omit the MOS transistor T7 from the pixel configured as shown in FIG. 43. In this case, the pulse signal φVPS fed to the drain of the MOS transistor T3 is fed in by way of a separate power line from that for the direct-current voltage VPS that is applied to the anode of the photodiode PD.

Sixteenth Embodiment

Figure 46:
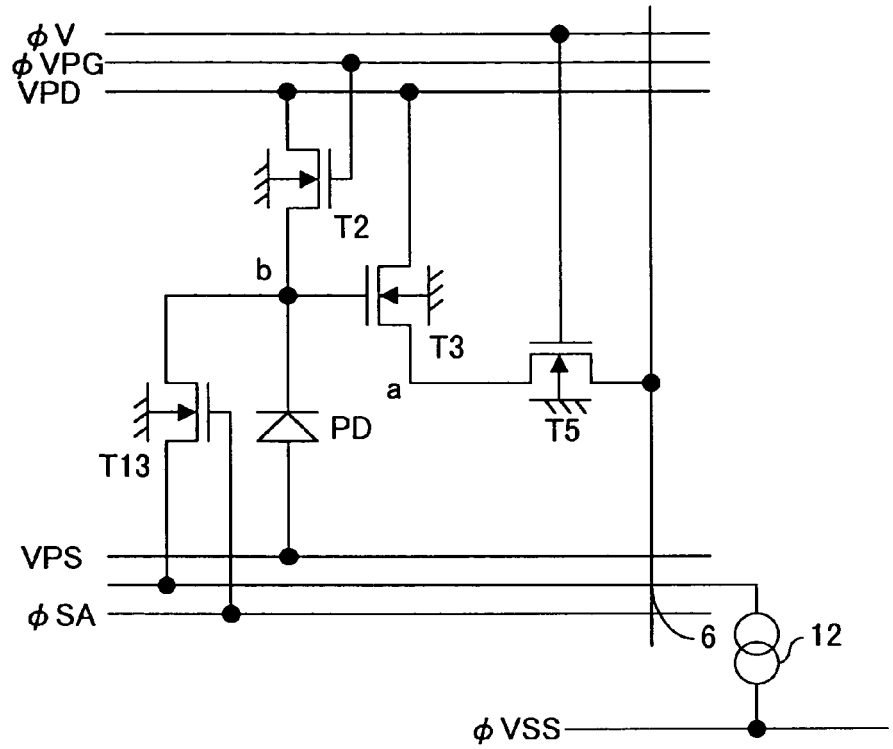
FIG. 46 is a circuit diagram showing the configuration of each pixel in a sixteenth embodiment of the invention.

A sixteenth embodiment of the invention will be described below with reference to the drawings. FIG. 46 is a circuit diagram showing the configuration of each pixel provided in the solid-state image-sensing device of this embodiment. In the following descriptions, such circuit elements, signal lines, and others as serve the same purposes as in the pixel shown in FIG. 39 are identified with the same reference numerals or symbols, and their detailed explanations will not be repeated.

As shown in FIG. 46, in this embodiment, the direct-current voltage VPD is applied to the drain of the MOS transistor T3, and the capacitor C and the MOS transistors T7 and T6 found in the previously-described (thirteenth) embodiment are omitted. In other respects, the pixel of this embodiment is configured in the same manner as that of the thirteenth embodiment (FIG. 39).

Here, as in the thirteenth embodiment, the signal φVPG takes either a first voltage that permits the MOS transistor T2 to operate in a subthreshold region or a second voltage that turns the MOS transistor T2 off. On the other hand, the signal φVSS fed to the constant-current source 12 takes either a third voltage that permits a current to flow through the MOS transistor T2 in an operation for detecting pixel-to-pixel variations or a fourth voltage that raises the gate voltage of the MOS transistor T3 in a reset operation.

(1) The Mode in Which the Photocurrent is Converted Natural-Logarithmically for Output In this mode, the signal φVSS is kept at the third voltage.

(1-a) Image Sensing Operation

First, the signal φVPG is turned to the first voltage to make the MOS transistor T2 operate in a subthreshold region, and the signal φSA fed to the gate of the MOS transistor T13 is turned to a low level to turn the MOS transistor T13 off. In this state, when light is incident on the photodiode PD, a photocurrent is generated therein, and, due to the subthreshold characteristics of a MOS transistor, a voltage natural-logarithmically proportional to the photocurrent appears at the source of the MOS transistor T2 and at the gate of the MOS transistor T3. Here, the photoelectric charge generated in the photodiode PD is negative, and therefore flows into the MOS transistor T2 through its source. Thus, the more intense the incident light, the lower the source voltage of the MOS transistor T2 becomes.

When a voltage natural-logarithmically proportional to the photocurrent appears at the gate of the MOS transistor T3 in this way, the pulse signal φV is fed to the MOS transistor T5 to turn this MOS transistor T5 on, so that a current natural-logarithmically proportional to the photocurrent is delivered, through the MOS transistors T3 and T5, to the output signal line 6. In this way, a signal (output current) proportional to the logarithm of the amount of incident light is read out. Then, the MOS transistor T5 is turned off.

(1-b) Sensitivity Variation Detection Operation

Figure 47:
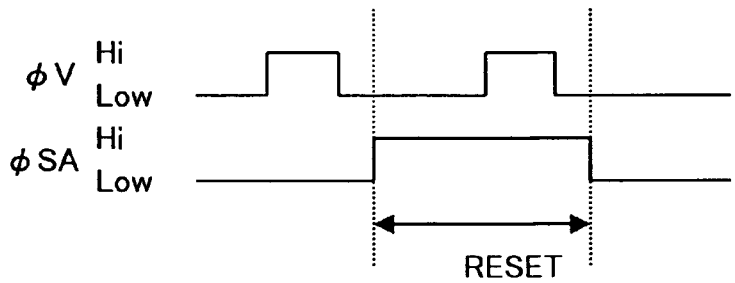
FIG. 47 is a timing chart of the signals fed to the constituent circuit elements of each pixel used in the sixteenth embodiment.

FIG. 47 is a timing chart of the relevant signals during an operation for detecting variations in sensitivity among individual pixels. After, as described above, the pulse signal φV is fed to the gate of the MOS transistor T5 and an output signal is read out, first, as in the thirteenth embodiment (FIG. 39), the signal φSA is turned to a high level to turn the MOS transistor T13 on so that the constant-current source 12 is connected to the node "b". Here, as described previously, the signal φVSS is kept at the third voltage so that a high current flows from the MOS transistor T2 to the constant-current source 12.

Here, as in the thirteenth embodiment, the current flowing through the MOS transistor T2 is substantially equal to the current flowing through the constant-current source 12. Thus, the voltage appearing at the node "b" now is determined by the current flowing through the constant-current source 12, and is proportional to the variation in the threshold level of the MOS transistor T2 of each pixel. In this state, with a current flowing through the MOS transistor T2, the pulse signal φV is fed to the gate of the MOS transistor T5 to read out an output signal.

The output signal thus read out is proportional to the threshold voltage of the MOS transistor T2, and thus permits detection of the variation in sensitivity of each pixel. Then, finally, the signal φSA is turned to a low level to turn the MOS transistor T13 off in preparation for the next image sensing operation. The output signal obtained in a sensitivity variation detection operation as described above is stored as compensation data in a memory such as a line memory so that, during an actual image sensing operation, the output signal from each pixel is corrected with the compensation data thus stored. This makes it possible to eliminate components resulting from variations in sensitivity among individual pixels from their output signals.

(2) The Mode in Which the Photocurrent is Converted Linearly for Output

In this mode, as in the thirteenth embodiment, the signal φVPG is kept at the second voltage to keep the MOS transistor T2 off so that the MOS transistor T3 operates as a transistor for signal amplification. On the other hand, the signal φVSS is kept at the fourth voltage.

(2-a) Image Sensing Operation

First, as in the thirteenth embodiment, the signal φSA is turned to a low level to turn the MOS transistor T13 off so that the constant-current source 12 is disconnected from the node "b" between the gate of the MOS transistor T3 and the cathode of the photodiode PD. This causes a photocurrent to flow through the photodiode PD, and thus causes the gate voltage of the MOS transistor T3 to change. Specifically, negative photoelectric charge is fed from the photodiode PD to the gate of the MOS transistor T3, and thus the gate voltage of the MOS transistor T3 is linearly proportional to the photocurrent. Here, the photoelectric charge that is generated in the photodiode PD and then flows into the MOS transistor T3 through its gate is negative. Thus, the more intense the incident light, the lower the gate voltage of the MOS transistor T3 becomes.

When a voltage linearly proportional to the photocurrent appears at the gate of the MOS transistor T3 in this way, the pulse signal φV is fed to the MOS transistor T5 to turn this MOS transistor T5 on. This causes a current linearly proportional to the integral of the photocurrent to be delivered, through the MOS transistors T3 and T5, to the output signal line 6. In this way, a signal (output current) proportional to the integral of the amount of incident light is read out. Then, the MOS transistor T5 is turned off.

(2-b) Reset Operation

Figure 48:
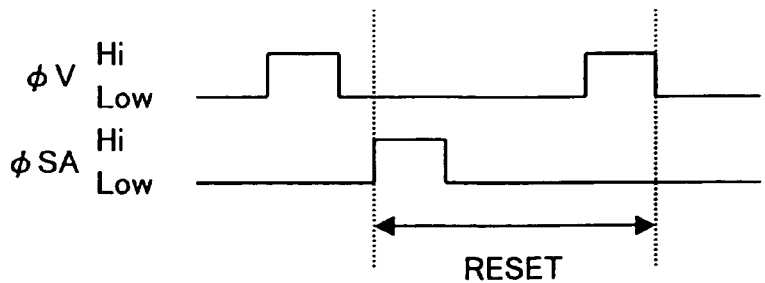
FIG. 48 is a timing chart of the signals fed to the constituent circuit elements of each pixel used in the sixteenth embodiment.

FIG. 48 is a timing chart of the relevant signals during an operation for resetting each pixel. After, as described above, the pulse signal φV is fed to the gate of the MOS transistor T5 and an output signal is read out, first, the signal φSA is turned to a high level to turn the MOS transistor T13 on. When the MOS transistor T13 is turned on in this way, as in the thirteenth embodiment, the MOS transistor T3 receives at its gate the fourth voltage, and thus the gate voltage of the MOS transistor T3 is reset. Then, the signal φSA is turned back to a low level to turn the MOS transistor T13 off.

Next, the pulse signal φV is fed to the gate of the MOS transistor T5 and an output signal is read out. The output signal thus obtained is proportional to the gate voltage of the MOS transistor T3, and is therefore read out as an output signal obtained when the pixel is initialized. When this output signal is read out, an image sensing operation as described above is started again. The output signal obtained when the pixel is initialized as described above is stored as compensation data in a memory such as a line memory so that, during an actual image sensing operation, the output signal from each pixel is corrected with the compensation data thus stored. This makes it possible to eliminate components resulting from variations in sensitivity among individual pixels from their output signals.

In this embodiment, it is not necessary to perform integration of the photoelectric signal by the use of a capacitor C as performed in the thirteenth to fifteenth embodiments described previously, and thus no time is required for such integration, nor is it necessary to reset the capacitor C. This ensures accordingly faster signal processing. Moreover, in this embodiment, as compared with the thirteenth to fifteenth embodiments, the capacitor C and the MOS transistor T6 can be omitted, and this helps further simplify the circuit configuration and reduce the pixel size.

In the thirteenth to sixteenth embodiments, in the linear conversion mode, the resetting of the node "b" is achieved by turning the switch SW or the MOS transistor T13 on so that the signal φVSS, when it is at the fourth voltage, is fed thereto. However, the resetting of the node "b" may also be achieved by turning the MOS transistor T2 on. In this case, the MOS transistor T2 receives at its drain the signal φDA of which the voltage is at the first voltage in the logarithmic conversion mode and at the fourth voltage in the linear conversion mode. In this case, the signal φDA may even have a fixed voltage provided that the succeeding stage is so optimized as to read signals correctly as long as the voltage at the node "a" always falls within a predetermined voltage range whether during a reset period or during a logarithmic conversion operation period.

In the second to sixteenth embodiments, as in the first embodiment, the output signal obtained during a reset operation is output serially, from one pixel after another, by way of the signal line 9 shown in FIG. 5, 21, 24, or 35 to the succeeding circuit so as to be stored as pixel-by-pixel compensation data in a memory provided therein. Then, by correcting pixel by pixel the output current obtained during an actual image sensing operation with the compensation data thus stored, it is possible to eliminate components resulting from variations in sensitivity among individual pixels from their output signal. A practical example of how this correction is achieved is shown in FIG. 76 and will be described later. This correction may be realized by providing memories, such as line memories, within the pixels.

In any of the first to sixteenth embodiments described hereinbefore, the reading of the signal from each pixel may be achieved by the use of a charge-coupled device (CCD). In that case, the transfer of an electric charge to the CCD is achieved by providing a potential barrier with a variable potential level that corresponds to the MOS transistor T5.

In the first to fifth, seventh to fourteenth, and sixteenth embodiments described hereinbefore, the MOS transistors T1 to T7 and T11 to T13 provided within each pixel as active elements are all formed as N-channel MOS transistors; however, all these MOS transistors T1 to T7 and T11 to T13 may be formed as P-channel MOS transistors instead. On the other hand, in the sixth and fifteenth embodiments, it is possible, within each pixel, to replace all the N-channel MOS transistors with P-channel MOS transistors and replace all the P-channel MOS transistors with N-channel MOS transistors.

Figure 59:
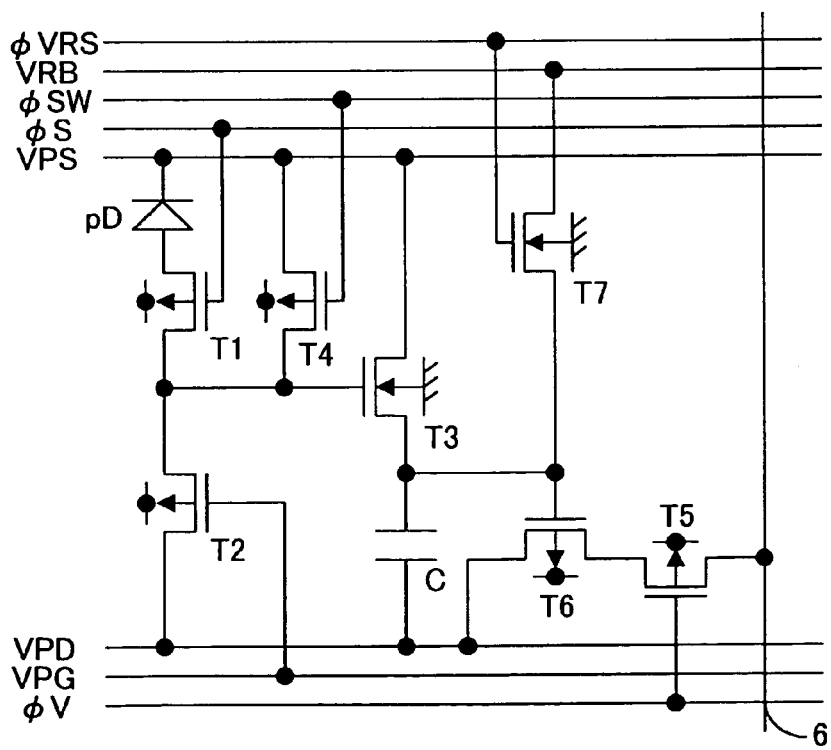
FIG. 59 is a circuit diagram showing the configuration of each pixel in a twenty-second embodiment of the invention.
Figure 60:
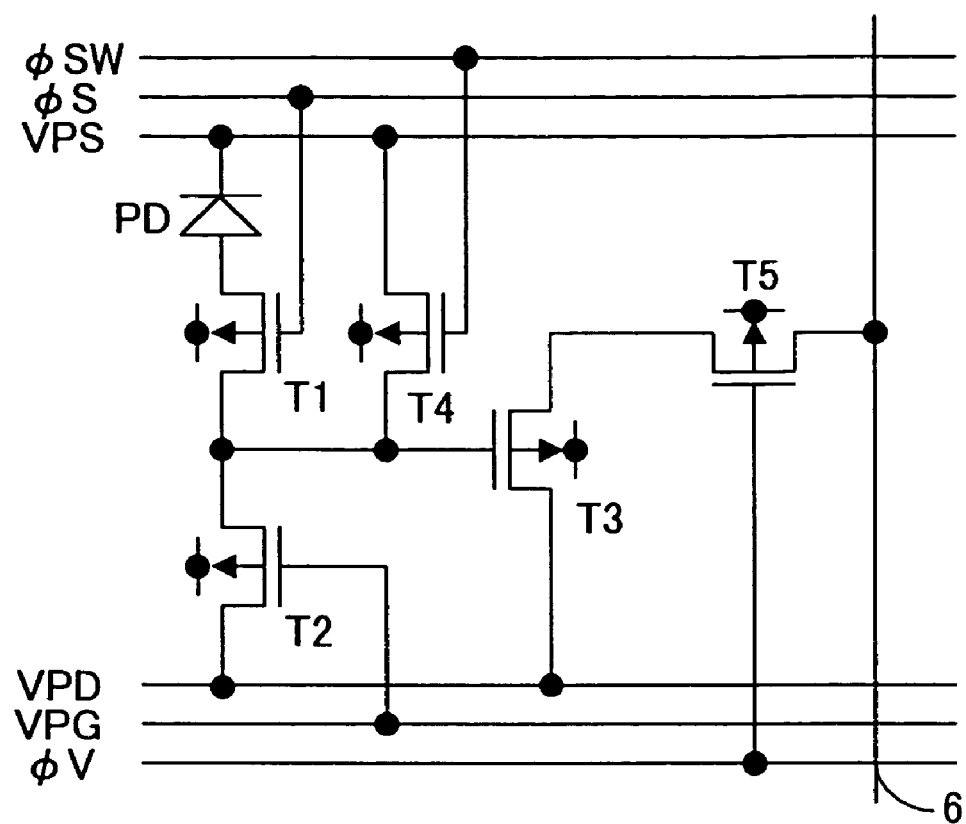
FIG. 60 is a circuit diagram showing the configuration of each pixel in a twenty-third embodiment of the invention.
Figure 74:
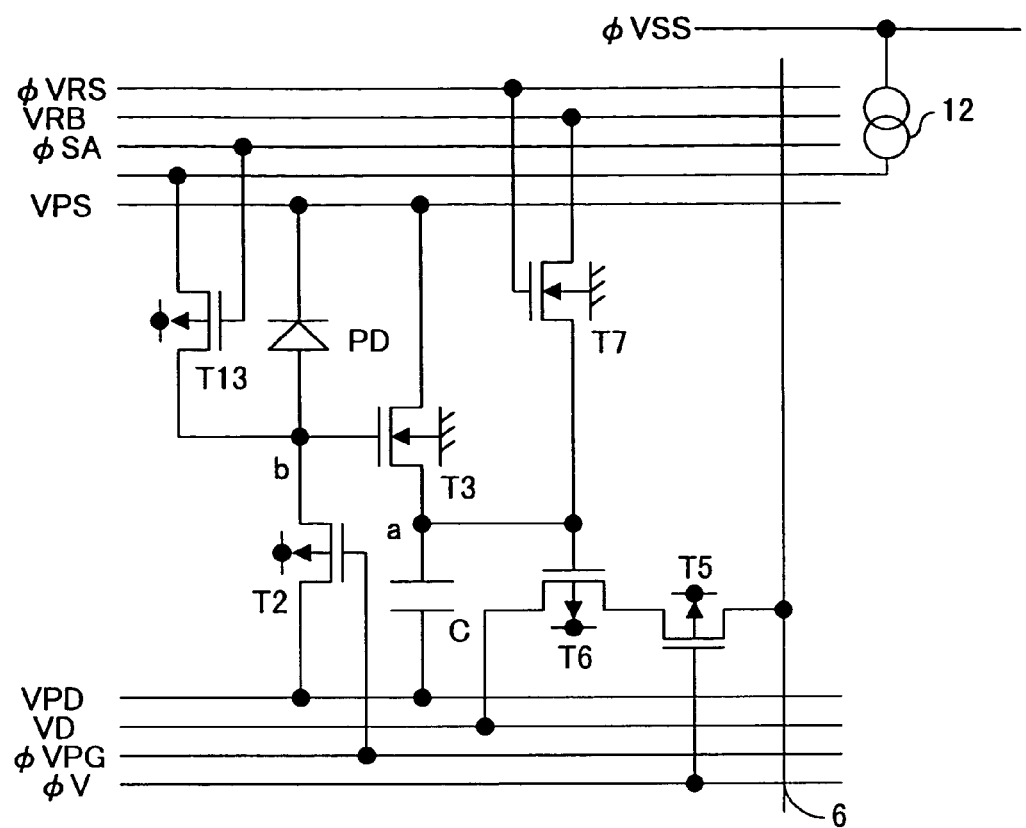
FIG. 74 is a circuit diagram showing another example of the configuration of each pixel in the thirty-first embodiment.
Figure 75:
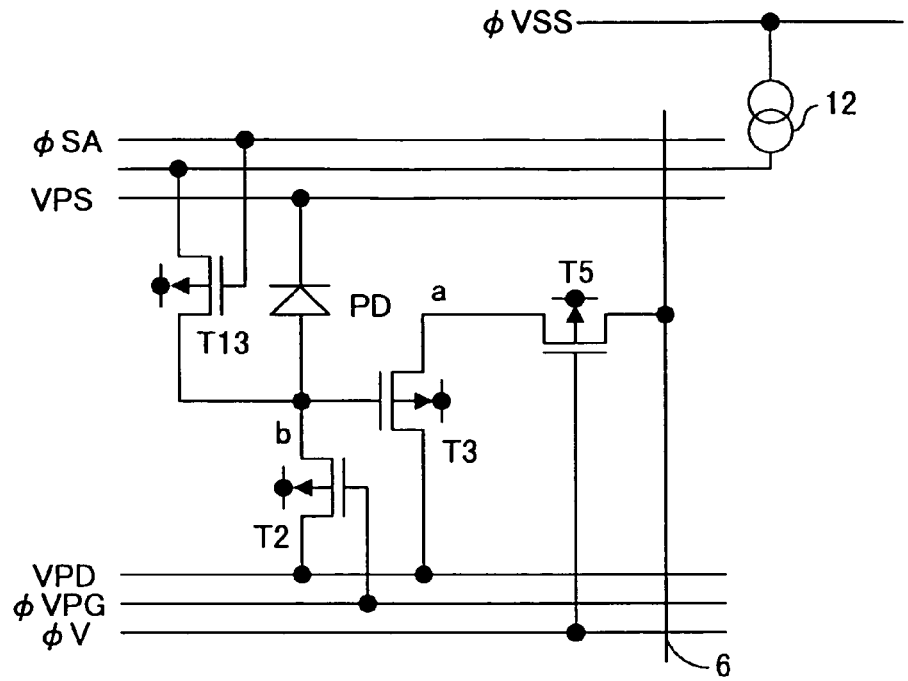
FIG. 75 is a circuit diagram showing another example of the configuration of each pixel in the thirty-second embodiment.

FIGS. 50, 53 to 55, 58, 60, 62, 64 to 67, 70, 72, 73, and 75 show seventeenth to twenty-first, twenty-third to thirtieth, and thirty-second embodiments of the invention, which are examples of modified versions of the first to fifth, seventh to fourteenth, and sixteenth embodiments described hereinbefore in which P-type MOS transistors are used. On the other hand, FIGS. 59 and 74 show twenty-second and thirty-first embodiments of the invention, which are examples of modified versions of the sixth and fifteenth embodiments described hereinbefore in which MOS transistors of opposite conductivity types are used.

Figure 56:
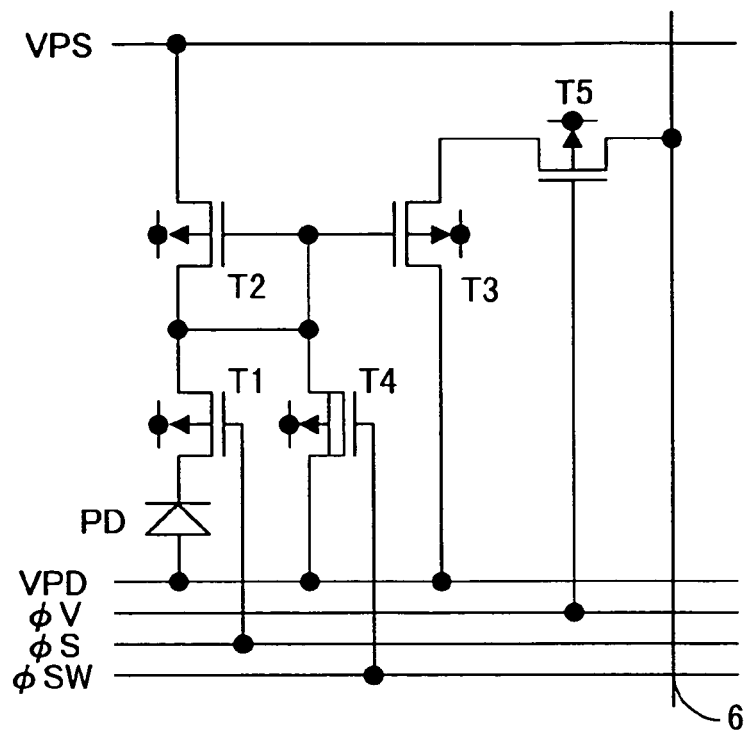
FIG. 56 is a circuit diagram showing another example of the configuration of each pixel in the twentieth embodiment.
Figure 57:
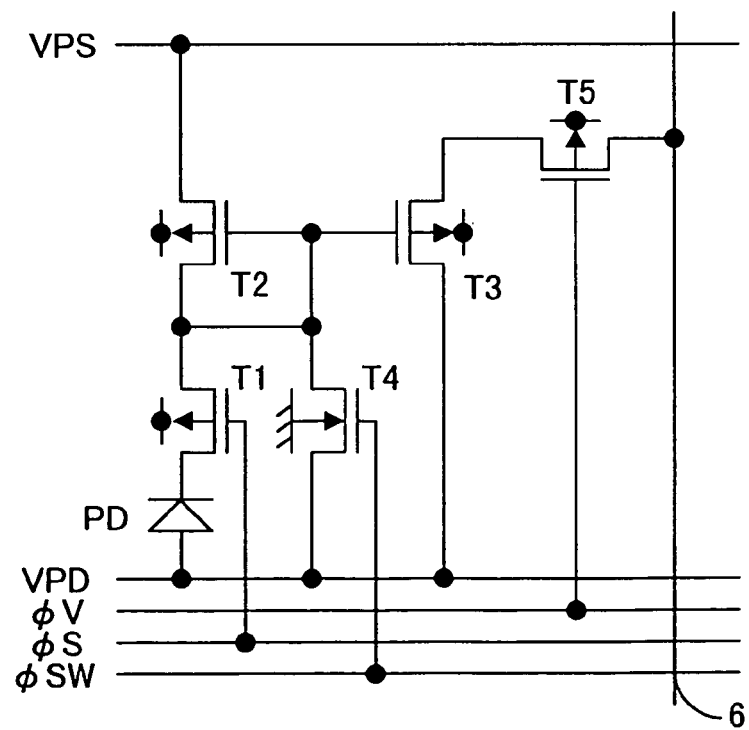
FIG. 57 is a circuit diagram showing another example of the configuration of each pixel in the twentieth embodiment.
Figure 58:
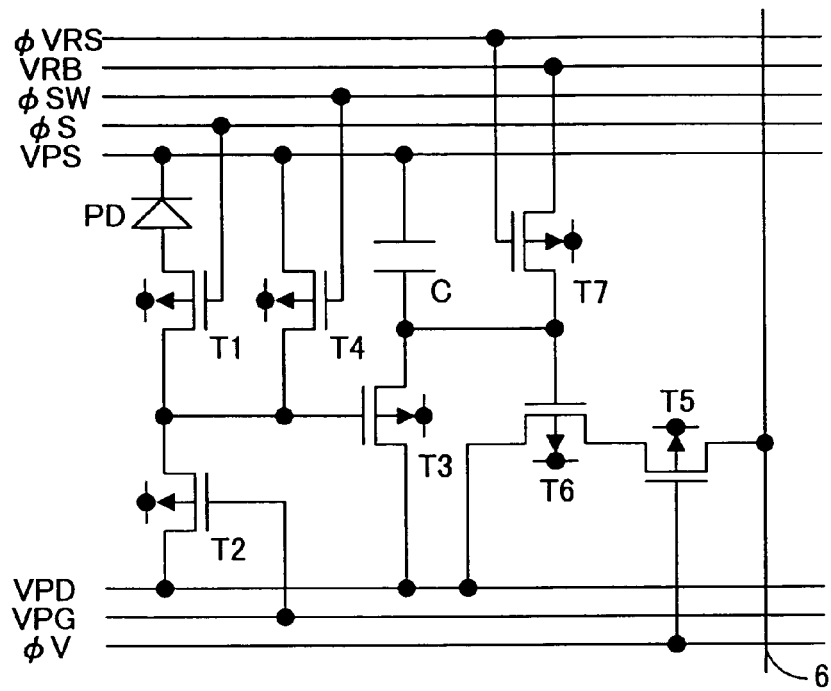
FIG. 58 is a circuit diagram showing the configuration of each pixel in a twenty-first embodiment of the invention.
Figure 68:
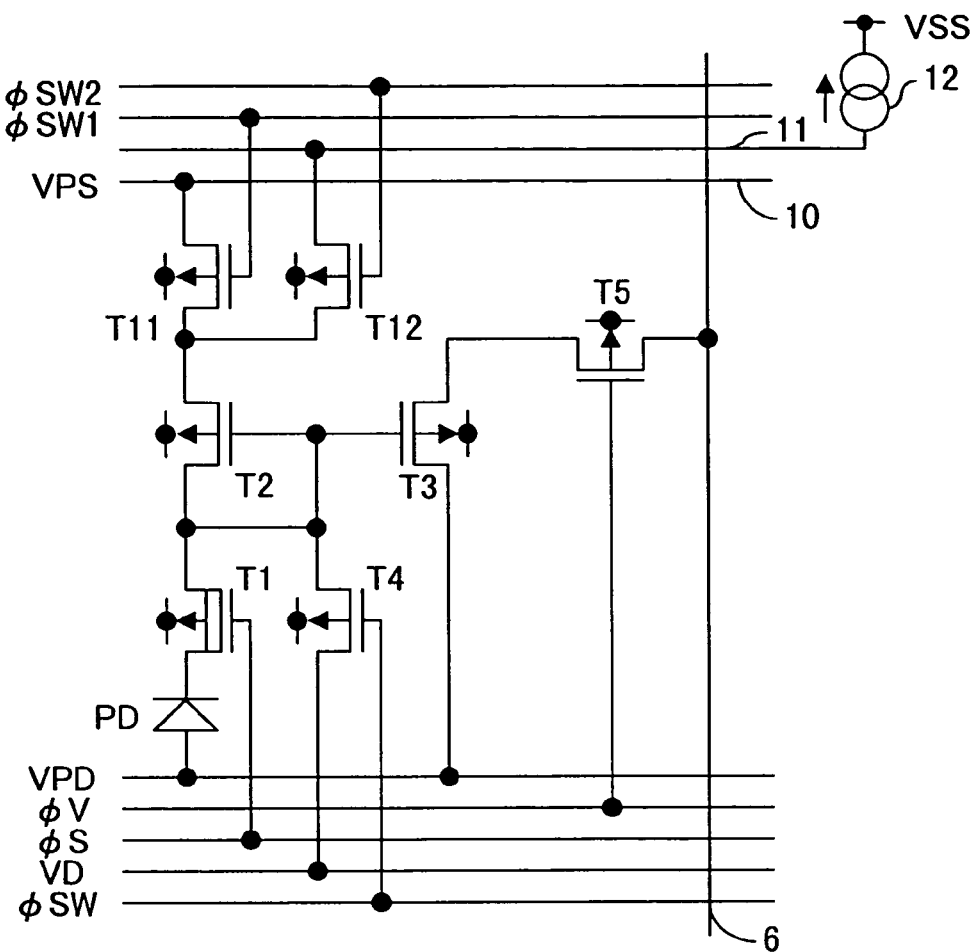
FIG. 68 is a circuit diagram showing another example of the configuration of each pixel in the twenty-eighth embodiment.
Figure 69:
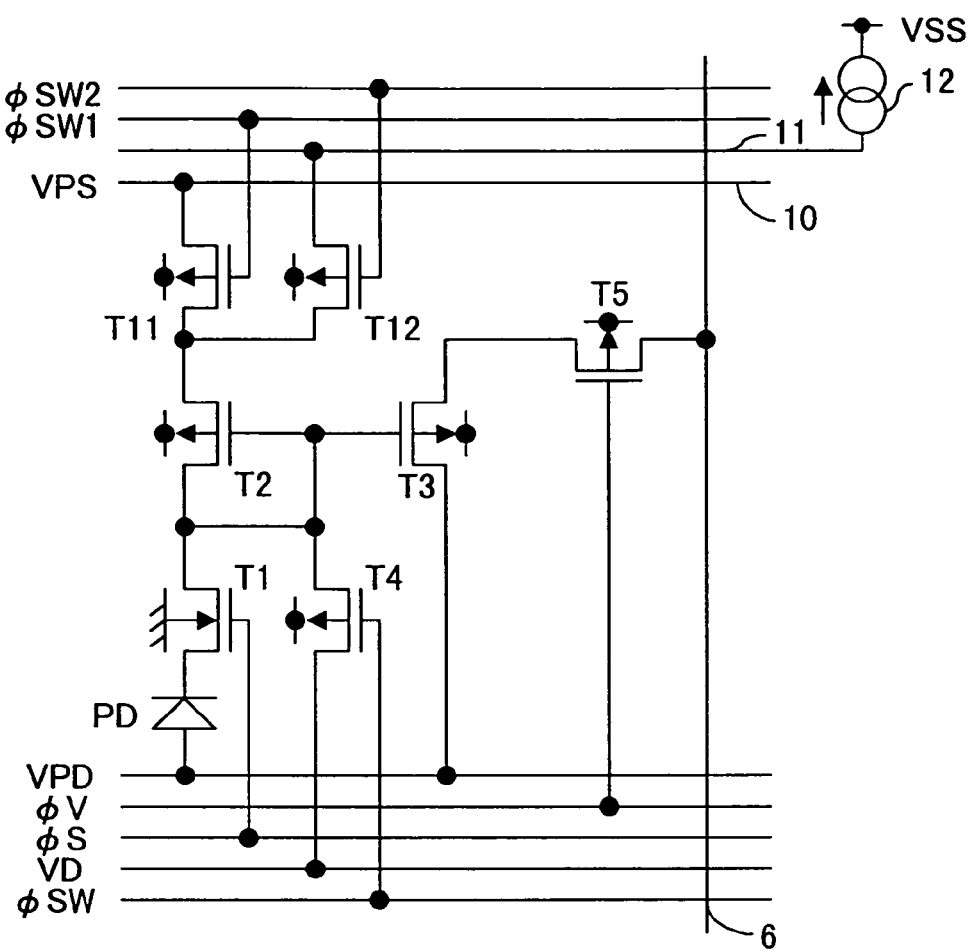
FIG. 69 is a circuit diagram showing another example of the configuration of each pixel in the twenty-eighth embodiment.
Figure 70:
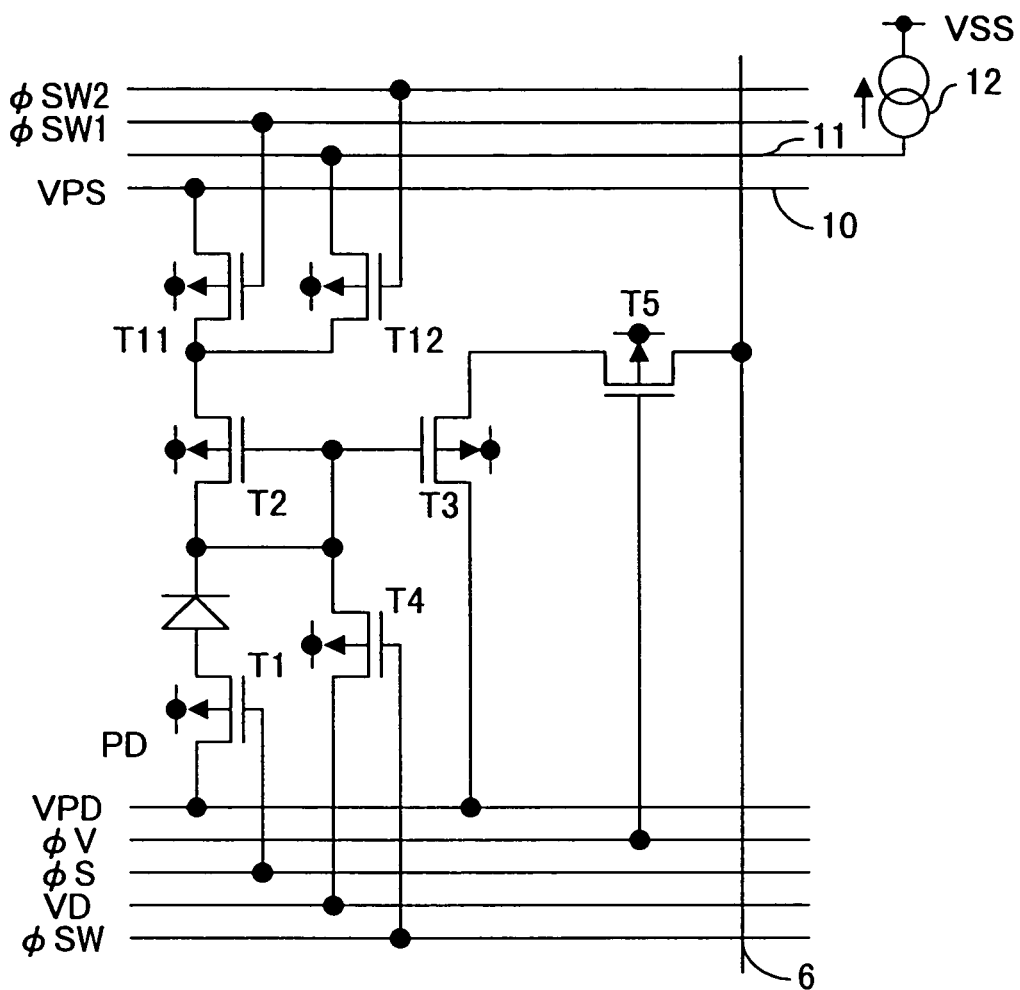
FIG. 70 is a circuit diagram showing another example of the configuration of each pixel in the twenty-eighth embodiment.

FIG. 56 shows a modified version of the nineteenth embodiment in which a depletion-mode P-channel MOS transistor is used as the MOS transistor T4. FIG. 57 shows a modified version of the nineteenth embodiment in which an N-channel MOS transistor is used as the MOS transistor T4. FIG. 68 shows a modified version of the twenty-eighth embodiment in which a depletion-mode P-channel MOS transistor is used as the MOS transistor T1. FIG. 69 shows a modified version of the twenty-eighth embodiment in which an N-channel MOS transistor is used as the MOS transistor T1.

Accordingly, in FIGS. 49 to 75, all the elements used and the voltages applied have the opposite polarities. For example, in FIG. 50 (the seventeenth embodiment), the photodiode PD has its anode connected to the direct-current voltage VPD, and has its cathode connected to the drain of the MOS transistor T1. Moreover, the MOS transistor T1 has its source connected to the drain of the MOS transistor T2 and to the gate of the MOS transistor T3. The MOS transistor T2 receives the direct-current voltage VPS at its source.

Figure 50:
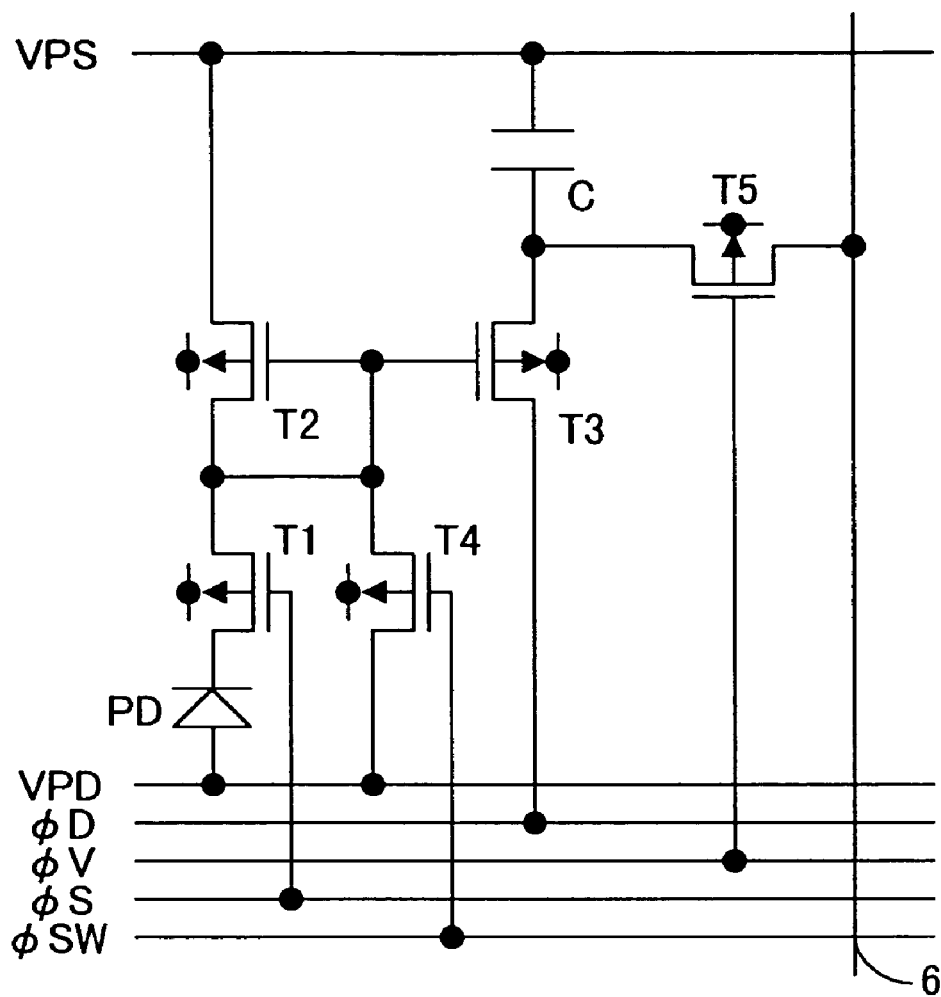
FIG. 50 is a circuit diagram showing the configuration of each pixel in a seventeenth embodiment of the invention.

When logarithmic conversion is performed in the pixel configured as shown in FIG. 50, the direct-current voltage VPS and the direct-current voltage VPD fulfill the relation VPS>VPD, thus an inverted relation as compared with the case shown in FIG. 2 (the first embodiment). Moreover, the output voltage of the capacitor C is initially high, and drops as a result of integration. Moreover, when the MOS transistor T1, T5, or T4 is turned on, a low voltage is applied to the gate thereof. In the embodiments shown in FIGS. 53 and 58 (the eighteenth and twenty-first embodiments), when the MOS transistor T7 is turned on, a low voltage is applied to the gate thereof. In the pixel configured as shown in FIG. 57, when the N-channel MOS transistor T4 is turned on, a high voltage is applied to the gate thereof.

In the embodiment shown in FIG. 59 (the second-second embodiment), when the MOS transistor T5 is turned on, a low voltage is applied to the gate thereof, and, when the MOS transistor T7 is turned on, a high voltage is applied to the gate thereof. In the embodiments shown in FIGS. 62 and 64 to 70 (the twenty-fourth to twenty-eighth embodiments), when the MOS transistor T11 or T12 is turned on, a low voltage is applied to the gate thereof. In the embodiments shown in FIGS. 73 to 75 (the thirtieth to thirty-second embodiments), when the MOS transistor T13 is turned on, a low voltage is applied to the gate thereof. In this way, in cases where MOS transistors of opposite conductivity types are used, although how the voltages are applied and the elements are connected differs partially, the circuits are configured substantially in the same manner and operate basically in the same manner. Therefore, with respect to the seventeenth to thirty-second embodiments, only illustrations are given in FIGS. 49 to 75, and no descriptions will be given of their configuration and operation.

Figure 49:
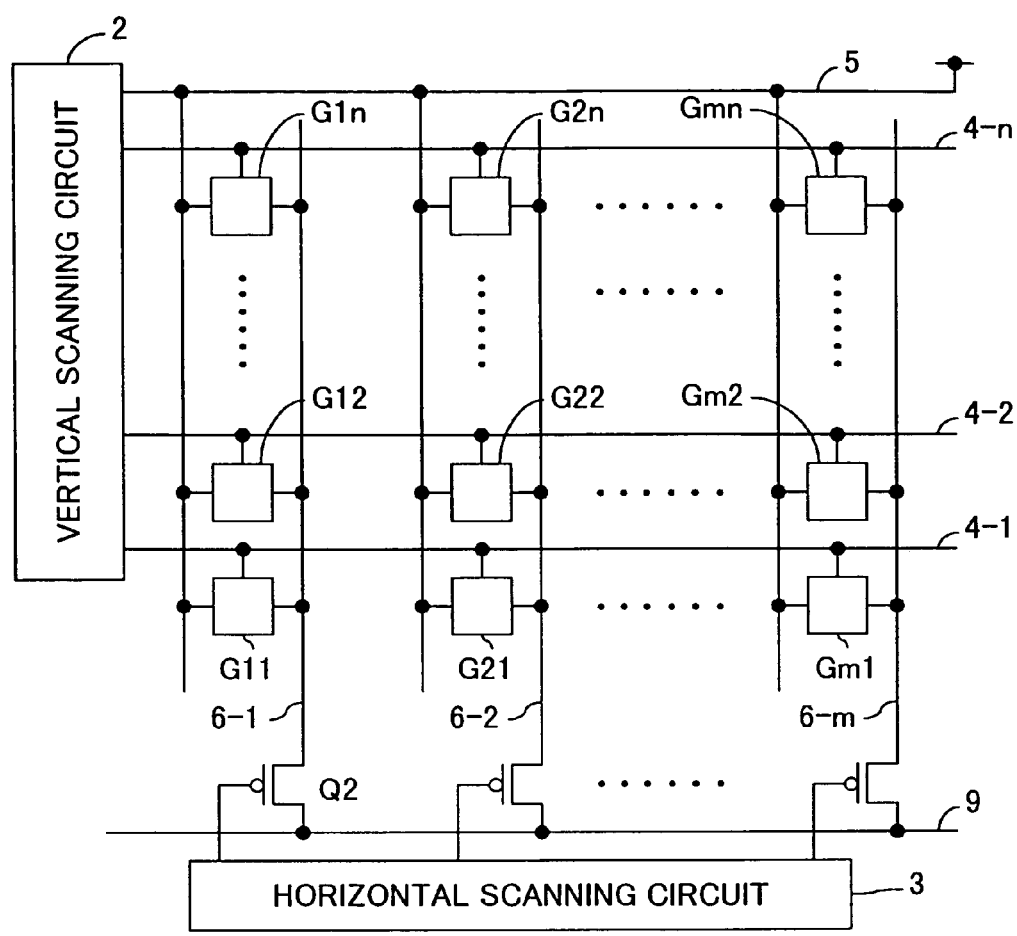
FIG. 49 is a block diagram illustrating the overall configuration of a two-dimensional solid-state image-sensing device embodying the invention, when all the active element within each pixel are formed as P-channel MOS transistors.
Figure 51:
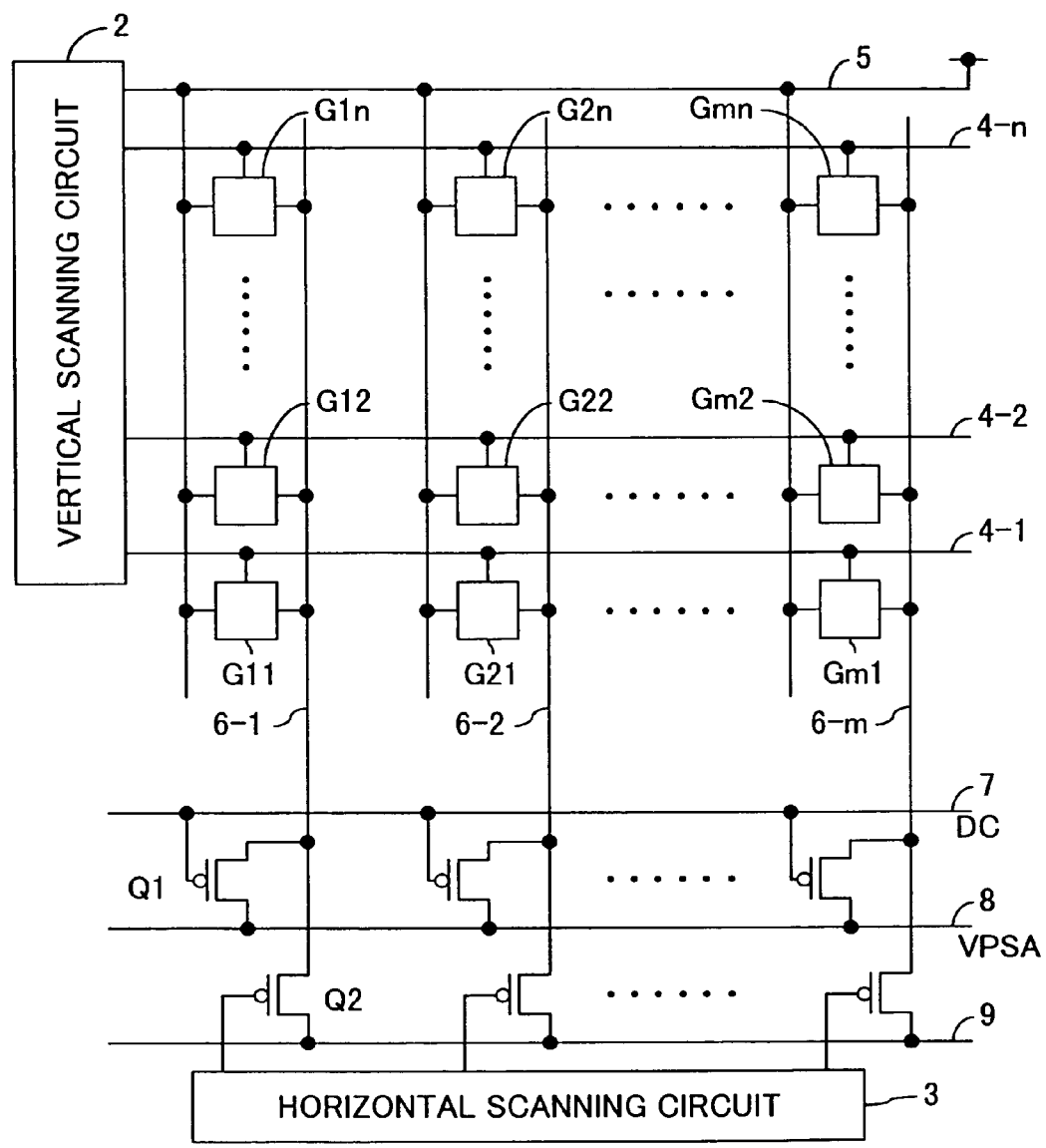
FIG. 51 is a block diagram illustrating the overall configuration of another two-dimensional solid-state image-sensing device embodying the invention, when all the active element within each pixel are formed as P-channel MOS transistors.
Figure 61:
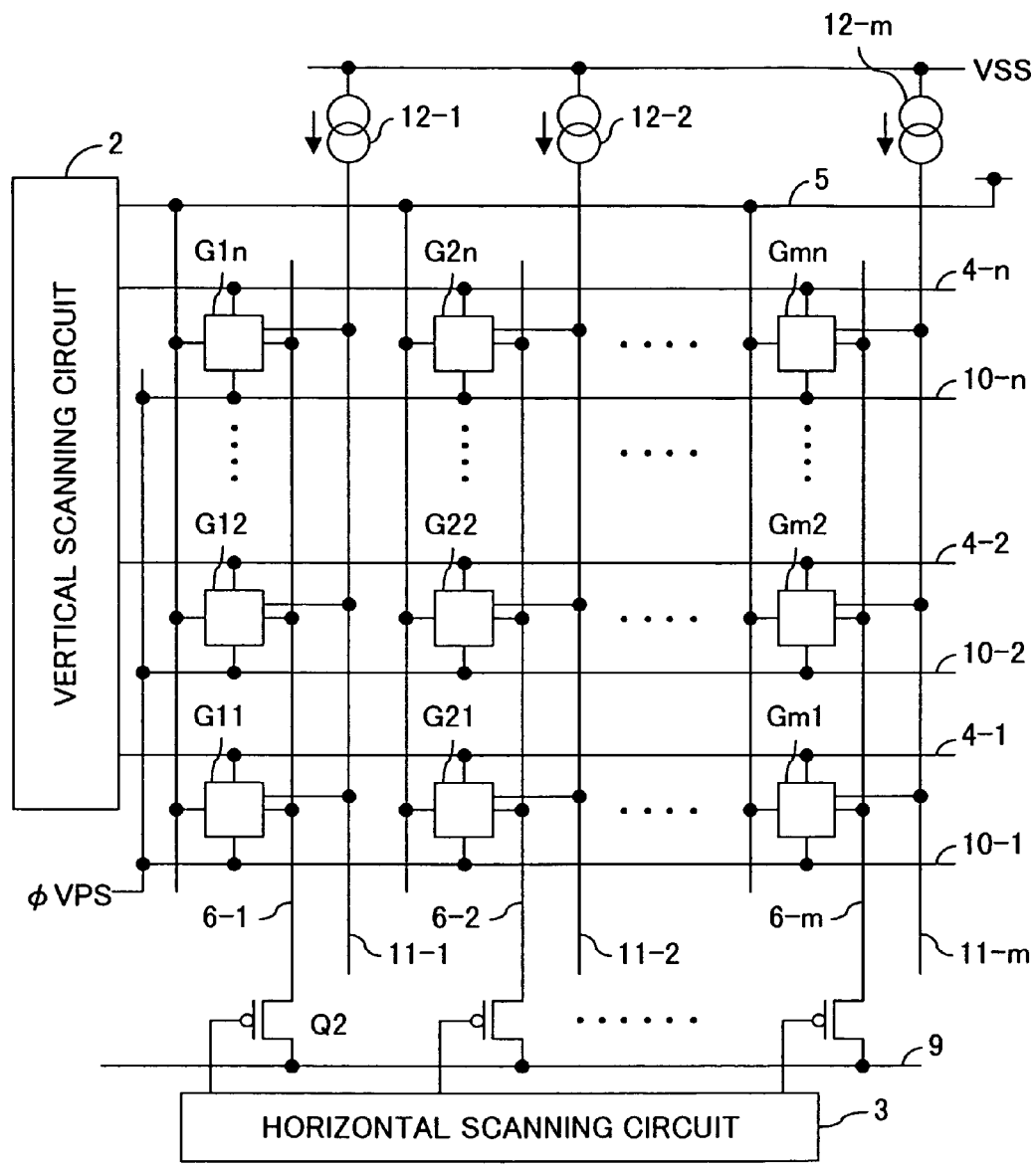
FIG. 61 is a block diagram illustrating the overall configuration of another two-dimensional solid-state image-sensing device embodying the invention, when all the active element within each pixel are formed as P-channel MOS transistors.
Figure 62:
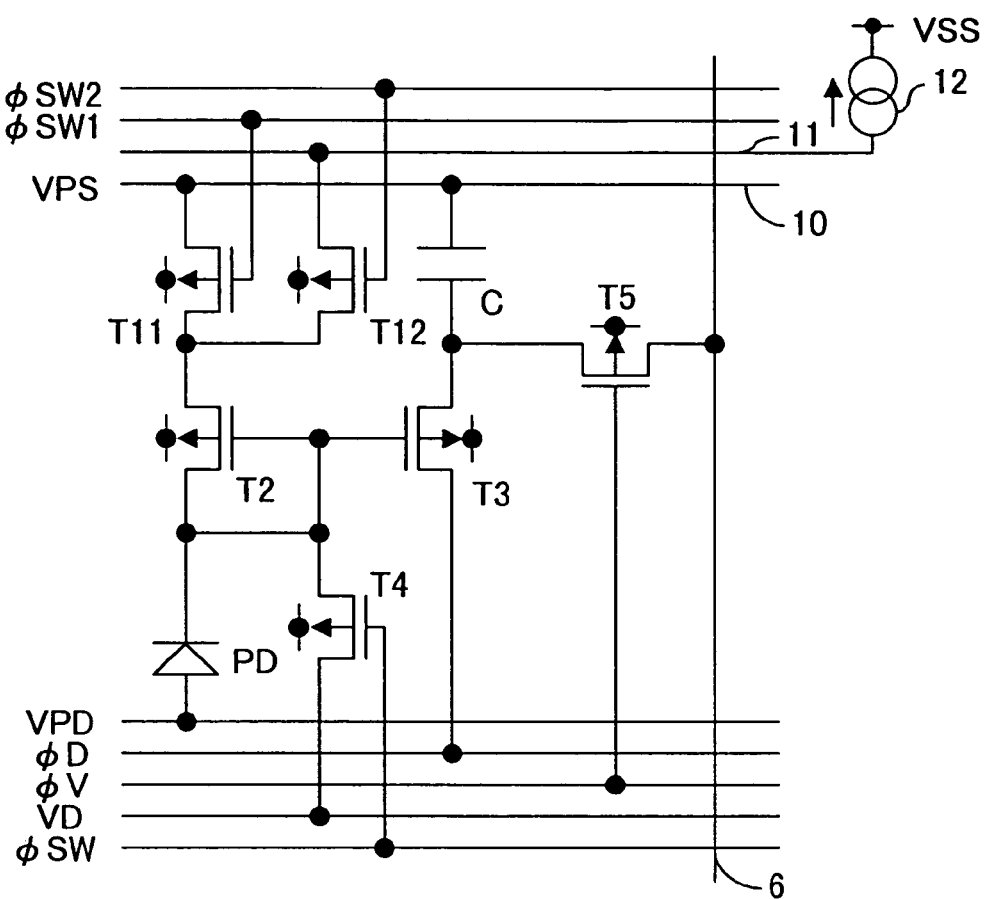
FIG. 62 is a circuit diagram showing the configuration of each pixel in a twenty-fourth embodiment of the invention.
Figure 63:
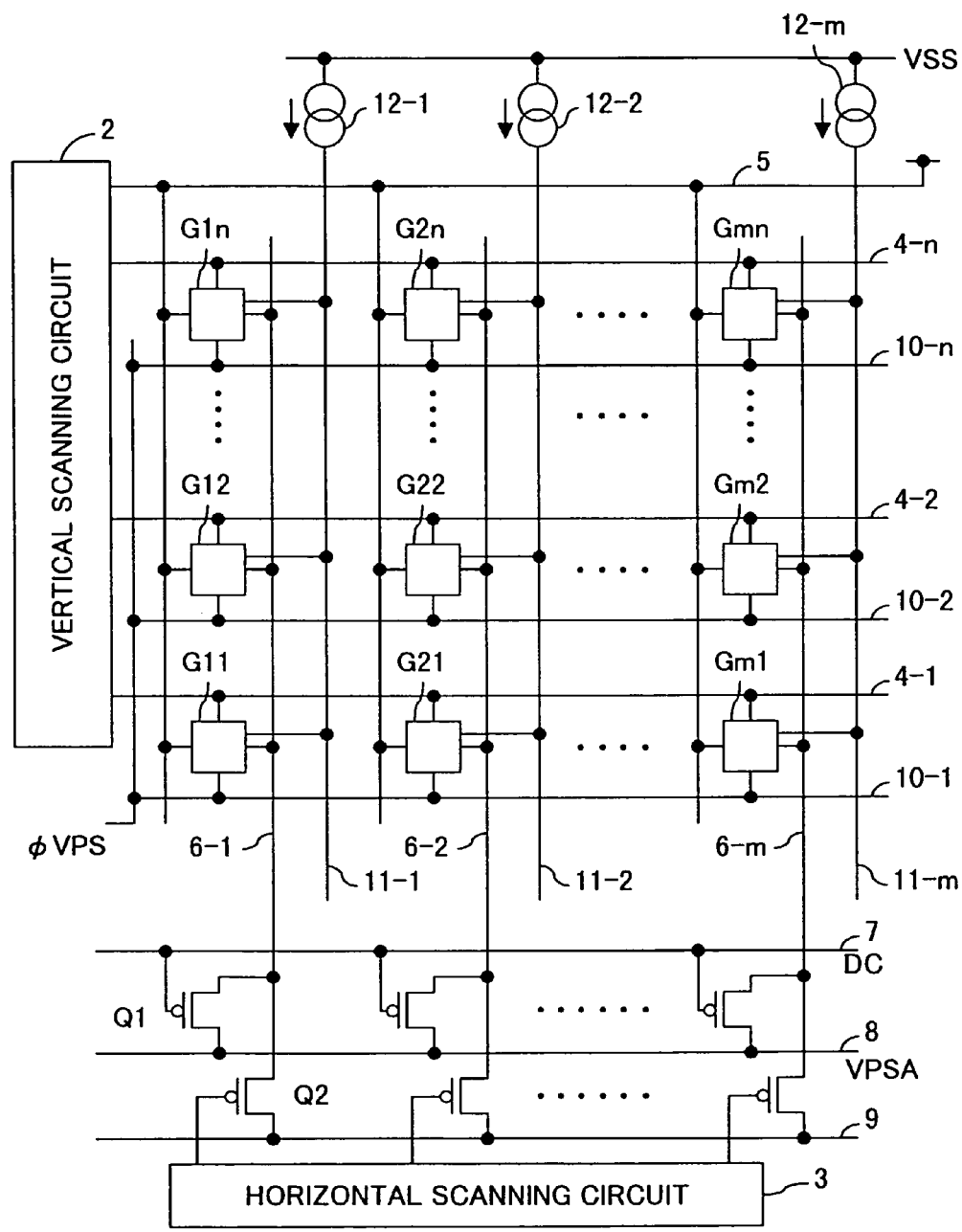
FIG. 63 is a block diagram illustrating the overall configuration of another two-dimensional solid-state image-sensing device embodying the invention, when all the active element within each pixel are formed as P-channel MOS transistors.
Figure 64:
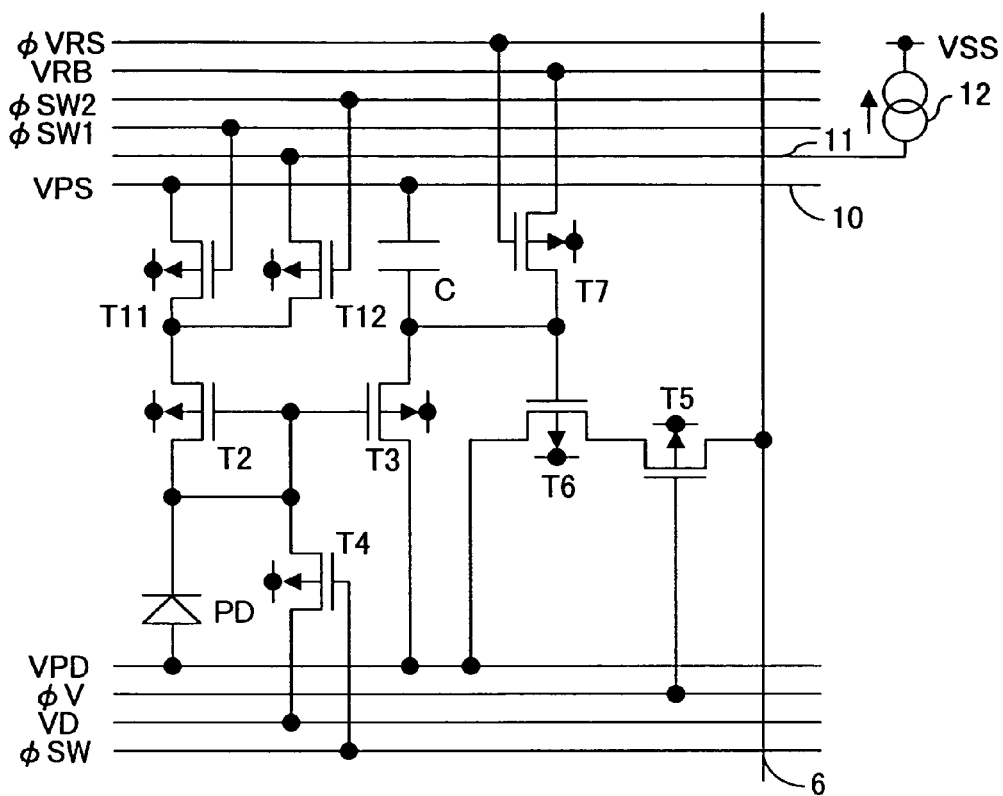
FIG. 64 is a circuit diagram showing the configuration of each pixel in a twenty-fifth embodiment of the invention.
Figure 65:
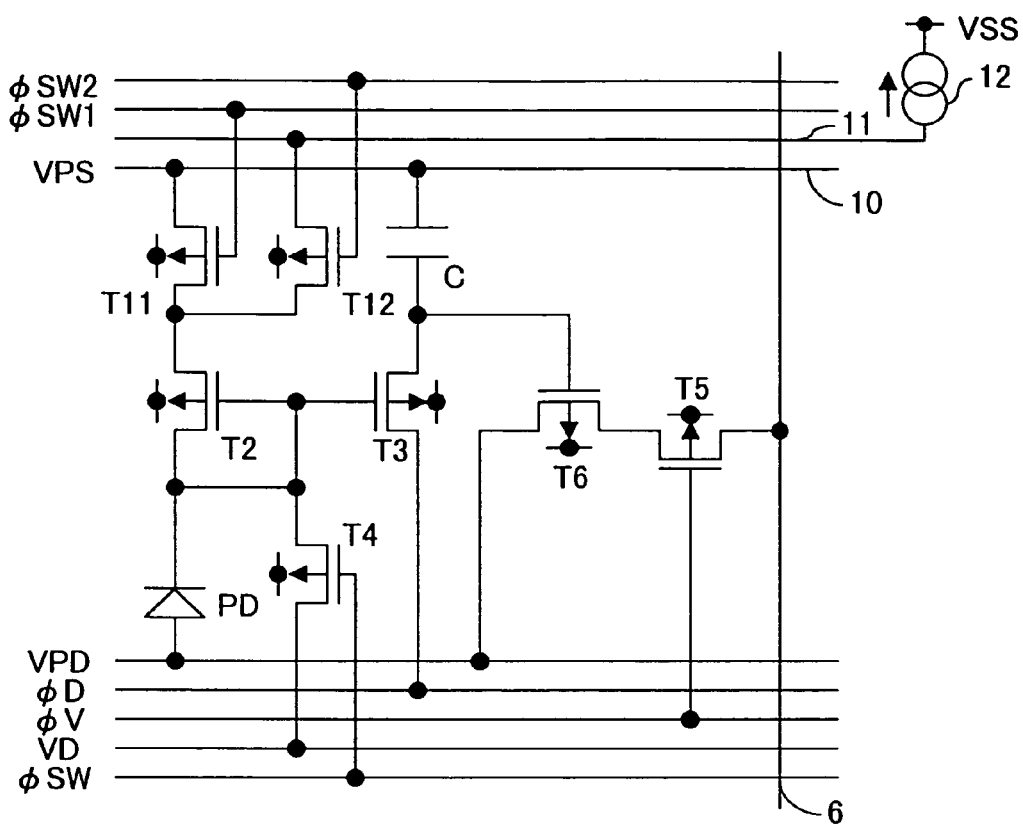
FIG. 65 is a circuit diagram showing the configuration of each pixel in a twenty-sixth embodiment of the invention.
Figure 66:
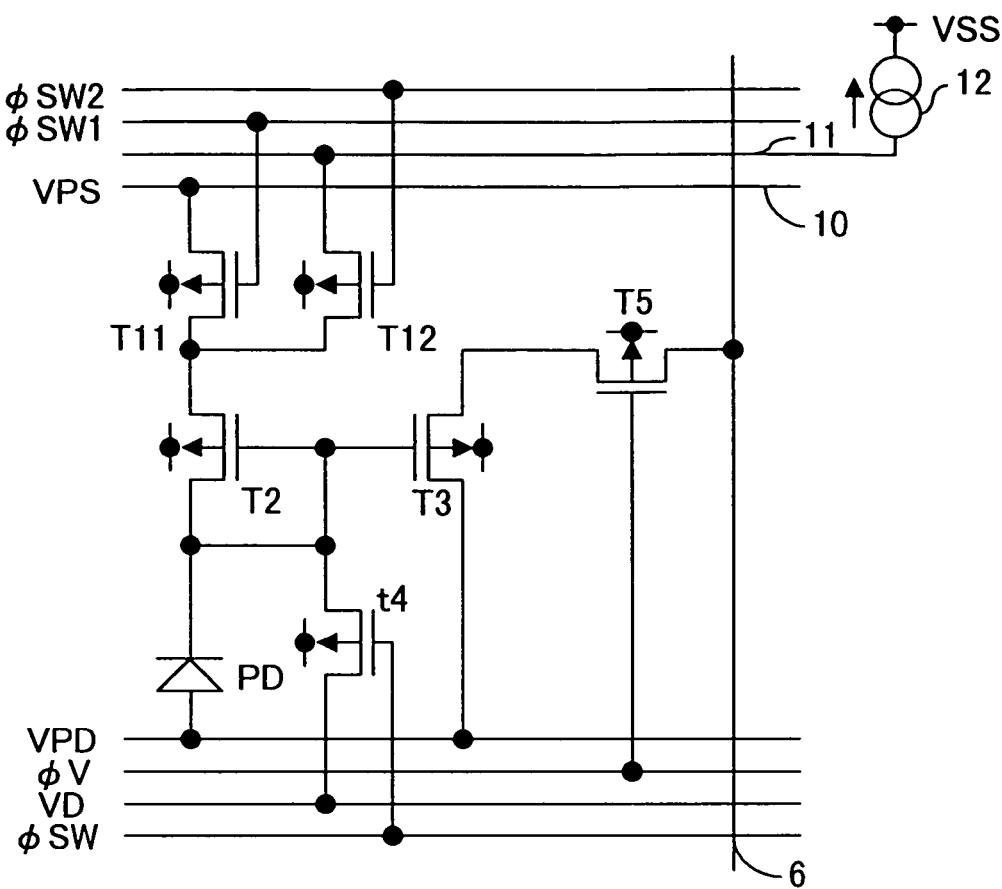
FIG. 66 is a circuit diagram showing the configuration of each pixel in a twenty-seventh embodiment of the invention.
Figure 67:
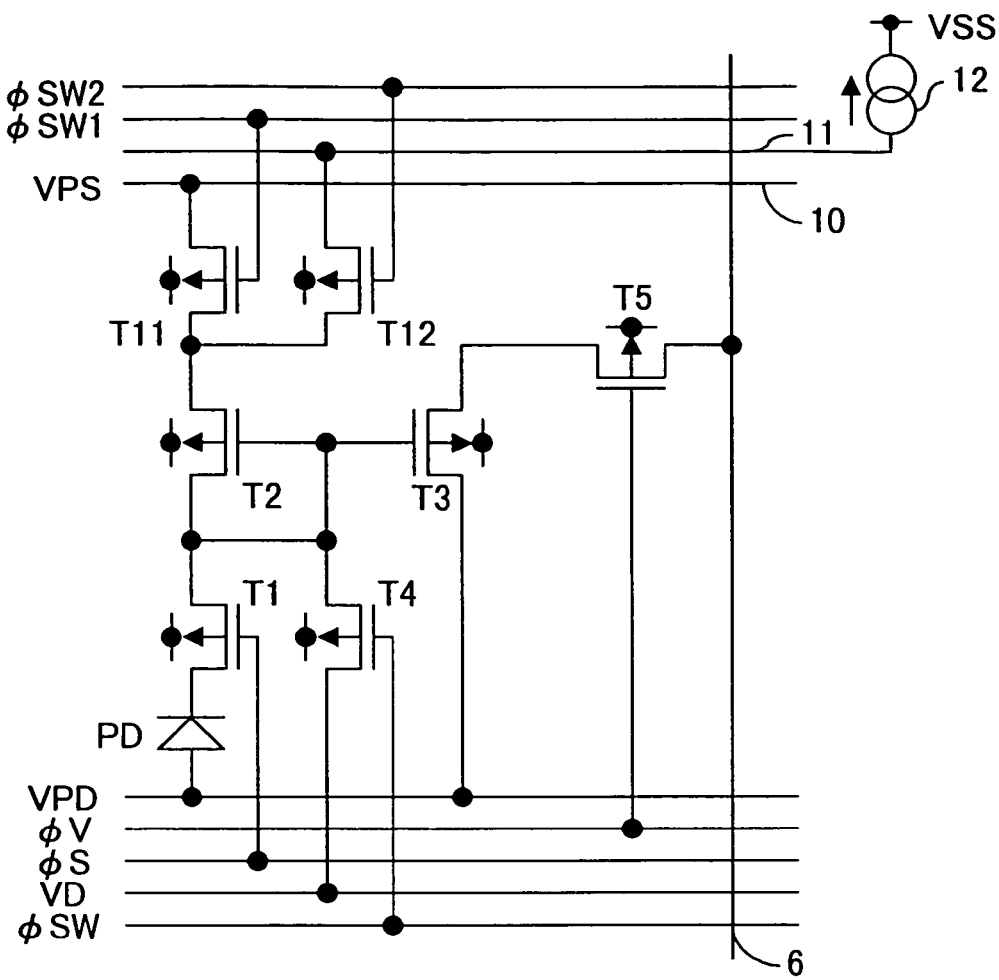
FIG. 67 is a circuit diagram showing the configuration of each pixel in a twenty-eighth embodiment of the invention.
Figure 71:
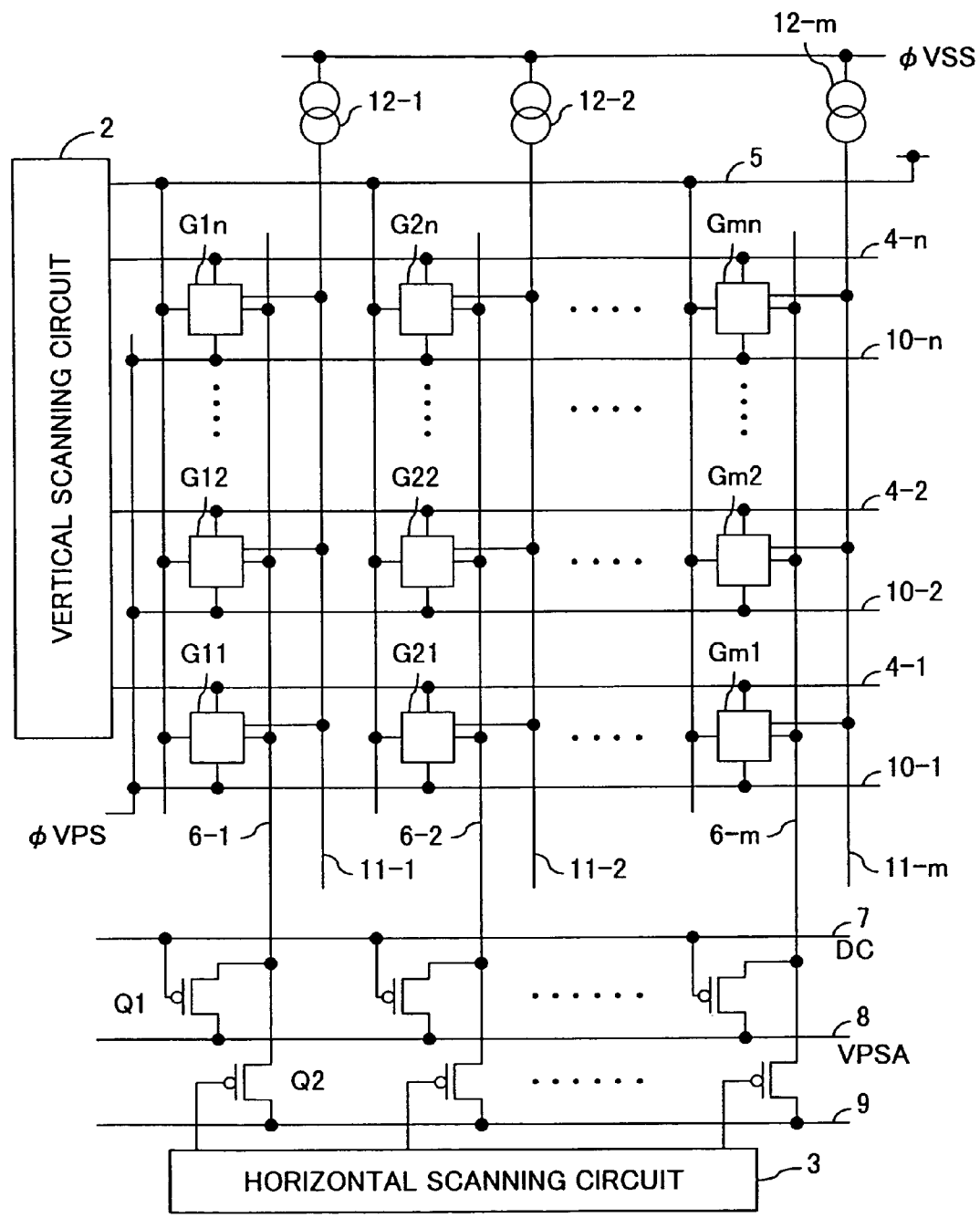
FIG. 71 is a block diagram illustrating the overall configuration of another two-dimensional solid-state image-sensing device embodying the invention, when all the active element within each pixel are formed as P-channel MOS transistors.
Figure 72:
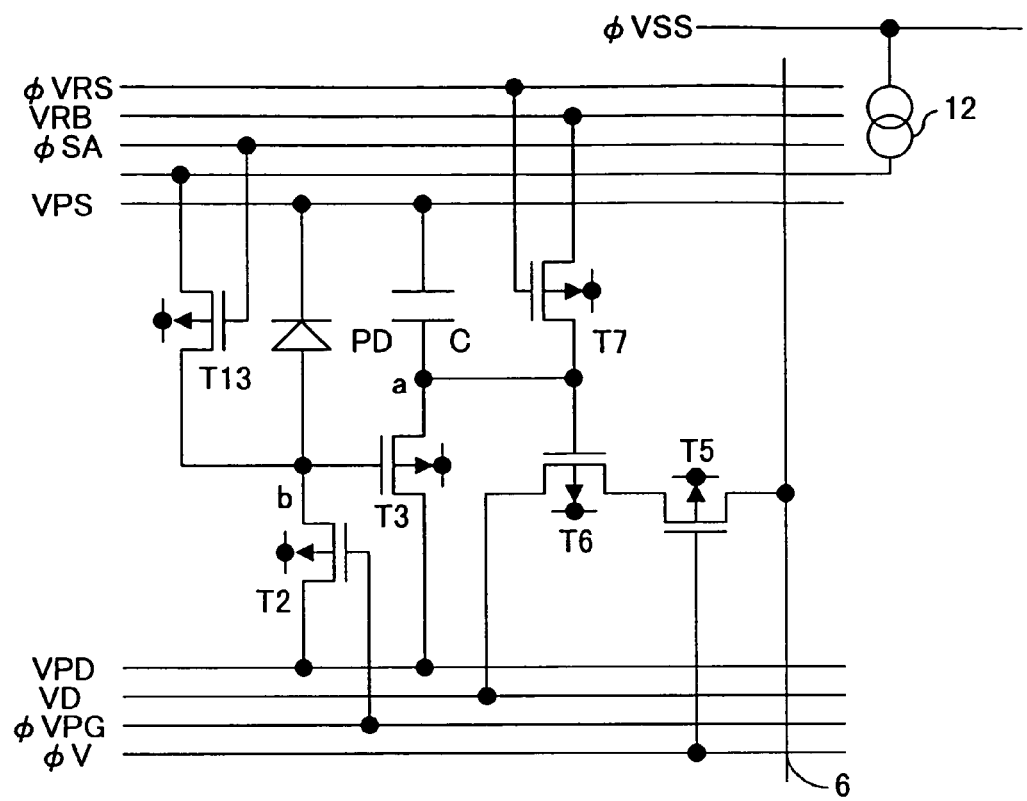
FIG. 72 is a circuit diagram showing another example of the configuration of each pixel in the twenty-ninth embodiment.
Figure 73:
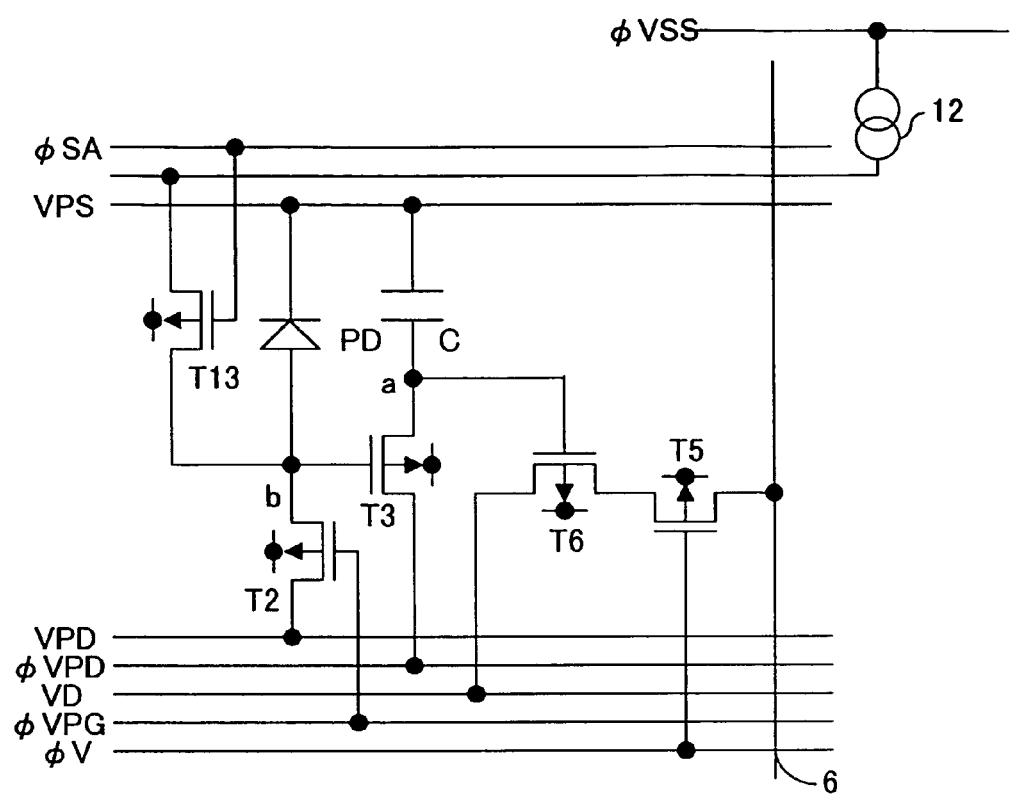
FIG. 73 is a circuit diagram showing another example of the configuration of each pixel in the thirtieth embodiment.

FIG. 49 is a block circuit configuration diagram illustrating the overall configuration of a solid-state image-sensing device having pixels configured according to the seventeenth embodiment. FIG. 51 is a block circuit configuration diagram illustrating the overall configuration of a solid-state image-sensing device having pixels configured according to one of the eighteenth to twenty-third embodiments. FIG. 61 is a block circuit configuration diagram illustrating the overall configuration of a solid-state image-sensing device having pixels configured according to the twenty-fourth embodiment. FIG. 63 is a block circuit configuration diagram illustrating the overall configuration of a solid-state image-sensing device having pixels configured according to one of the twenty-fifth to twenty-eighth embodiments. FIG. 71 is a block circuit configuration diagram illustrating the overall configuration of a solid-state image-sensing device having pixels configured according to one of the twenty-ninth to thirty-second embodiments.

As to FIGS. 49, 51, 61, 63, and 71, such elements as are found also (i.e. as play the same roles as) in FIGS. 1, 5, 21, 24, and 35 are identified with the same reference numerals and symbols, and their descriptions will be omitted. As a representative of these configurations, a brief description will be given below of the configuration shown in FIG. 51. A P-channel MOS transistor Q1 and a P-channel MOS transistor Q2 are connected to each of output signal lines 6-1, 6-2, . . . , 6-*m* that are arranged in the column direction. The MOS transistor Q1 has its gate connected to a direct-current voltage line 7, has its drain connected to the output signal line 6-1, and has its source connected to a line 8 of a direct-current voltage VPSA.

Figure 52A:
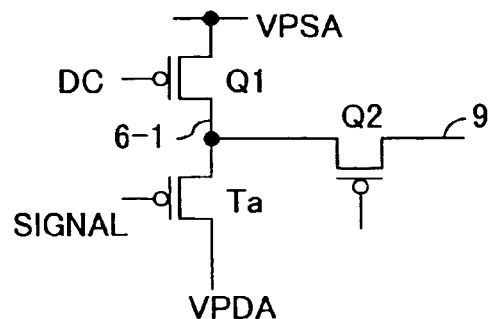
FIGS. 52A and 52B are circuit diagrams of a portion of FIG. 51.

On the other hand, the MOS transistor Q2 has its drain connected to the output signal line 6-1, has its source connected to a signal line 9 serving as a final destination line, and has its gate connected to a horizontal scanning circuit 3. Here, the MOS transistor Q1, together with a P-channel MOS transistor Ta provided within each pixel, constitutes an amplifier circuit as shown in FIG. 52A. This MOS transistor Ta corresponds to the MOS transistor T6 in the nineteenth, twenty-first, and twenty-second embodiments, and corresponds to the MOS transistor T3 in the twentieth and twenty-third embodiments.

Figure 52B:
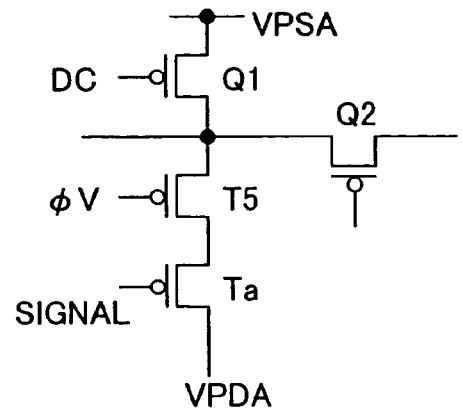
Figure 53:
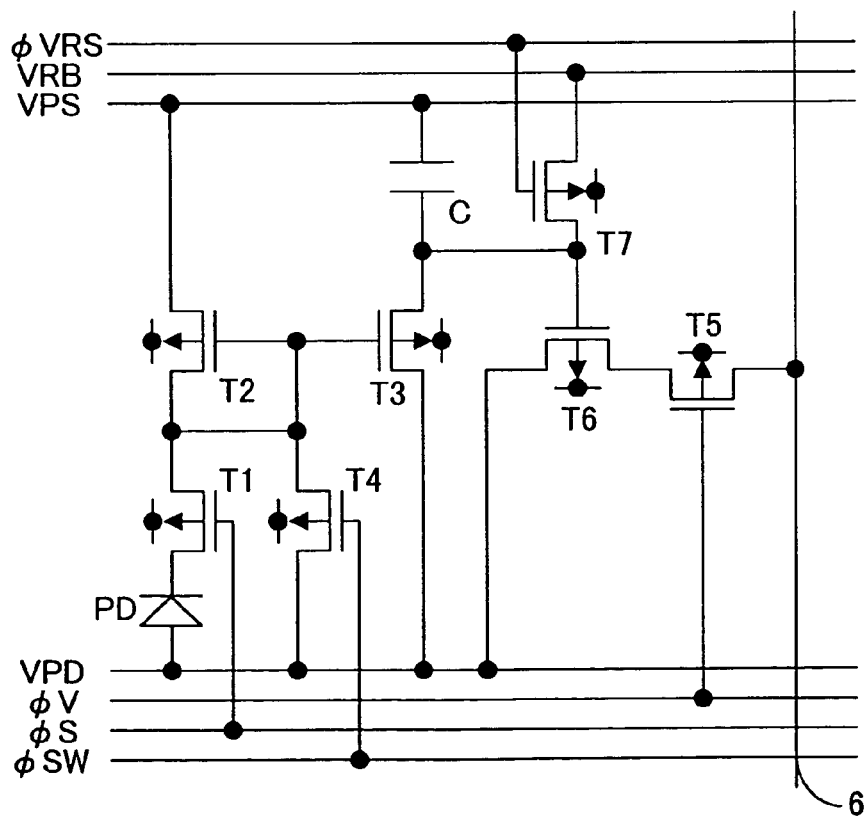
FIG. 53 is a circuit diagram showing the configuration of each pixel in a eighteenth embodiment of the invention.
Figure 54:
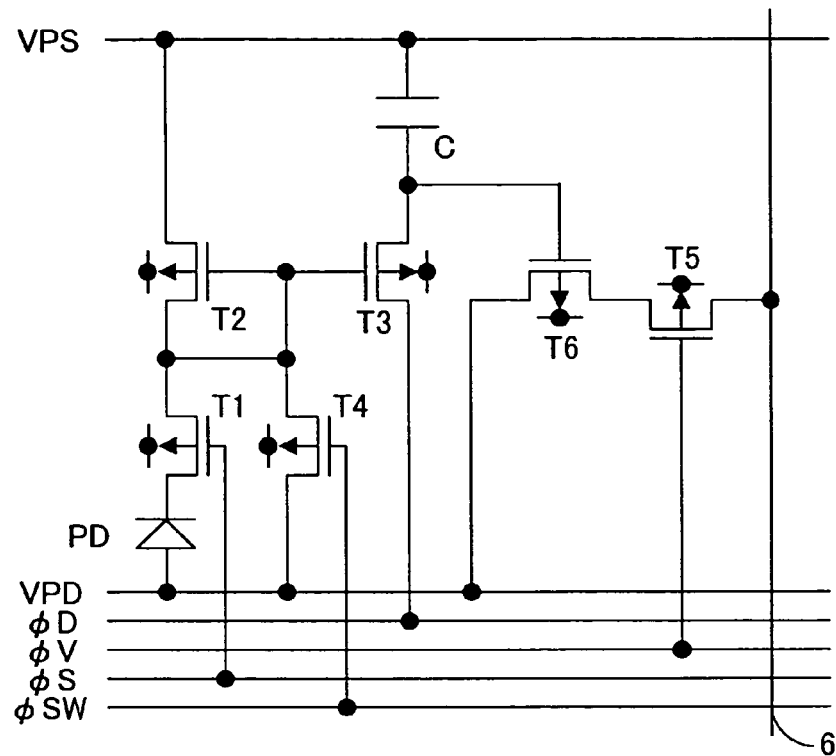
FIG. 54 is a circuit diagram showing the configuration of each pixel in a nineteenth embodiment of the invention.
Figure 55:
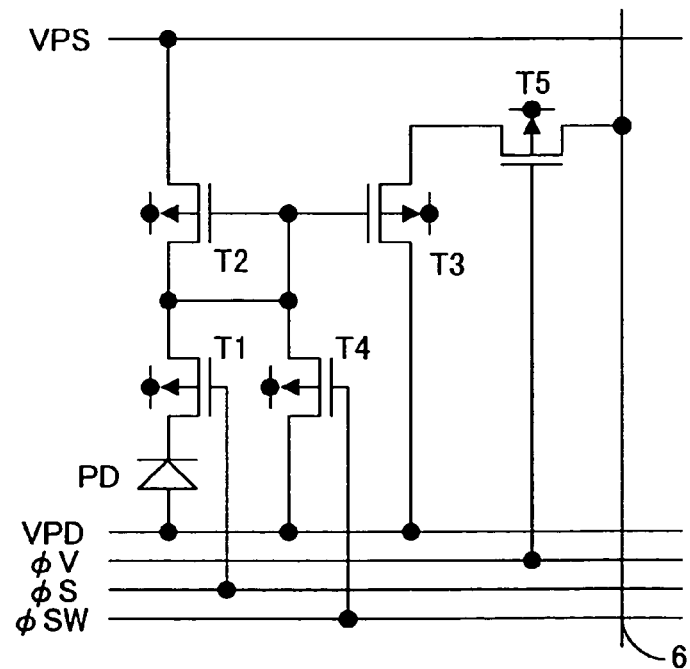
FIG. 55 is a circuit diagram showing the configuration of each pixel in a twentieth embodiment of the invention.

Here, the MOS transistor Q1 serves as a load resistor or constant-current source for the MOS transistor Ta. Accordingly, the direct-current voltage VPSA connected to the source of this MOS transistor Q1 and the direct-current voltage VPDA connected to the drain of the MOS transistor Ta fulfill the relation VPDA<VPSA, where the direct-current voltage VPDA is equal to, for example, the ground-level voltage. The MOS transistor Q1 has its drain connected to the sources of the MOS transistor Ta, and receives a direct-current voltage at its gate. The P-channel MOS transistor Q2 is controlled by the horizontal scanning circuit 3 so as to feed the output of the amplifier circuit to the signal line 9 that serves as the final destination line. If, as in the eighteenth to twenty-third embodiments, the MOS transistor T5 provided within each pixel is explicitly illustrated, the circuit shown in FIG. 52A has a circuit configuration as shown in FIG. 52B.

How to Correct Image Data

Now, with reference to the drawings, an example of an image acquisition apparatus, such as a digital camera, will be described that employs a solid-state image-sensing device having pixels configured according to one of the first to thirty-second embodiments described hereinbefore.

The image acquisition apparatus shown in FIG. 76 includes the following components. An objective lens 51 introduces the light from a subject into the image acquisition apparatus. A solid-state image-sensing device 52 outputs an electric signal in accordance with the amount of light introduced through the objective lens 51. A memory 53 receives the electric signal (hereafter called the "image data") from the solid-state image-sensing device 52 and stores it temporarily during an image sensing operation. Another memory 54 receives the electric signal (hereafter called the "compensation data") from the solid-state image-sensing device 52 and stores it temporarily during a reset operation. A compensation circuit 55 corrects the image data stored in the memory 53 in accordance with the compensation data stored in the memory 54 by performing predetermined compensation calculation. A signal processor 56 performs predetermined processing on the image data corrected in accordance with the compensation data by the compensation circuit 55 and feeds out the processed image data. Here, the solid-state image-sensing device 52 is a solid-state image-sensing device having pixels configured according to one of the first to thirty-second embodiments.

This image acquisition apparatus configured as described above operates as follows. First, an image sensing operation is performed and image data is output pixel by pixel from the solid-state image-sensing device 52 to the memory 53. Then, on completion of the image sensing operation by the individual pixels, a reset operation is performed, and meanwhile, as described previously, variations in sensitivity among the individual pixels are detected and output, as compensation data, to the memory 54. The image data stored in the memory 53 and the compensation data stored in the memory 54 are fed pixel by pixel to the compensation circuit 55.

The compensation circuit 55 corrects the image data fed from the memory 53 in accordance with the compensation data fed from the memory 54 by performing predetermined compensation calculation between the image data and compensation data of corresponding pixels. The image data thus corrected is fed to the signal processor 56, which performs predetermined processing on this image data and then feeds it out. In this image acquisition apparatus, as the memories 53 and 54, line memories or the like are used that can store the data that is output line by line from the solid-state image-sensing device 52. This makes incorporation of these memories 53 and 54 into the solid-state image-sensing device easy.

As described above, in a solid-state image-sensing device according to the present invention, a switch is provided between a photosensitive element and a transistor having its first electrode electrically connected to the photosensitive element, and resetting is performed with this switch off and with this transistor in a state in which it permits a higher current to flow therethrough than during image sensing. This helps prevent the light incident on the photosensitive element from affecting resetting, and thereby ensures accurate resetting. Moreover, by storing as compensation data the outputs obtained from the individual pixels during resetting and correcting the outputs obtained therefrom during image sensing with the thus stored compensation data, it is possible to suppress variations in sensitivity among the individual pixels. Furthermore, according to the present invention, to acquire compensation data with which to correct the outputs obtained from the individual pixels during image sensing, it is not necessary to illuminate the pixels with uniform light as practiced with a conventional solid-state image-sensing device.

Moreover, in a solid-state image-sensing device according to the present invention, it is possible to freely choose whether to convert the electric signals generated by photosensitive elements such as photodiodes logarithmically or linearly to produce output signals. Accordingly, it is possible, for example, to switch to logarithmic conversion when shooting a subject having a wide brightness range and to linear conversion when shooting a dimly-lit subject or a subject having a narrow brightness range. This makes it possible to shoot subjects of varying brightness with high accuracy.

Moreover, in a solid-state image-sensing device according to the present invention, irrespective of whether logarithmic or linear conversion is chosen, it is possible to detect variations in sensitivity among the individual pixels, and thus shoot images with high definition. Using MOS transistors to form active elements makes high-density integration possible, and thus makes it possible to form them on a single chip together with peripheral processing circuits such as A/D converters, digital system processors, and memories.

What is claimed is:
1. A solid-state image-sensing device comprising:
a plurality of pixels, each pixel capable of outputting electric signals either in a first mode in response to a first resetting signal in which the electric signals are natural-logarithmically proportional to an amount of incident light or in a second mode in response to a second resetting signal in which the electric signals are linearly proportional to the amount of incident light; and
a detection circuit for detecting variations in sensitivity among the pixels set in each of the first and second modes;
wherein:
the detection circuit provides the first and second resetting signals, and wherein the first resetting signal has different timing from the second resetting signal.

2. A solid-state image-sensing device as claimed in claim 1,
wherein the detection circuit comprises:
a constant-current source; and
a switch for electrically connecting and disconnecting the constant-current source to and from the pixels.

3. A solid-state image-sensing device as claimed in claim 1,
wherein the pixels each comprise:
a photoelectric conversion element for outputting an electric signal proportional to an amount of incident light;
a first transistor connected in series with the photoelectric conversion element; and
a second transistor, having a control electrode thereof connected to a node between the first transistor and the photoelectric conversion element, for outputting the electric signal,
wherein, in the first mode, a first voltage is applied to a control electrode of the first transistor to make the first transistor operate in a subthreshold region, and
wherein, in the second mode, a second voltage is applied to the control electrode of the first transistor to turn the first transistor off.

4. A solid-state image-sensing device as claimed in claim 3,
wherein the detection circuit comprises:
a constant-current source; and
a switch for electrically connecting and disconnecting the constant-current source to and from a node between the first transistor and the photoelectric conversion element,
wherein, when detecting variations in sensitivity among the pixels in the first mode, the first transistor is made to operate in a subthreshold region and the switch is turned on so that a constant current is fed from the constant-current source through the switch to the first transistor to sample output signals from the pixels, and
wherein, when detecting variations in sensitivity among the pixels in the second mode, the first transistor is turned off and the switch is turned on so that a constant voltage is fed through the constant-current source to the control electrode of the second transistor to initialize the pixels and then sample output signals from the pixels.

5. A solid-state image-sensing device as claimed in claim 1,
wherein the pixels each comprise:
a transistor having a first electrode, a second electrode, and a control electrode and receiving at the control electrode an output from a photoelectric converter; and
a capacitor connected to the second electrode of the transistor.

6. A solid-state image-sensing device as claimed in claim 5, wherein:
the detection circuit provides the first resetting signal to selected first pixels and the second resetting signal to other selected second pixels to detect variations among the first and second pixels in each mode.

* * * * *